US008407040B2

(12) United States Patent
Sata et al.

(10) Patent No.: US 8,407,040 B2
(45) Date of Patent: Mar. 26, 2013

(54) INFORMATION PROCESSING DEVICE, METHOD AND PROGRAM

(75) Inventors: Ichiko Sata, Osaka (JP); Masato Iida, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 399 days.

(21) Appl. No.: 12/919,801

(22) PCT Filed: Feb. 2, 2009

(86) PCT No.: PCT/JP2009/051706
§ 371 (c)(1),
(2), (4) Date: Aug. 27, 2010

(87) PCT Pub. No.: WO2009/107456
PCT Pub. Date: Sep. 3, 2009

(65) Prior Publication Data
US 2011/0264439 A1    Oct. 27, 2011

(30) Foreign Application Priority Data
Feb. 29, 2008   (JP) .................................. 2008-050733

(51) Int. Cl.
*G06F 17/28*    (2006.01)
(52) U.S. Cl. ............. 704/2; 704/3; 704/4; 704/6; 704/7; 704/8; 707/706; 707/707; 707/708; 715/264
(58) Field of Classification Search .............. 704/2–8; 707/706–708; 715/264
See application file for complete search history.

(56) References Cited

U.S. PATENT DOCUMENTS

| | | | | |
|---|---|---|---|---|
| 4,507,750 A | * | 3/1985 | Frantz et al. ................. | 704/277 |
| 4,566,078 A | * | 1/1986 | Crabtree ......................... | 704/8 |
| 5,227,971 A | * | 7/1993 | Nakajima et al. ............. | 704/2 |
| 5,442,546 A | * | 8/1995 | Kaji et al. ...................... | 704/4 |
| 5,475,586 A | * | 12/1995 | Sata et al. ...................... | 704/2 |
| 5,608,623 A | * | 3/1997 | Sata et al. ...................... | 704/4 |
| 5,644,774 A | * | 7/1997 | Fukumochi et al. ........... | 704/4 |
| 5,652,898 A | * | 7/1997 | Kaji ............................... | 704/10 |

(Continued)

FOREIGN PATENT DOCUMENTS

JP    6-52219 A    2/1994
JP    2002-278964 A    9/2002

(Continued)

*Primary Examiner* — David R Hudspeth
*Assistant Examiner* — Lamont Spooner
(74) *Attorney, Agent, or Firm* — Birch, Stewart, Kolasch & Birch, LLP

(57) ABSTRACT

A translation apparatus capable of producing an optimal translation of an input sentence is provided. A template in a first language and a template in a second language include a fixed portion consisting of a prescribed word/phrase and a variable portion replaceable by any of a predetermined plurality of words/phrases at corresponding positions, and the translation apparatus includes: a determining unit for determining, for a plurality of templates in the first language, whether or not a word/phrase included in the input sentence in the first language matches any of the prescribed word/phrase and the predetermined plurality of words/phrases; a selecting unit for selecting at least one of the plurality of templates based on the result of determination; and a replacing unit for replacing, if a template including a variable portion replaceable by the matched word/phrase is selected, the variable portion corresponding to the variable portion replaceable by the matched word/phrase of the template in the second language corresponding to the selected template, by a word/phrase in the second language corresponding to the matched word/phrase.

16 Claims, 71 Drawing Sheets

U.S. PATENT DOCUMENTS

| | | | | |
|---|---|---|---|---|
| 5,687,383 | A * | 11/1997 | Nakayama et al. | 704/2 |
| 6,275,789 | B1 * | 8/2001 | Moser et al. | 704/7 |
| 6,556,972 | B1 * | 4/2003 | Bakis et al. | 704/277 |
| 6,804,637 | B1 * | 10/2004 | Tokuda et al. | 704/2 |
| 6,859,778 | B1 * | 2/2005 | Bakis et al. | 704/277 |
| 7,047,195 | B2 * | 5/2006 | Koizumi et al. | 704/260 |
| 7,236,922 | B2 * | 6/2007 | Honda et al. | 704/2 |
| 7,711,544 | B2 * | 5/2010 | McEntee et al. | 704/4 |
| 7,716,037 | B2 * | 5/2010 | Precoda et al. | 704/2 |
| 7,912,696 | B1 * | 3/2011 | Asano et al. | 704/2 |
| 7,983,895 | B2 * | 7/2011 | McEntee et al. | 704/2 |
| 8,015,016 | B2 * | 9/2011 | Park et al. | 704/277 |
| 8,051,061 | B2 * | 11/2011 | Niu et al. | 707/706 |
| 2002/0138250 | A1 | 9/2002 | Okura et al. | |
| 2003/0115552 | A1 * | 6/2003 | Jahnke et al. | 715/536 |
| 2003/0140316 | A1 * | 7/2003 | Lakritz | 715/536 |
| 2003/0154066 | A1 * | 8/2003 | Tokuda et al. | 704/2 |
| 2004/0044516 | A1 * | 3/2004 | Kennewick et al. | 704/5 |
| 2004/0225491 | A1 * | 11/2004 | Chang | 704/2 |
| 2005/0010390 | A1 * | 1/2005 | Shimohata | 704/5 |
| 2005/0131673 | A1 * | 6/2005 | Koizumi et al. | 704/2 |
| 2006/0004560 | A1 | 1/2006 | Whitelock | |
| 2006/0100847 | A1 * | 5/2006 | McEntee et al. | 704/4 |
| 2006/0200336 | A1 * | 9/2006 | Cipollone et al. | 704/4 |
| 2007/0150260 | A1 * | 6/2007 | Lee et al. | 704/2 |
| 2008/0040098 | A1 * | 2/2008 | Suzuki | 704/4 |
| 2008/0046231 | A1 * | 2/2008 | Laden et al. | 704/8 |
| 2008/0059147 | A1 * | 3/2008 | Afify et al. | 704/5 |
| 2008/0133245 | A1 * | 6/2008 | Proulx et al. | 704/277 |
| 2011/0264439 | A1 * | 10/2011 | Sata et al. | 704/4 |

FOREIGN PATENT DOCUMENTS

| | | |
|---|---|---|
| JP | 2004-62726 A | 2/2004 |
| JP | 2005-44020 A | 2/2005 |
| JP | 2006-12168 A | 1/2006 |
| JP | 2007-148039 A | 6/2007 |

* cited by examiner

FIG.3

| TEMPLATE ID | 1196-1 |
|---|---|
| JAPANESE TEMPLATE | {1:&HUMAN-SUBJ} が {2:&VB_EAT+v.ren1} ——ている のは 何 です か ? |
| ENGLISH TEMPLATE | What {-i:be_AUX+pres} {-i:#DET_MY-NULL} {1-i:& HUMAN-SUBJ} {2:&VB_EAT+ing} ? |
| CHINESE TEMPLATE | {1:& HUMAN-SUBJ} 在 {2:&VB_EAT} 的是什么? |

| DICTIONARY ID | 0002684 | | |
|---|---|---|---|
| ENTRY | JAPANESE | ENGLISH | CHINESE |
| | 飲む ←W14 | drink | 喝 ←W17 |
| PART OF SPEECH | VERB | VERB | VERB |
| INFLECTION | 五マ ←W18 | *s/drank/drunk/*ing | |
| COUNTER SUFFIX CODE | 52500 | | |
| SEMANTIC CODE | 1 | | |
| | 2 | | |

FIG.5

| | IMPERFECTIVE1 (mi1) | IMPERFECTIVE2 (mi2) | IMPERFECTIVE3 (mi3) | IMPERFECTIVE4 (mi4) | CONJUNCTIVE1 (ren1) | CONJUNCTIVE2 (ren2) | CONJUNCTIVE3 (ren3) | PREDICATIVE (shu) | ATTRIBUTIVE (tai) | HYPOTHETICAL (ka) | IMPERATIVE (mei) | POTENTIAL (kanou) |
|---|---|---|---|---|---|---|---|---|---|---|---|---|
| 五マ | 〻 ま 〻 | 〻 ま 〻 | 〻 も 〻 | 〻 ま 〻 | 〻 ん 〻 | 〻 み 〻 | 〻 # 〻 | 〻 む 〻 | 〻 む 〻 | 〻 め 〻 | 〻 め 〻 | 〻 め 〻 |

| CATEGORY ID | | 203 | | |
|---|---|---|---|---|
| LABEL NAME | | &VB_EAT | | |
| SEMANTIC CODE | | 52500 | | |
| REPRESENTATIVE VALUE | 1 | 食べる | eat | 吃 |
| | 2 | 飲む | drink | 喝 |

| CATEGORY ID | 301 | | |
|---|---|---|---|
| LABEL NAME | &HUMAN-SUBJ | | |
| SEMANTIC CODE | 1202 | | |
| REPRESENTATIVE VALUE | 1 | 私 | I | 我 |
| | 2 | 父 | father | 父亲 |

FIG.9A

| LANGUAGE | ENGLISH | |
|---|---|---|
| LABEL NAME | be_AUX | |
| CO-OCCURRENCE CONDITIONS | I | am |
| | you / *+plural | are |
| | – | is |

FIG.9B

| LANGUAGE | ENGLISH | |
|---|---|---|
| LABEL NAME | DET_MY-NULL | |
| CO-OCCURRENCE CONDITIONS | &HUMAN-MY | my |
| | – | (NULL) |

FIG.10

| | |
|---|---|
| EXTRACTED WORD/PHRASE BUFFER | 70 |
| SEARCH RESULT TEMPLATE BUFFER | 71 |
| SLOT PORTION BUFFER | 72 |
| CO-OCCURRENCE PORTION BUFFER | 73 |
| PRIORITY CO-OCCURRENCE BUFFER | 74 |
| PROCESSED SENTENCE BUFFER | 75 |
| TRANSLATION RESULT BUFFER | 76 |
| TEMPORARY TEMPLATE BUFFER | 77 |
| TEMPORARY DICTIONARY BUFFER | 78 |
| TEMPORARY WORD/PHRASE BUFFER | 79 |
| TEMPORARY SLOT BUFFER | 80 |
| TEMPORARY FIRST CO-OCCURRENCE BUFFER | 81 |
| TEMPORARY SECOND CO-OCCURRENCE BUFFER | 82 |
| INPUT SENTENCE BUFFER | 83 |

FIG.14

| WORD/PHRASE No. | 1 | 2 | 3 |
|---|---|---|---|
| WORD/PHRASE (JAPANESE) | 飲む | 彼 | 何 |
| WORD/PHRASE (ENGLISH) | | | |
| WORD/PHRASE (CHINESE) | | | |

| RESULT No. | n |
|---|---|
| TEMPLATE ID | 1196-1 |
| JAPANESE TEMPLATE | [1:&HUMAN-SUBJ] が [2:&VB_EAT+v.ren1] ている のは 何 です か ? |
| ENGLISH TEMPLATE | What {-i:be_AUX+pres} [-i:#DET_MY-NULL] [1-i:& HUMAN-SUBJ] [2:&VB_EAT+ing] ? |
| CHINESE TEMPLATE | [1:& HUMAN-SUBJ] 在 [2:&VB_EAT] 的 是 什么? |

FIG.17

| JAPANESE TEMPLATE | [1:&HUMAN-SUBJ] が [2:&VB_EAT+v.ren1] ている のは 何 です か ? |
| --- | --- |
| ENGLISH TEMPLATE | What {-i:be_AUX+pres} {-i:#DET_MY-NULL} [1-i:&HUMAN-SUBJ] [2:&VB_EAT+ing] ? |
| CHINESE TEMPLATE | [1:&HUMAN-SUBJ] 在 [2:&VB_EAT] 的是什么? |

FIG.18

| SLOT No. | 1 | | | 2 | | |
|---|---|---|---|---|---|---|
| CATEGORY NAME | &HUMAN-SUBJ | | | &VB_EAT | | |
|  | JAPANESE | ENGLISH | CHINESE | JAPANESE | ENGLISH | CHINESE |
| INFLECTION INFORMATION |  |  |  | v.ren1 | ing |  |
| CO-OCCURRENCE FLAG |  | i |  |  |  |  |
| WORD/PHRASE FOR REPLACEMENT |  |  |  |  |  |  |
| ALREADY-PROCESSED FLAG |  |  |  |  |  |  |

FIG.19

| CO-OCCURRENCE No. | 1 | 2 |
|---|---|---|
| LABEL NAME | be_AUX | DET_MY-NULL |
| LANGUAGE | ENGLISH | ENGLISH |
| PRIORITY PROCESSING FLAG |  | 1 |
| WORD/PHRASE FOR REPLACEMENT |  |  |
| CO-OCCURRENCE FLAG | i | i |

FIG.21

| CATEGORY NAME | &VB_EAT | | |
|---|---|---|---|
| | JAPANESE | ENGLISH | CHINESE |
| INFLECTION INFORMATION | v.ren1 | ing | |
| CO-OCCURRENCE FLAG | | | |
| WORD/PHRASE FOR REPLACEMENT | | | |

FIG.22

| DICTIONARY ID | 0002684 | | |
|---|---|---|---|
| ENTRY | JAPANESE | ENGLISH | CHINESE |
| | 飲む ← W14 | drink | 喝 ← W17 |
| PART OF SPEECH | VERB | VERB | VERB |
| INFLECTION | 五マ ← W18 | *s/drank/dru nk/*ing | |
| COUNTER SUFFIX CODE | 52500 | | |
| SEMANTIC CODE | 1 | | |
| | 2 | | |

FIG.23

| WORD/PHRASE (JAPANESE) | 飲む ← W14 |
|---|---|
| WORD/PHRASE (ENGLISH) | drink |
| WORD/PHRASE (CHINESE) | 喝 |

FIG.24

| WORD/PHRASE (JAPANESE) | 飲ん ← W33 |
|---|---|
| WORD/PHRASE (ENGLISH) | drinking |
| WORD/PHRASE (CHINESE) | 喝 ← W17 |

FIG.25

| JAPANESE TEMPLATE | [1:&HUMAN-SUBJ] が [飲ん] でいるのは何ですか？ |
| --- | --- |
| ENGLISH TEMPLATE | What [-i:be_AUX+pres] [1:&HUMAN-SUBJ] [-i:#DET_MY-NULL] [-i:#[drinking]? |
| CHINESE TEMPLATE | [1:& HUMAN-SUBJ] 在 [喝] 的是什么？ |

W33 (pointing to 飲ん)
W17 (pointing to 喝)

FIG.26

| SLOT No. | 1 | | | 2 | | |
|---|---|---|---|---|---|---|
| CATEGORY NAME | &HUMAN-SUBJ | | | &VB_EAT | | |
| | JAPANESE | ENGLISH | CHINESE | JAPANESE | ENGLISH | CHINESE |
| INFLECTION INFORMATION | | i | | v.ren1 | ing | |
| CO-OCCURRENCE FLAG | | | | | | |
| WORD/PHRASE FOR REPLACEMENT | | | | 飲ん ← W33 | drinking | 喝 ← W17 |
| ALREADY-PROCESSED FLAG | | | | 1 | | |

FIG.27

| JAPANESE TEMPLATE | [彼] が [飲ん] で いる の は 何 です か ? |
| --- | --- |
| ENGLISH TEMPLATE | What [-i:be_AUX+pres] [-i:#DET_MY-NULL] [he] [drinking] ? |
| CHINESE TEMPLATE | [他] 在 [喝] 的 是 什么 ? |

FIG.28

| SLOT No. | 1 | | | 2 | | |
|---|---|---|---|---|---|---|
| CATEGORY NAME | &HUMAN-SUBJ | | | &VB_EAT | | |
| | JAPANESE | ENGLISH | CHINESE | JAPANESE | ENGLISH | CHINESE |
| INFLECTION INFORMATION | | i | | v.ren1 | ing | |
| CO-OCCURRENCE FLAG | | he | | | drinking | |
| WORD/PHRASE FOR REPLACEMENT | 彼 W12 | | 他 W34 | 飲ん W33 | | 喝 W17 |
| ALREADY-PROCESSED FLAG | 1 | | | 1 | | |

FIG.30

| LABEL NAME | be_AUX |
|---|---|
| LANGUAGE | ENGLISH |
| PRIORITY PROCESSING FLAG | |
| WORD/PHRASE FOR REPLACEMENT | |
| CO-OCCURRENCE FLAG | i |

FIG.31

| LABEL NAME | DET_MY-NULL |
|---|---|
| LANGUAGE | ENGLISH |
| PRIORITY PROCESSING FLAG | 1 |
| WORD/PHRASE FOR REPLACEMENT | |
| CO-OCCURRENCE FLAG | i |

FIG.32

| CATEGORY NAME | &HUMAN-SUBJ | | |
|---|---|---|---|
| | JAPANESE | ENGLISH | CHINESE |
| INFLECTION INFORMATION | | | |
| CO-OCCURRENCE FLAG | | i | |
| WORD/PHRASE FOR REPLACEMENT | 彼 | he | 他 |
| ALREADY-PROCESSED FLAG | 1 | | |

FIG.33

| WORD/PHRASE (JAPANESE) | |
|---|---|
| WORD/PHRASE (ENGLISH) | (NULL) |
| WORD/PHRASE (CHINESE) | |

FIG.34

| JAPANESE TEMPLATE | [彼] が [飲ん] で いる の は 何 です か ? |
| --- | --- |
| ENGLISH TEMPLATE | What [-i:be_AUX+pres] [] [he] [drinking] ? |
| CHINESE TEMPLATE | [他] 在 [喝] 的 是 什么 ? |

FIG.35

| CO-OCCURRENCE No. | 1 |
|---|---|
| LABEL NAME | DET_MY-NULL |
| LANGUAGE | ENGLISH |
| WORD/PHRASE FOR REPLACEMENT | |
| CO-OCCURRENCE FLAG | i |

FIG.36

| CATEGORY NAME | &HUMAN-SUBJ | | |
|---|---|---|---|
| | JAPANESE | ENGLISH | CHINESE |
| INFLECTION INFORMATION | | | |
| CO-OCCURRENCE FLAG | | i | |
| WORD/PHRASE FOR REPLACEMENT | 彼 | he | 他 |
| ALREADY-PROCESSED FLAG | 1 | | |

FIG.37

| LABEL NAME | DET_MY-NULL |
|---|---|
| LANGUAGE | ENGLISH |
| WORD/PHRASE FOR REPLACEMENT | |
| CO-OCCURRENCE FLAG | i |

FIG.38

| WORD/PHRASE (JAPANESE) | |
|---|---|
| WORD/PHRASE (ENGLISH) | is |
| WORD/PHRASE (CHINESE) | |

FIG.39

| JAPANESE TEMPLATE | [彼] が [飲ん] で いる の は 何 です か ? |
| --- | --- |
| ENGLISH TEMPLATE | What [is] [] [he] [drinking] ? |
| CHINESE TEMPLATE | [他] 在 [喝] 的 是 什么 ? |

| JAPANESE TEMPLATE | {彼}が{飲ん}でいるのは何ですか？ W36 |
|---|---|
| ENGLISH TEMPLATE | What {is} {} [he] {drinking}? |
| CHINESE TEMPLATE | {他}在{喝}的是什么？ |

FIG.41

| JAPANESE TEMPLATE | {1:NOUN} を1つください。 |
| --- | --- |
| ENGLISH TEMPLATE | Can I have {~:i:DET_A} {~:i:#CLASSIFIER} {1~i:NOUN}. |

FIG.42

| EXAMPLE INPUT | NOUN |
|---|---|
| A | コーヒー |
| B | サラダ |
| C | ペン |
| D | リンゴ |

FIG.43

| JAPANESE | ENGLISH | COUNTER SUFFIX |
|---|---|---|
| コーヒー | coffee | cup of |
| サラダ | salad | order of |
| ペン | pen | ( NULL ) |
| リンゴ | apple | ( NULL ) |

FIG.45

| EXAMPLE INPUT | RESULT (EXAMPLE ENGLISH SENTENCE) |
|---|---|
| A | Can I have {a} {cup of} {coffee}. |
| B | Can I have {an} {order of} {salad}. |
| C | Can I have {a} { } {pen}. |
| D | Can I have {an} { } {apple}. |

FIG.46

| JAPANESE TEMPLATE | {1:THIS-THAT} {2:GOODS} ~ |
| --- | --- |
| ENGLISH TEMPLATE | {1-i:THIS-THAT} {2-i:GOODS} ~ |

FIG.47

| EXAMPLE INPUT | THIS-THAT | GOODS |
|---|---|---|
| A | この | 本 |
| B | この | ズボン |
| C | この | 荷物 |
| D | これらの | 本 |
| E | これらの | ズボン |
| F | これらの | 荷物 |

W40 points to この; W41 points to 本

FIG.48

| JAPANESE | ENGLISH | PLURAL FORM |
|---|---|---|
| この | this | these |
| これらの | these | ( these ) |
| 本 | book | books |
| 荷物 | luggage | - |
| ズボン | trousers | ( trousers ) |

FIG.50

| EXAMPLE INPUT | RESULT (EXAMPLE ENGLISH SENTENCE) |
|---|---|
| A | { this } { book } ~ |
| B | { these } { trousers } ~ |
| C | { this } { luggage } ~ |
| D | { these } { books } ~ |
| E | { these } { trousers } ~ |
| F | { this } { luggage } ~ |

FIG.51

| JAPANESE TEMPLATE | {1-i:NOUN} {2:NUM} [3-i:CLASSIFIER} です。 |
| --- | --- |
| ENGLISH TEMPLATE | {2-j:NUM} {3-j:CLASSIFIER} {1-j:NOUN} . |

FIG.52

| EXAMPLE INPUT | NOUN | NUM | CLASSIFIER |
|---|---|---|---|
| A | ワイン | 2 | 杯 |
| B | 雑誌 | 2 | 冊 |

W42 points to ワイン; W43 → 杯; W44 → 冊

FIG.53

| JAPANESE | ENGLISH |
|---|---|
| ワイン | wine |
| 雑誌 | magazine |
| 2 | two |
| 冊 | (NULL) |
| 本 | bottle of |
| 杯 | glass of |
| 杯 | cup of |

| EXAMPLE INPUT | RESULT (EXAMPLE ENGLISH SENTENCE) |
|---|---|
| A | { Two } { glasses of } { wine } . |
| B | { Two } { } { magazines } . |

FIG.57

| TEMPLATE ID | 1971-1 |
|---|---|
| 1ST TEMPLATE (JAPANESE) | [1:&LANGUAGE]で{[まったく|全然]} [2:(&VB_EXPLAIN+inf)|(&VB_PRONOUNCE+v.kanou)|(&VB_INTERPRET+v.kanou)}ません。 |
| 2ND TEMPLATE (ENGLISH) | I can't {2:(&VB_EXPLAIN+inf) it in |(&VB_PRONOUNCE+inf) it in |(&VB_INTERPRET+inf) it into } [1:&LANGUAGE]. |
| 3RD TEMPLATE (CHINESE) | 我根本不能用 [2:(&VB_EXPLAIN) 清楚|(&VB_PRONOUNCE)|(&VB_INTERPRET)] [1:&LANGUAGE]。 |

|  | ELEMENT 1 | ELEMENT 2 | ELEMENT 3 |
|---|---|---|---|
| JAPANESE | まったく | 全然 |  |
| ENGLISH | Null | Null | Null |
| CHINESE | Null | Null | Null |

W48 → ELEMENT 1 (まったく)
W49 → ELEMENT 2 (全然)

FIG.63

| TEMPLATE ID | 1971-1_1 |
|---|---|
| 1ST TEMPLATE (JAPANESE) | [1:&LANGUAGE] で まったく {2:(&VB_EXPLAIN+v.kanou)|(&VB_PRONOUNCE+v.kanou)|(&VB_INTERPRET+v.kanou)} ません。 <br> W48 |
| 2ND TEMPLATE (ENGLISH) | I can't {2:(&VB_EXPLAIN+inf)  it in |(&VB_PRONOUNCE+inf) it in |(&VB_INTERPRET+inf) it into } {1:&LANGUAGE} . |
| 3RD TEMPLATE (CHINESE) | 我根本不能用 {2:(&VB_EXPLAIN) 清楚 |(&VB_PRONOUNCE)|(&VB_INTERPRET)} {1:&LANGUAGE} 。 |

| TEMPLATE ID | 1971-1_2 |
|---|---|
| 1ST TEMPLATE (JAPANESE) | [1:&LANGUAGE]で全然 {2:(&VB_EXPLAIN+v.kanou)|(&VB_PRONOUNCE+v.kanou)|(&VB_INTERPRET+v.kanou)}ません。 |
| 2ND TEMPLATE (ENGLISH) | I can't {2:(&VB_EXPLAIN+inf) it in |(&VB_PRONOUNCE+inf) it in |(&VB_INTERPRET+inf) it into } [1:&LANGUAGE]. |
| 3RD TEMPLATE (CHINESE) | 我根本不能用 {2:(&VB_EXPLAIN)清楚|(&VB_PRONOUNCE)|(&VB_INTERPRET)} [1:&LANGUAGE]。 |

FIG.65

| TEMPLATE ID | 1971-1_3 |
|---|---|
| 1ST TEMPLATE (JAPANESE) | {1: &LANGUAGE} で {2:(&VB_EXPLAIN+v.kanou)|(&VB_PRONOUNCE+v.kanou)|(&VB_INTERPRET+v.kanou)} ません。 |
| 2ND TEMPLATE (ENGLISH) | I can't {2:(&VB_EXPLAIN+inf) it in |(&VB_PRONOUNCE+inf) it in |(&VB_INTERPRET+inf) it into } {1:&LANGUAGE} . |
| 3RD TEMPLATE (CHINESE) | 我根本不能用 {2:(&VB_EXPLAIN) 清楚|(&VB_PRONOUNCE)|(&VB_INTERPRET)} {1:&LANGUAGE} 。 |

FIG.66

| | ELEMENT 1 | ELEMENT 2 | ELEMENT 3 |
|---|---|---|---|
| JAPANESE | (&VB_EXPLAIN+v.kanou) | (&VB_PRONOUNCE+v.kanou) | (&VB_INTERPRET+v.kanou) |
| ENGLISH | (&VB_EXPLAIN+inf) it in | (&VB_PRONOUNCE+inf) it in | (&VB_INTERPRET+inf) it into |
| CHINESE | (&VB_EXPLAIN) 清楚 | (&VB_PRONOUNCE) | (&VB_INTERPRET) |

FIG.67

| | ELEMENT 1 | ELEMENT 2 | ELEMENT 3 |
|---|---|---|---|
| JAPANESE | [2:&VB_EXPLAIN+v.kanou] | [2:&VB_PRONOUNCE+v.kanou] | [2:&VB_INTERPRET+v.kanou] |
| ENGLISH | [2:&VB_EXPLAIN+infl] it in | [2:&VB_PRONOUNCE+infl] it in | [2:&VB_INTERPRET+infl] it into |
| CHINESE | [2:&VB_EXPLAIN] 清楚 | [2:&VB_PRONOUNCE] | [2:&VB_INTERPRET] |

FIG.68

| TEMPLATE ID | 1971-1_11 |
|---|---|
| 1ST TEMPLATE (JAPANESE) | [1:&LANGUAGE]でまったく[2:&VB_EXPLAIN+v.kanou]ません。 |
| 2ND TEMPLATE (ENGLISH) | I can't [2:&VB_EXPLAIN+inf] it in[1:&LANGUAGE]. |
| 3RD TEMPLATE (CHINESE) | 我根本不能用[2:&VB_EXPLAIN]清楚[1:&LANGUAGE]。 |

FIG.69

| TEMPLATE ID | 1971-1_12 |
|---|---|
| 1ST TEMPLATE (JAPANESE) | [1:&LANGUAGE]でまったく[2:&VB_PRONOUNCE+v.kanou]ません。 |
| 2ND TEMPLATE (ENGLISH) | I can't [2:&VB_PRONOUNCE+infit in[1:&LANGUAGE]. |
| 3RD TEMPLATE (CHINESE) | 我根本不能用[2:&VB_PRONOUNCE][1:&LANGUAGE]。 |

FIG.70

| TEMPLATE ID | 1971-1_13 |
|---|---|
| 1ST TEMPLATE (JAPANESE) | [1: &LANGUAGE] でまったく [2:&VB_INTERPRET+v.kanou] ません。 |
| 2ND TEMPLATE (ENGLISH) | I can't [2:&VB_INTERPRET+inflt into[1:&LANGUAGE] . |
| 3RD TEMPLATE (CHINESE) | 我根本不能用 [2:&VB_INTERPRET] [1:&LANGUAGE]。 |

FIG.71

| TEMPLATE ID | 1971-1_21 |
|---|---|
| 1ST TEMPLATE (JAPANESE) | [1:&LANGUAGE]で全然[2:&VB_EXPLAIN+v.kanou]ません。 |
| 2ND TEMPLATE (ENGLISH) | I can't [2:&VB_EXPLAIN+inf] it in [1:&LANGUAGE]. |
| 3RD TEMPLATE (CHINESE) | 我根本不能用[2:&VB_EXPLAIN]清楚[1:&LANGUAGE]。 |

FIG.72

| TEMPLATE ID | 1971 -t_22 |
|---|---|
| 1ST TEMPLATE (JAPANESE) | [1: &LANGUAGE] で全然 [2:&VB_PRONOUNCE+v.kanou] ません。 |
| 2ND TEMPLATE (ENGLISH) | I can't [2:&VB_PRONOUNCE+infjit in[1:&LANGUAGE]. |
| 3RD TEMPLATE (CHINESE) | 我根本不能用 [2:&VB_PRONOUNCE] [1:&LANGUAGE]。 |

FIG.73

| TEMPLATE ID | 1971-1_23 |
|---|---|
| 1ST TEMPLATE (JAPANESE) | [1:&LANGUAGE]で全然[2:&VB_INTERPRET+v.kanou]ません。 |
| 2ND TEMPLATE (ENGLISH) | I can't [2:&VB_INTERPRET+infit into[1:&LANGUAGE]. |
| 3RD TEMPLATE (CHINESE) | 我根本不能用[2:&VB_INTERPRET][1:&LANGUAGE]。 |

FIG.74

| TEMPLATE ID | 1971-1_31 |
|---|---|
| 1ST TEMPLATE (JAPANESE) | [1:&LANGUAGE]で[2:&VB_EXPLAIN+v.kanou]ません。 |
| 2ND TEMPLATE (ENGLISH) | I can't [2:&VB_EXPLAIN+inf] it in[1:&LANGUAGE]. |
| 3RD TEMPLATE (CHINESE) | 我根本不能用[2:&VB_EXPLAIN]清楚[1:&LANGUAGE]。 |

FIG.75

| TEMPLATE ID | 1971-1_32 |
|---|---|
| 1ST TEMPLATE (JAPANESE) | [1:&LANGUAGE]で[2:&VB_PRONOUNCE+v.kanou]ません。 |
| 2ND TEMPLATE (ENGLISH) | I can't [2:&VB_PRONOUNCE+infl it in[1:&LANGUAGE]. |
| 3RD TEMPLATE (CHINESE) | 我根本不能用[2:&VB_PRONOUNCE][1:&LANGUAGE]。 |

FIG.76

| TEMPLATE ID | 1971-1_33 |
|---|---|
| 1ST TEMPLATE (JAPANESE) | [1:&LANGUAGE]で[2:&VB_INTERPRET+v.kanou]ません。 |
| 2ND TEMPLATE (ENGLISH) | I can't [2:&VB_INTERPRET+inf]it into[1:&LANGUAGE]. |
| 3RD TEMPLATE (CHINESE) | 我根本不能用[2:&VB_INTERPRET][1:&LANGUAGE]。 |

FIG.77

| | |
|---|---|
| 彼は何を飲みますか？ | —W11 |
| 彼 | —W12 |
| 何 | —W13 |
| 飲む | —W14 |
| マ行五段 | —W19 |
| 五段 | —W20 |
| 下一段 | —W21 |
| 未然形 | —W22 |
| 連体形 | —W23 |
| 連用形1 | —W26 |
| む | —W32 |
| た | —W38 |
| だ | —W39 |

FIG.78

| INPUT SENTENCE 0 | 札幌から来ました。 |
|---|---|

| MORPHEME | 札幌 \| から \| 来る \| ます \| た \| 。 |
|---|---|

FIG.80

| EXAMPLE SENTENCE 1 | 東京から来ました。 |

FIG.81

```
        W94  W91  W92
         ↓    ↓    ↓
```
| MORPHEME | 東京 | から | 来る | ます | た | 。 |

FIG.82

| EXAMPLE SENTENCE 2 | 札幌から来た東です。 |

FIG.83

```
        W93  W91  W92
         ↓    ↓    ↓
```
| MORPHEME | 札幌 | から | 来る | た | 東 | です | 。 |

INFORMATION PROCESSING DEVICE, METHOD AND PROGRAM

TECHNICAL FIELD

The present invention relates to information processing device, information processing method, program and computer-readable recording medium recording the program, which can obtain a translation of an input sentence.

BACKGROUND ART

Conventionally, translation apparatuses for machine-translating a sentence input by a user to a different language have been known.

Main approaches in machine translations include rule-based approach and example-based approach. Outlines of these two approaches will be briefly described.

In the rule-based approach, translation is done using a word dictionary and rules and processes including grammar rules, semantic processing and generative rules.

In the rule-based approach, in principle, any sentence can be an object of translation as long as the word dictionary stores sufficient number of words. Even if an input sentence includes a word not in the word dictionary (unknown word), a method to handle such an unknown word is established in each system adopting such an approach.

On the other hand, the rule-based approach is not free from analytical error. If there is an error in the analysis, correct translation does not result. Even if the result of analysis is correct, the user may feel the generated translation awkward, as it is synthesized from the rules and dictionary.

In the example-based approach, translation is done using, for example, parallel translation examples and matching means for finding a match between an input sentence and a translation example. The parallel translation examples may include some auxiliary information such as grammar information representing types of parts of speech.

In the example-based approach, sentences established as correct and natural expressions are used and, therefore, if an input sentence matches any parallel translation example, it is possible to obtain a correct and natural translation result.

On the other hand, since the number of parallel translation examples is limited, a translation example that matches the input sentence cannot always be found. In such a case, translation is impossible using this approach only. Therefore, if there is no parallel translation that perfectly matches the input sentence, a process is required to find a parallel translation not perfectly matching but similar to the input sentence, and to address the difference between the parallel translation and the input sentence using some means. Such a process, however, possibly leads to lower translation accuracy.

In the following, processing in a translation apparatus taking the example-based approach will be described in detail.

In the example-based translation apparatus, a plurality of example sentences in Japanese (hereinafter referred to as Japanese Examples) and English translations of the Japanese Examples (hereinafter referred to as English Examples) are stored in correspondence with each other.

In the translation apparatus as such, if a Japanese sentence is to be translated to English, a matching process between the Japanese sentence and the Japanese Examples is executed, so that one Japanese Example is selected from the plurality of Japanese Examples. Thereafter, in the translation apparatus, an English Example corresponding to the selected Japanese Example is read from the storage unit.

It is not always the case that a Japanese sentence input by the user perfectly matches the selected Japanese Example.

Therefore, in the translation apparatus described above, the selected Japanese Example and the English Example corresponding to the Japanese Example are used as Examples as a base (hereinafter referred to as Base Examples) for translating the input sentence, and a unique process, which is different apparatus by apparatus, is executed on unmatched portions.

Japanese Patent Laying-Open No. 2006-012168 (Patent Document 1) discloses one such unique process.

According to the method described in this reference, if a portion of the input sentence differing from a corresponding portion of the Japanese Example is identified, said portion of the input sentence is designated as an input unmatched portion, and the corresponding portion of the Japanese Example is designated as a Base Example unmatched portion.

Thereafter, according to the method, the input unmatched portion is used to select a set of subsidiary example sentences (a set of Japanese and English Examples), and possible translation candidates corresponding to the input unmatched portion are determined from the set of example sentences. By this method, according to a prescribed selection algorithm, one candidate is selected from among the candidates. The selected translation candidate is used to replace the Base Example unmatched portion of the translation Base Examples.

Japanese Patent Laying-Open No. 2002-278964 discloses a translation supporting apparatus including a (rule-based) machine translation apparatus, an (example-based) translation memory, and a similar sentence translation unit.

In the translation supporting apparatus, when translation request is made to the translation memory, the similar sentence translation unit searches in a parallel translation database for a similar sentence using the input sentence. Further, the similar sentence translation unit passes the input sentence to the machine translation apparatus. Then, the similar sentence translation unit obtains the result of analysis of the input sentence from the machine translation apparatus, and compares the result of analysis of the input sentence with the similar sentence.

Thereafter, based on the result of comparison, the similar sentence translation unit transmits a word/phrase of the input sentence differing from the similar sentence to the machine translation apparatus, and obtains a parallel translation word/phrase of the differing word/phrase. Then, the similar sentence translation unit replaces the word/phrase differing from the input sentence in the parallel translation of the similar sentence with the obtained parallel translation word/phrase. As a result, in the translation supporting apparatus, differing portions in the parallel translation results are automatically modified through coordination with the machine translation apparatus and, hence, it is unnecessary for the user to make corrections.

Patent Document 1: Japanese Patent Laying-Open No. 2006-012168

Patent Document 2: Japanese Patent Laying-Open No. 2002-278964

DISCLOSURE OF THE INVENTION

Problems to be Solved by the Invention

According to Patent Document 1, however, degree of matching of character strings themselves compared based on n-gram or on morpheme level is an important factor of the matching process described above and, therefore it is difficult to solve the following problem.

FIG. 78 shows an input sentence 0. FIG. 79 shows morphemes of input sentence 0. FIG. 80 shows an example sentence 1. FIG. 81 shows morphemes of example sentence 1. FIG. 82 shows an example sentence 2. FIG. 83 shows morphemes of example sentence 2.

Assume, for example, that the input sentence is input sentence 0. Further assume that example sentences 1 and 2 as Japanese Examples are stored in the parallel translation database.

Here, degree of similarity between input sentence 0 and example sentence 1 or 2 is compared. Syntactically and semantically, example sentence 1 clearly has the higher degree of similarity. If comparison is made focusing on main morphemes (those considered to have meanings in the sentence), however, example sentence 2 in which word/phrase W93 (noun) and words/phrases W91 and W92 match is considered to have higher degree of similarity than example sentence 1 in which only word/phrase W91 (postpositional word function as an auxiliary to a main word) and word/phrase W92 (verb) match (see FIGS. 79, 81 and 83).

Based on n-gram (n=1), the degree of similarity of example sentence 1 is 77.8% (7/{(9+9)/2}×100), and the degree of similarity of example sentence 2 is 84.2% (8/{(9+10)/2}× 100). Therefore, it follows that example sentence 2 has higher degree of similarity than example sentence 1. In a language having no space between words such as Japanese, comparison is done on meaningless character-by-character basis and, therefore, calculation of the degree of similarity has low reliability. Therefore, the degrees of similarity mentioned above are not of much help.

Word/phrase W94 (noun) shown in FIG. 81 and word/phrase W93 are both names of places. Therefore, these two are considered to be conceptually similar words. In the technique of Patent Document 1, matching process is done taking into account the conceptual similarity as in most ordinary example-based translation approaches. However, since degree of matching on the morpheme level is considered to be more reliable, example sentence 2 could be erroneously selected as a result.

Even if fine-tuning is done to increases the ratio of conceptual similarity, it is not the case that optimal Base Example is selected without fail, as long as general degree of similarity is determined based on a prescribed scoring algorithm.

If the matching ratio between the character strings of the input sentence and example sentences in the parallel translation database is low, it is possible that Base Examples are not selected at all.

Unless optimal Base Examples are selected, it is impossible to generate optimal translations.

In the method according to Patent Document 2, results of parsing between the input sentence and the example sentence (similar sentence) are used for matching. Therefore, a machine translation apparatus (of rule-based approach) is necessary to perform such parsing and, hence, it is not free of analytical error.

Assume that pieces of information having parsing errors modified manually are stored in the parallel translation database. Even then, at least it is necessary to parse the input sentence at the time of executing translation and, therefore, there is still a possibility of error.

Specifically, since the method of Patent Document 2 jointly uses the rule-based approach described in the background section, it involves the disadvantages of the approach as well.

When portions not matched (unmatched portions) are to be translated using the method of Patent Document 1 or Patent Document 2, a process is done based on parallel translation frequency information in the parallel translation database, dictionary, rules and the like. Such processing is also limited.

By way of example, when translation from Japanese to English is done, it could be difficult to consider co-occurrence relation with other matched portions, if local translation of only an unmatched portion is done, resulting in failure of semantically appropriate word selection.

In either case, local translation based on dictionary and rules possibly fails to generate 100% correct English translation because of errors in handling numerical information, counter suffixes or article information.

The present invention was made to solve the above-described problems, and its object is to provide optimal translation of a sentence input to the apparatus.

Means for Solving the Problems

According to an aspect, the present invention provides an information processing device, including: a reading unit for reading, from a storage device storing a template in a first language and a template in a second language corresponding to the template, the template in the first language and the template in the second language; wherein the template in the first language and the template in the second language include a fixed portion consisting of a prescribed word/phrase and a variable portion replaceable by any of a predetermined plurality of words/phrases, at positions corresponding to each other; the information processing device further including: a determining unit for determining, as regards a plurality of templates in the first language read by the reading unit, whether or not a word/phrase included in a sentence input in the first language through an input device matches any of the prescribed word/phrase and the predetermined plurality of words/phrases; a selecting unit for selecting at least one template from the plurality of templates, based on the result of the determination; and a replacing unit, if a template including a variable portion replaceable by the matched word/phrase is selected by the selecting unit, in a template in the second language corresponding to the selected template read by the reading unit, for replacing a variable portion corresponding to the variable portion replaceable by the matched word/phrase by a word/phrase in the second language corresponding to the matched word/phrase.

Preferably, the apparatus includes a display control unit for displaying at least a result of translation of the sentence input in the first language, based on the template in the second language after replacement by the replacing unit on a display device.

Preferably, if a template in the first language is selected by the selecting unit, the replacing unit replaces the variable portion replaceable by the matched word/phrase by the matched word/phrase; and the display control unit displays an image based on the template in the first language after replacement by the replacing unit on the display device.

Further, preferably, the variable portion has a prescribed identification indicator provided in a corresponding manner; and the predetermined plurality of words/phrases are words/phrases specified by the prescribed identification indicator.

Preferably, the storage device stores dictionary data in the first language and dictionary data in the second language, and in the dictionary data in the first language, all or some of the words/phrases included in the dictionary data are each classified to belong to at least one group; and the prescribed identification indicator is an indicator indicating a prescribed group of the plurality of groups.

Preferably, the dictionary data stored in the storage device includes data related to thesaurus, and the classification is done based on the data related to thesaurus; and the prescribed group represents words/phrases included in a prescribed classification defined in the data related to thesaurus.

Further, preferably, the storage device stores, for each of the predetermined plurality of words/phrases of the variable portion of the template in the first language, a translated word/phrase in the second language in a corresponding manner; and the replacing unit replaces the variable portion of the template in the second language by the translated word/phrase in the second language stored in the corresponding manner in the storage device.

Preferably, the variable portion of the template in the first language and the variable portion of the template in the second language corresponding to the variable portion have information related to inflection of a word/phrase provided in a corresponding manner; and the replacing unit changes word form of the replaced word/phrase based on the information related to inflection.

Preferably, the template in the second language includes, as the variable portion, a first variable portion and a second variable portion; and the replacing unit replaces the first variable portion by a word/phrase in the second language, and determines a word/phrase of the second variable portion in accordance with the replaced word/phrase.

Preferably, the first variable portion may include a sign representing relation to the second variable portion; and if the first variable portion includes the sign, the replacing unit determines a word/phrase of the second variable portion in accordance with the replaced word/phrase, for the second variable portion specified by the sign.

Preferably, if the selected template in the first language and the template in the second language corresponding to the template each include a plurality of variable portions, the determining unit determines, in selecting a template in the first language, whether or not the extracted word/phrase matches any of the predetermined plurality of words/phrases, for each of the variable portions.

Preferably, the storage device includes a first template for generating a template in the first language, and a second template for generating a template in the second language corresponding to the template in the first language; the reading unit reads the first template and the second template from the storage device; and the information processing device further includes a generating unit for generating a plurality of templates in the first language and a plurality of templates in the second language corresponding to the templates, based on the read first template and the second template, and storing the generated templates in the first and second languages in the storage device.

Preferably, the first template and the second template include a first portion consisting of a prescribed word/phrase, and a second portion for which any of a predetermined plurality of elements can be selected, at corresponding positions; and the generating unit generates, by successively selecting the element at positions corresponding to each other in the first template and the second template, in the first template and in the second template, a plurality of templates in the first language and a plurality of template in the second language corresponding to the templates.

Further, preferably, the element is the variable portion.

According to another aspect, the present invention provides an information processing method, including the step of: reading, from a storage device storing a template in a first language and a template in a second language corresponding to the template, the template in the first language and the template in the second language; wherein the template in the first language and the template in the second language include a fixed portion consisting of a prescribed word/phrase and a variable portion replaceable by any of a predetermined plurality of words/phrases, at positions corresponding to each other; the method further including the steps of: determining, as regards the read plurality of templates in the first language, whether or not a word/phrase included in a sentence input in the first language through an input device matches any of the prescribed word/phrase and the predetermined plurality of words/phrases; selecting at least one template from the plurality of templates, based on the result of determination; and if a template including a variable portion replaceable by the matched word/phrase is selected, in a template in the second language corresponding to the selected template read by the reading unit, replacing a variable portion corresponding to the variable portion replaceable by the matched word/phrase by a word/phrase in the second language corresponding to the matched word/phrase.

According to a further aspect, the present invention provides a program causing a computer to execute an information processing method, the information processing method including the step of: reading, from a storage device storing a template in a first language and a template in a second language corresponding to the template, the template in the first language and the template in the second language; wherein the template in the first language and the template in the second language include a fixed portion consisting of a prescribed word/phrase and a variable portion replaceable by any of a predetermined plurality of words/phrases, at positions corresponding to each other; the method further including the steps of: determining, as regards the read plurality of templates in the first language, whether or not a word/phrase included in a sentence input in the first language through an input device matches any of the prescribed word/phrase and the predetermined plurality of words/phrases; selecting at least one template from the plurality of templates, based on the result of determination; and if a template including a variable portion replaceable by the matched word/phrase is selected, in a template in the second language corresponding to the selected template read by the reading unit, replacing a variable portion corresponding to the variable portion replaceable by the matched word/phrase by a word/phrase in the second language corresponding to the matched word/phrase.

According to a still further aspect, the present invention provides a computer readable recording medium recording a program, wherein the program causes a computer to execute an information processing method; and the information processing method includes the step of: reading, from a storage device storing a template in a first language and a template in a second language corresponding to the template, the template in the first language and the template in the second language; wherein the template in the first language and the template in the second language include a fixed portion consisting of a prescribed word/phrase and a variable portion replaceable by any of a predetermined plurality of words/phrases, at positions corresponding to each other; the method further includes the steps of: determining, as regards the read plurality of templates in the first language, whether or not a word/phrase included in a sentence input in the first language through an input device matches any of the prescribed word/phrase and the predetermined plurality of words/phrases; selecting at least one template from the plurality of templates, based on the result of determination; and if a template including a variable portion replaceable by the matched word/phrase is selected, in a template in the second language corresponding to the selected template read by the reading unit, replacing a variable portion corresponding to the variable portion replaceable by the matched word/phrase by a word/phrase in the second language corresponding to the matched word/phrase.

Effects of the Invention

The present invention attains the effect that optimal translation of a sentence input to the apparatus can be obtained.

BRIEF DESCRIPTION OF THE DRAWINGS

FIG. 3 shows a configuration of template data included in a template database stored in the storage device.

FIG. 4 shows a configuration of dictionary data included in a dictionary database stored in the storage device.

FIG. 5 shows a Japanese inflection form table stored in the storage device.

FIG. 6 shows a configuration of category data included in a category database stored in the storage device.

FIG. 8 shows a configuration of another category data included in the category database mentioned above.

FIG. 9A shows a configuration of co-occurrence relation data included in a co-occurrence relation database stored in the storage device.

FIG. 9B shows a configuration of another co-occurrence relation data included in the co-occurrence relation database stored in the storage device.

FIG. 10 shows various buffers in a memory of the translation apparatus.

FIG. 14 shows a configuration of data stored in an extracted word/phrase buffer.

FIG. 16 shows configurations of temporary template data stored in a temporary template data buffer.

FIG. 17 shows template data stored in a processed sentence storage buffer.

FIG. 18 shows data stored in a slot portion buffer.

FIG. 19 shows data stored in a co-occurrence portion buffer.

FIG. 21 shows a configuration of slot information stored in a temporary slot buffer.

FIG. 22 shows dictionary data stored in a temporary dictionary buffer.

FIG. 23 shows data stored in a temporary word/phrase buffer.

FIG. 24 shows data after the change of word form, stored in the temporary word/phrase buffer.

FIG. 25 shows template data in the middle of a replacing process at the slot portion, stored in the processed sentence storage buffer.

FIG. 26 shows slot information in the middle of the replacing process at the slot portion, stored in the slot portion buffer.

FIG. 27 shows template data with the replacing process at the slot portion completed, stored in the processed sentence storage buffer.

FIG. 28 shows slot information with the replacing process at the slot portion completed, stored in the slot portion buffer.

FIG. 30 shows a piece of co-occurrence information stored in a temporary first co-occurrence buffer 81.

FIG. 31 shows a configuration of another piece of co-occurrence information stored in temporary first co-occurrence buffer 81.

FIG. 32 shows a configuration of slot information stored in the temporary slot buffer.

FIG. 33 shows data stored in the temporary word/phrase buffer.

FIG. 34 shows template data in the middle of the replacing process at a co-occurrence portion stored in the processed sentence storage buffer.

FIG. 35 shows co-occurrence information stored in a priority co-occurrence buffer.

FIG. 36 shows slot information stored in the temporary slot buffer.

FIG. 37 shows co-occurrence information stored in a temporary second co-occurrence buffer.

FIG. 38 shows word/phrase stored in the temporary word/phrase buffer.

FIG. 39 shows template data with the replacing process at the co-occurrence portion completed, stored in the processed sentence storage buffer.

FIG. 40 shows example sentence data stored in the processed sentence storage buffer.

FIG. 41 shows a configuration of template data stored in the template database.

FIG. 42 shows examples of word/phrase replaced at the slot portion of the Japanese template in the template data of FIG. 41.

FIG. 43 shows dictionary data stored in the dictionary database.

FIG. 45 shows a configuration of a generated English template.

FIG. 46 shows a configuration of template data stored in the template database.

FIG. 47 shows examples of word/phrase replaced at the slot portion of Japanese template in the template data shown in FIG. 46.

FIG. 48 shows dictionary data stored in the dictionary database.

FIG. 50 shows a configuration of a generated English template.

FIG. 51 shows a configuration of template data stored in a template database 60.

FIG. 52 shows examples of word/phrase replaced at the slot portion of Japanese template in the template data shown in FIG. 51.

FIG. 53 shows dictionary data stored in the dictionary database.

FIG. 55 shows a configuration of a generated English template.

FIG. 57 shows a configuration of one template data included in another template database.

FIG. 62 shows a state of an element buffer after an element is written by the first-time process of step S2113.

FIG. 63 shows one template data after storage in a pending buffer.

FIG. 64 shows another template data after storage in the pending buffer.

FIG. 65 shows a further template data after storage in the pending buffer.

FIG. 66 shows a state of the element buffer after an element is written by the second-time process of step S2113.

FIG. 67 shows the state of the element buffer after the first-time process of step S2117.

FIG. 68 shows template data of FIG. 63 overwritten using element 1 shown in FIG. 67.

FIG. 69 shows template data of FIG. 63 overwritten using element 2 shown in FIG. 67.

FIG. 70 shows template data of FIG. 63 overwritten using element 3 shown in FIG. 67.

FIG. 71 shows template data of FIG. 64 overwritten using element 1 shown in FIG. 67.

FIG. 72 shows template data of FIG. 64 overwritten using element 2 shown in FIG. 67.

FIG. 73 shows template data of FIG. 64 overwritten using element 3 shown in FIG. 67.

FIG. 74 shows template data of FIG. 65 overwritten using element 1 shown in FIG. 67.

FIG. 75 shows template data of FIG. 65 overwritten using element 2 shown in FIG. 67.

FIG. 76 shows template data of FIG. 65 overwritten using element 3 shown in FIG. 67.

FIG. 77 shows Japanese sentence, Japanese word/phrase or Chinese word/phrase.

FIG. 78 shows input sentence 0.

FIG. 79 shows morphemes of input sentence 0.

FIG. 80 shows example sentence 1.

FIG. 81 shows morphemes of example sentence 1.

FIG. 82 shows example sentence 2.

FIG. 83 shows morphemes of example sentence 2.

DESCRIPTION OF THE REFERENCE SIGNS 1 translation apparatus, 1A translation apparatus, 10 input unit, 11 output unit, 12 control unit, 12A control unit, 13 storage device, 13A storage device, 14 memory, 14A memory, 20 extracting unit, 22 determining unit, 23 selecting unit, 24 replacing unit, 25 display control unit, 26 output sentence refining unit, 27 generating unit, 40 dictionary searching unit, 41 slot replacing unit, 42 co-occurrence replacing unit, 43 word form change searching unit, 44 not-yet-input portion replacing unit.

BEST MODES FOR CARRYING OUT THE INVENTION

In the present embodiment, translation of an input Japanese sentence to English and Chinese will be described as an example. The present invention is not limited thereto, and it is applicable to any configuration of translating an input sentence of a language to another language.

Japanese has "inflection." "Inflection" refers to a variation in the word form of a word in accordance with its grammatical function or connection to another word in a sentence. The varied form of a word that inflects is referred to as "inflected form." Further, the tail portion of a word that varies by the inflection of a word (a portion other than the stem of the word) is referred to as "inflected suffix."

A translation apparatus in accordance with an embodiment of the present invention will be described in the following with reference to FIGS. 1 to 77.

Figure 1:
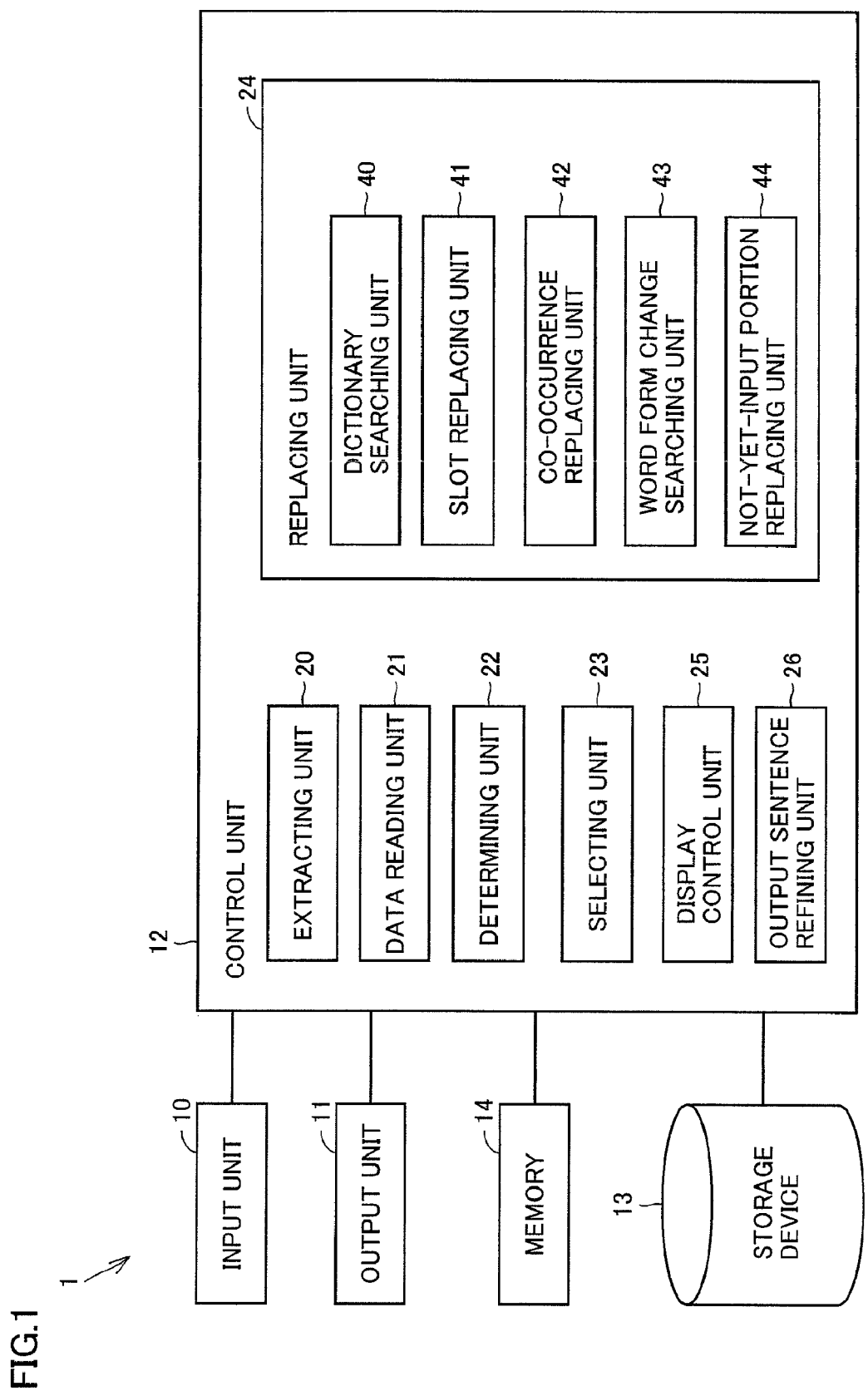
FIG. 1 shows a schematic configuration of a translation apparatus in accordance with an embodiment of the present invention.

FIG. 1 shows a schematic configuration of a translation apparatus 1 in accordance with an embodiment of the present invention.

As shown in the figure, translation apparatus 1 includes an input unit 10, an output unit 11, a control unit 12, a storage device 13 and a memory 14.

Input unit 10 is an input device for receiving an input from a user. When the user inputs a sentence through input unit 10, the input sentence is stored in memory 14.

Output unit 11 is a device for displaying the data input through input unit 10 and the results of various processes by control unit 12, based on an instruction from control unit 12.

Control unit 12 includes, as shown in the figure, an extracting unit 20, a data reading unit 21, a determining unit 22, a selecting unit 23, a replacing unit 24, a display control unit 25, and an output sentence refining unit 26. Replacing unit 24 includes a dictionary searching unit 40, a slot replacing unit 41, a co-occurrence replacing unit 42, a word form change searching unit 43, and a not-yet-input portion replacing unit 44.

It is noted that control unit 12 and various units in control unit 12 are functional blocks, and processes by these blocks are realized by software executed by a CPU (Central Processing Unit), which will be described later.

Extracting unit 20 extracts a word/phrase in accordance with a prescribed rule, from the sentence input in Japanese (first language) through input unit 10. By way of example, if a sentence W11 (see FIG. 77) is input through input unit 10, extracting unit 20 extracts, by performing, for example, morphological analysis, three words/phrases (morphemes), that is, a word/phrase W12 (noun), a word/phrase W13 (noun) and a word/phrase W14 (verb). FIG. 77 shows a Japanese sentence, Japanese words/phrases or Chinese words/phrases.

Here, the word/phrase represents a word or phrase, and the word/phrase may include a word (generally, the smallest unit or segment forming a sentence defined to have a specific meaning or a grammatical function) and a complex word (generally defined as two or more words combined to represent one meaning).

Data reading unit 21 reads various data stored in storage device 13, upon reception of a prescribed instruction. By way of example, data reading unit 21 reads template data, which will be described later, from storage device 13.

Determining unit 22 determines whether or not the a word/phrase included in the sentence input in Japanese through input unit 10 matches a word/phrase that will be described later. Details of the method of determination by determining unit 22 will be described later.

Selecting unit 23 selects, based on the result of determination by determining unit 22, at least one template from a plurality of templates in Japanese stored in storage device 13.

Replacing unit 24 performs a replacing process, which will be described later, to form an example sentence in Japanese using the selected template. Further, using a template in English (second language) and a template in Chinese (third language) corresponding to the selected template stored in storage device 13, replacing unit 24 forms example sentences in English and in Chinese. Details of the process performed by replacing unit 24 and processes performed by various units (40~43) included in replacing unit 24 will be described later. Here, the example sentence refers to a sentence obtained by completing replacement of a variable portion of a template data, which will be described later, with a word/phrase.

Display control unit 25 causes output unit 11 to display data input through input unit 10, and results of various processes in translation apparatus 1. Output sentence refining unit 26 will be described later.

Figure 2:
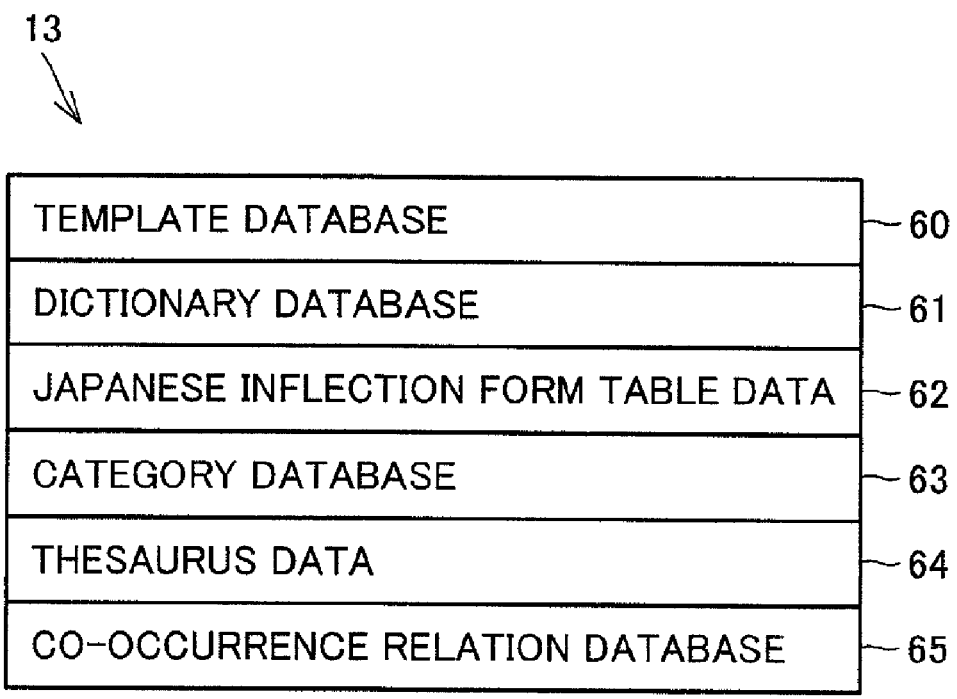
FIG. 2 shows data stored in a storage device of the translation apparatus.

FIG. 2 shows data stored in storage device 13.

As shown in the figure, storage device 13 stores a template database 60, a dictionary database 61, a Japanese inflection form table 62, a category database 63, thesaurus data 64, and a co-occurrence relation database 65.

Template database 60 includes one or more template data, which will be described later. Dictionary database 61 includes dictionary data, which will be described later. Category database 63 includes one or more category data, which will be described later. Co-occurrence relation database 65 includes one or more co-occurrence relation data, which will be described later.

FIG. 3 shows a configuration of one template data included in template database 60. As shown in the figure, the template data includes a template ID, a template in Japanese (hereinafter referred to as a Japanese template), a template in English (hereinafter referred to as an English template), and a template in Chinese (hereinafter referred to as a Chinese template).

The template ID is an identifier for identifying a template data from other template data. As the template ID, a unique number is allocated to each template data.

The Japanese template mentioned above includes a fixed portion consisting of a prescribed word/phrase, and a variable portion that can be replaced by any of a predetermined plurality of words/phrases. In the example shown in the figure, word/phrase W15 (postpositional word functioning as an auxiliary to main word) and sentence W16 are fixed portions, and {1:&HUMAN-SUBJ} and {2:&VB_EAT+v.ren1} are variable portions.

Similar to the Japanese template, the English template mentioned above also includes a fixed portion and a variable portion. In the example shown in the figure, "What" and "?" are the fixed portions, and {-i:be_AUX+pres}, {-i:#DET_MY-NULL}, {1-i:&HUAMN-SUBJ} and {2:&VB_EAT+ing} are variable portions.

Variable portions include different types, i.e., a first variable portion and a second variable portion. In the example shown in the figure, in the English template, portions starting with numerals, such as {1-i:&HUAMN-SUBJ} and {2:&VB_EAT+ing} starting with "1" and "2" correspond to the first variable portion, and portions starting with "-i", such as {-i:be_AUX+pres} and {-i:#DET_MY-NULL} correspond to the second variable portion. In the following, for convenience of description, the first variable portion will be referred to as a slot portion, and the second variable portion will be referred to as a co-occurrence portion.

In the templates of respective languages, the variable portion including "-i" indicates that the corresponding variable portions have the relation of co-occurrence. Here, the co-occurrence relation refers to such a relation that when one is determined, the other is also determined, or a relation that even if one is tentatively determined, a change to the determined contents is forced by the relation with the other. Namely, it refers to a relation in which one and the other are determined together.

As shown in the figure, the Chinese template also includes fixed and variable portions, similar to the Japanese and English templates.

As described above, the Japanese template and the English template (or Chinese template) are configured to have fixed portions consisting of prescribed words/phrases and variable portions that can be replaced to any of a predetermined plurality of words/phrases, at positions corresponding to each other.

In the following, the numeral such as "1" or "2" at the start of a variable portion will be referred to as a slot number. Further, in each variable portion, the part excluding the characters before ":" and excluding characters after "+" (in the shown example, "be_AUX", "#DET_MY-NULL", "&HUMAN-SUBJ" and "&VB_EAT") will be referred to as a label (prescribed identification indicator). Further, among the labels, each label (label starting with "&") related to the slot portion will represent one category.

Details of the slot portion and the co-occurrence portion will be described later.

FIG. 4 shows a configuration of one dictionary data included in dictionary database 61. As shown in the figure, in the dictionary data, a dictionary ID, an entry, a part of speech, inflection, a counter suffix code and a semantic code are included, in correspondence with each other.

In the box of dictionary ID, an identifier (ID) for distinguishing the dictionary data from other dictionary data is described. In the boxes of entry, a word/phrase W14 (verb) as a Japanese word/phrase, an English word/phrase "drink" and a word/phrase W17 (verb) as a Chinese word/phrase, corresponding to the word/phrase above, are described. Further, in the box of part of speech, the part of speech of each entry is described. In the box of inflection, information related to the inflection of the word/phrase of each of the languages mentioned above is described. The meaning of word/phrase W18 is that the word/phrase W14 has the inflection form (five-tire conjugation in the "ma" column of the kana syllabary) indicated by word/phrase W19 (see FIG. 77). The semantic code will be described later.

Further, as shown in the figure, in correspondence with a Japanese word/phrase, only one English word/phrase and only one Chinese word/phrase are described.

FIG. 5 shows Japanese inflection form table 62 mentioned above. Japanese inflection form table 62 describes: type of inflection (for example, the inflection (five-tire conjugation of a Japanese consonant-stem verb) of word/phrase W20 (see FIG. 77) and the inflection (conjugation of a vowel-stem verb ending in "eru") of word/phrase W21); and each of inflection forms of the corresponding inflection (for example, words/phrases (for example, word/phrase W24 (inflected suffix) and word/phrase W25 (inflected suffix) used in the inflection of word/phrase W22 (form of a verb preceding "nai") and the inflection of word/phrase W23 (attributive form of a verb)). In the figure, word/phrase of each inflection exhibited by word/ phrase W19 (that is, word/phrase W18 (see FIG. 4)) is shown as an example. Further, for a word/phrase of the inflection (continuative form of a verb) given as word/phrase W26, a sign of an abbreviation such as "ren1" is added.

FIG. 6 shows a configuration of one category data included in the category database mentioned above. As shown in the figure, the category data includes a category ID, a label name, a semantic code and a representative value, in correspondence with each other.

In the box of category ID, an identifier for distinguishing the category data from other category data is described. In the box of label name, a label included in the variable portion of a template data (for example, the template data shown in FIG. 3) is described. The representative value will be described later.

Figure 7:
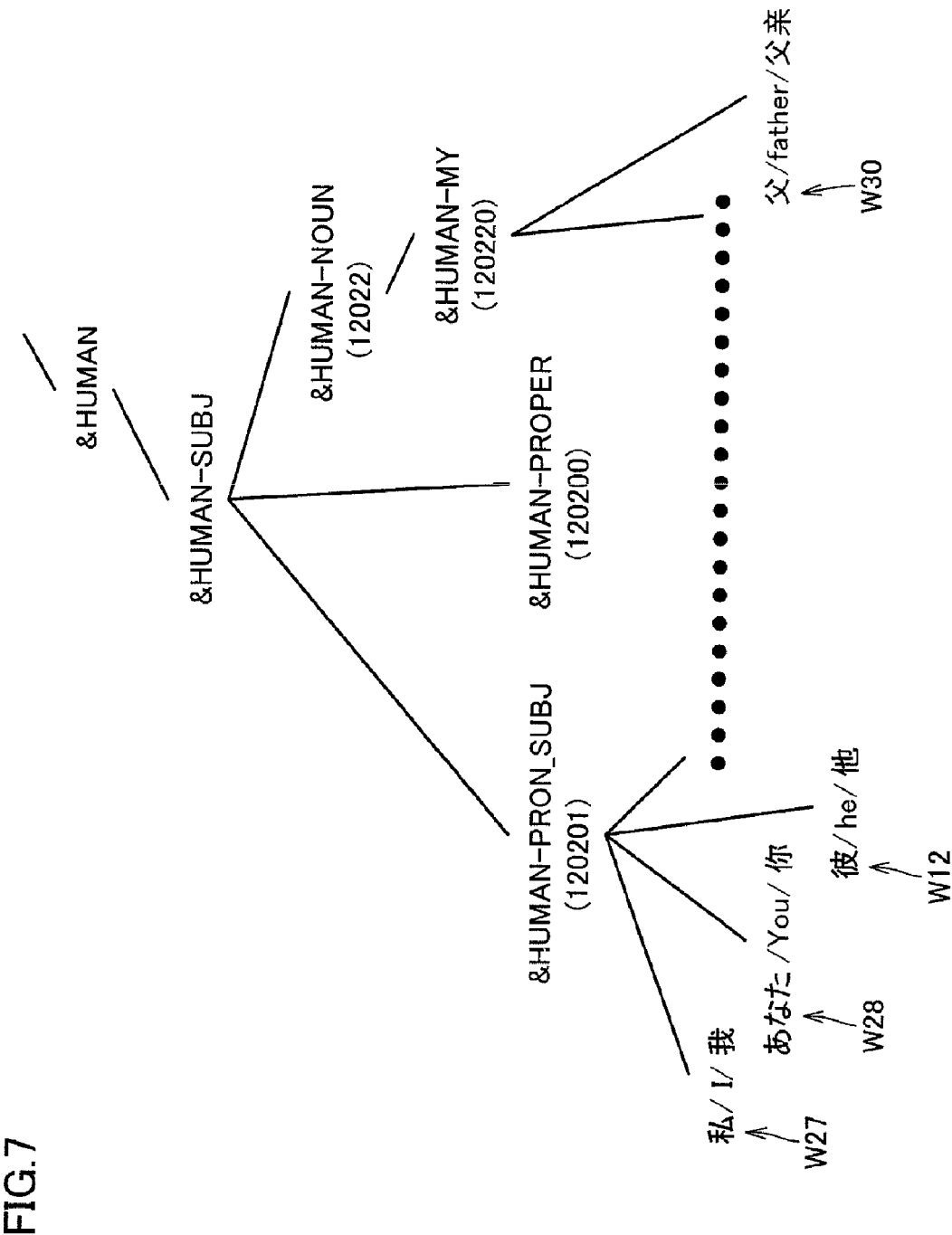
FIG. 7 shows part of a hierarchical structure of thesaurus data stored in the storage device.

FIG. 7 shows a part of a hierarchical structure of the thesaurus data. Here, the thesaurus refers to a dictionary (lexicon) in which words are classified and organized in accordance with hypernymy/hyponymy relation, meronymy relation, synonymy relation, holynymy relation and the like.

First, the semantic code mentioned above is adapted to correspond to the label mentioned above. By way of example, in the figure, a semantic code "120201" corresponds to the label "&HUMAN-PRON_SUBJ".

Here, for a category data having label name "&HUMAN-PRON_SUBJ" and semantic code of "120201", a word/phrase included in a classification (prescribed classification) of "&HUMAN-PRON_SUBJ(120201)" is specified as the word/phrase included in the category data. By way of example, for Japanese words/phrases, word/phrase W27 (noun), word/phrase W28 (noun) and word/phrase W12 are specified.

Returning to FIG. 6, the representative value will be described. As shown in the figure, in the category data having a label "&VB_EAT" and semantic code "52500", a plurality of sets of Japanese, English and Chinese are included. Words/phrases of a prescribed set among the plurality of sets are set as representative values. In the figure, word/phrase W29 (verb), "eat", word/phrase W14, "drink", word/phrase W17 and the like are described as representative values.

In the template data shown in FIG. 3, {2:&VB_EAT+v.ren1} and {2:&VB_EAT+ing} are included, for example, as the variable portions. Here, in the thesaurus data, words/phrases included in the classification of "&VB_EAT(52500)" are specified as words/phrases that can replace {2:&VB_EAT+v.ren1} and {2:&VB_EAT+ing}. The same applies to other variable portions.

FIG. 8 shows a configuration of another category data included in the category database described above. Here, translation apparatus 1 specifies words/phrases included in the classification "&HUMAN-SUBJ" in the thesaurus data shown in FIG. 7 as replaceable words/phrases. In the example shown in the figure, as regards Japanese, translation apparatus 1 specifies word/phrase W27, word/phrase W28, word/phrase W12 and word/phrase W30 (noun) and the like as replaceable words/phrases.

As described above, the variable portion is configured to be replaceable by any of the predetermined plurality of words/phrases. In the following, a set of replaceable words/phrases will also be referred to as candidates.

FIG. 9A shows a configuration of co-occurrence relation data included in the co-occurrence relation database. FIG. 9B shows a configuration of another co-occurrence relation data included in the co-occurrence relation database mentioned above. As can be seen from FIGS. 9A and 9B, in the co-occurrence relation data, the language, label name and co-occurrence conditions are associated with each other. In the box of language, the type such as Japanese, English or Chinese is described. In the box of label, a label described in the co-occurrence potion mentioned above is described.

Further, in the boxes of co-occurrence conditions of FIG. 9A, correspondence relation between a word/phrase used in the slot portion (for example, "I") and the characters used in the co-occurrence portion when the said word/phrase is used (for example, "am") is described. In the box of co-occurrence conditions in FIG. 9B, correspondence relation between the label in the slot portion mentioned above (for example, "&HUMAN-MY") and the characters (for example, "my") used in the co-occurrence portion when the label is designated as the conditions is described.

FIG. 10 shows various buffers in memory 14.

As shown in the figure, memory 14 includes: an extracted word/phrase buffer 70; a search result template buffer 71; a slot portion buffer 72; a co-occurrence portion buffer 73; a priority co-occurrence buffer 74; a processed sentence storage buffer 75; a translation result buffer 76; a temporary template buffer 77; a temporary dictionary buffer 78; a temporary word/phrase buffer 79; a temporary slot buffer 80; a temporary first co-occurrence buffer 81; a temporary second co-occurrence buffer 82; and an input sentence buffer 83. Data stored in each of the buffers will be described later.

It is not always necessary that the areas dedicated for the various buffers mentioned above are prepared in memory 14. What is necessary is that the buffer areas that become necessary during a process are successively ensured in memory 14.

Figure 11:
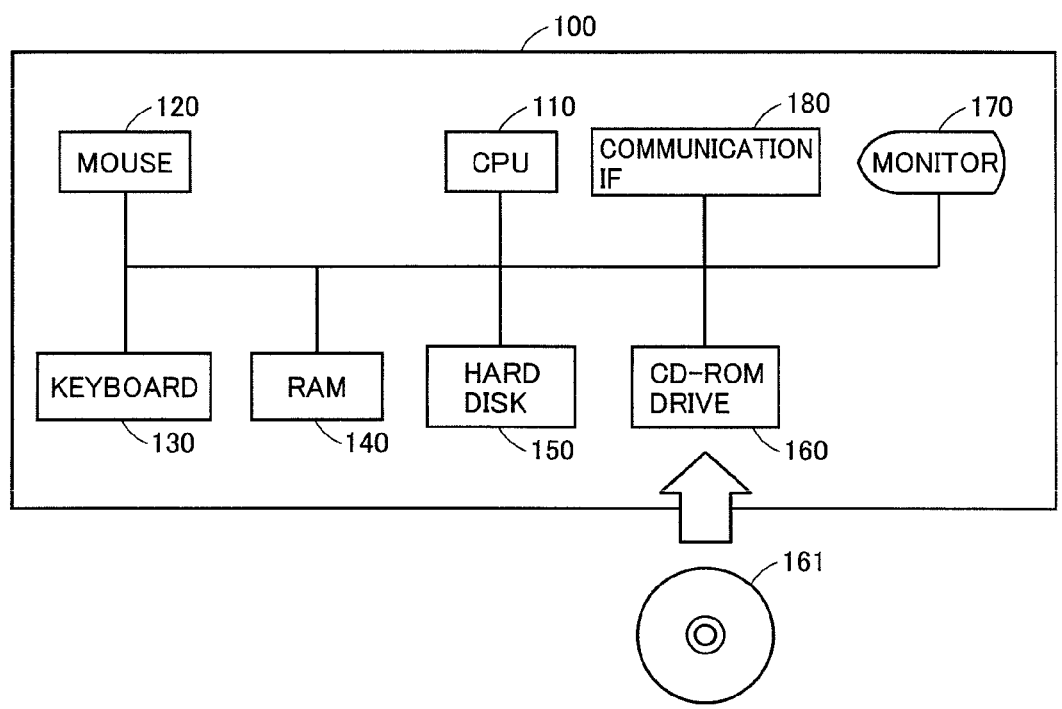
FIG. 11 shows an example of a specific configuration of the translation apparatus.

Referring to FIG. 11, an exemplary configuration of translation apparatus 1 in accordance with the present embodiment will be described. This figure shows a hardware configuration of computer system 100 functioning as translation apparatus 1.

Computer system 100 includes, as main components: a CPU 110 executing programs; a mouse 120 and a keyboard 130 for receiving an instruction input from a user of computer system 100; an RAM 140 for storing data generated by the execution of a program by CPU 110 or storing data input through mouse 120 or keyboard 130, in a volatile manner; a hard disk 150 for storing data in a non-volatile manner; a CD-ROM (Compact Disk-Read Only Memory) drive 160; a monitor 170; and a communication IF (Interface) 180. These components are connected to each other by a data bus. To CD-ROM drive 160, a CD-ROM 161 is loaded.

Input unit 10 of translation apparatus 1 corresponds to keyboard 130 and mouse 120, output unit 11 corresponds to monitor 170, storage device 13 corresponds to hard disk 150, and memory 14 corresponds to RAM 140.

The process in computer system 100 is realized by hardware and software executed by CPU 110. The software may be stored in advance in hard disk 150. Alternatively, the software may be stored in CD-ROM 161 or other storage medium and distributed as a program product, or the software may be offered as a downloadable program product by an information provider connected to the Internet. The software as such is read from the storage medium by a reading device such as CD-ROM drive 160, or downloaded through communication IF 180, and once stored in hard disk 150. The software is read by CPU 110 from hard disk 150, and stored in RAM 140 in the form of an executable program. CPU 110 executes the program.

Each of the components forming computer system 100 shown in the figure is a common component. Therefore, we can say that the essential parts of translation apparatus 1 are implemented by software stored in a storage medium such as RAM 140, hard disk 150 or CD-ROM 160, or software downloadable through a network. Hardware operations of computer system 100 are well known and, therefore, detailed description thereof will not be repeated.

The storage medium is not limited to CD-ROM, FD (Flexible Disk) or hard disk. Any medium that fixedly carry a program may be used, including a magnetic tape, a cassette tape, an optical disk (MO (Magnetic Optical Disc,)/MD (Mini Disk)/DVD (Digital Versatile Disc)), an IC (Integrated Circuit) card (including a memory card), an optical card, or a semiconductor memory such as a mask ROM, an EPROM (Electronically Programmable Read-Only Memory), an EEPROM (Electronically Erasable Programmable Read-Only Memory) and a flash ROM.

The program mentioned here includes not only a program that can be directly executable by the CPU but also a source-program, a compressed program, an encrypted program and the like.

The configuration described above is only an example of the specific configuration, and a configuration not having the mouse but having the keyboard, monitor and hard disk provided in translation apparatus 1 may be used. Translation apparatus 1 may be implemented as a portable information terminal such as an electronic dictionary or a portable telephone.

If translation apparatus 1 is formed as such a portable information terminal, a flash memory may be used in place of hard disk 150. Further, a touch-pen type input device may be provided as the input unit. Further, in view of size reduction, a thin monitor such as a liquid crystal monitor or an organic EL monitor may suitably be used as monitor 170. Further, from the viewpoint of size reduction, a device for reading a memory card may be provided in place of the CD-ROM drive, and the memory card may suitably be used as the recording medium in place of the CD-ROM.

Here, specific flow of the process in translation apparatus 1 will be described based on FIGS. 12 to 40. Further, in the following, what data are formed as a result of processing at each step of the process flow will be described with reference to specific examples.

Figure 12:
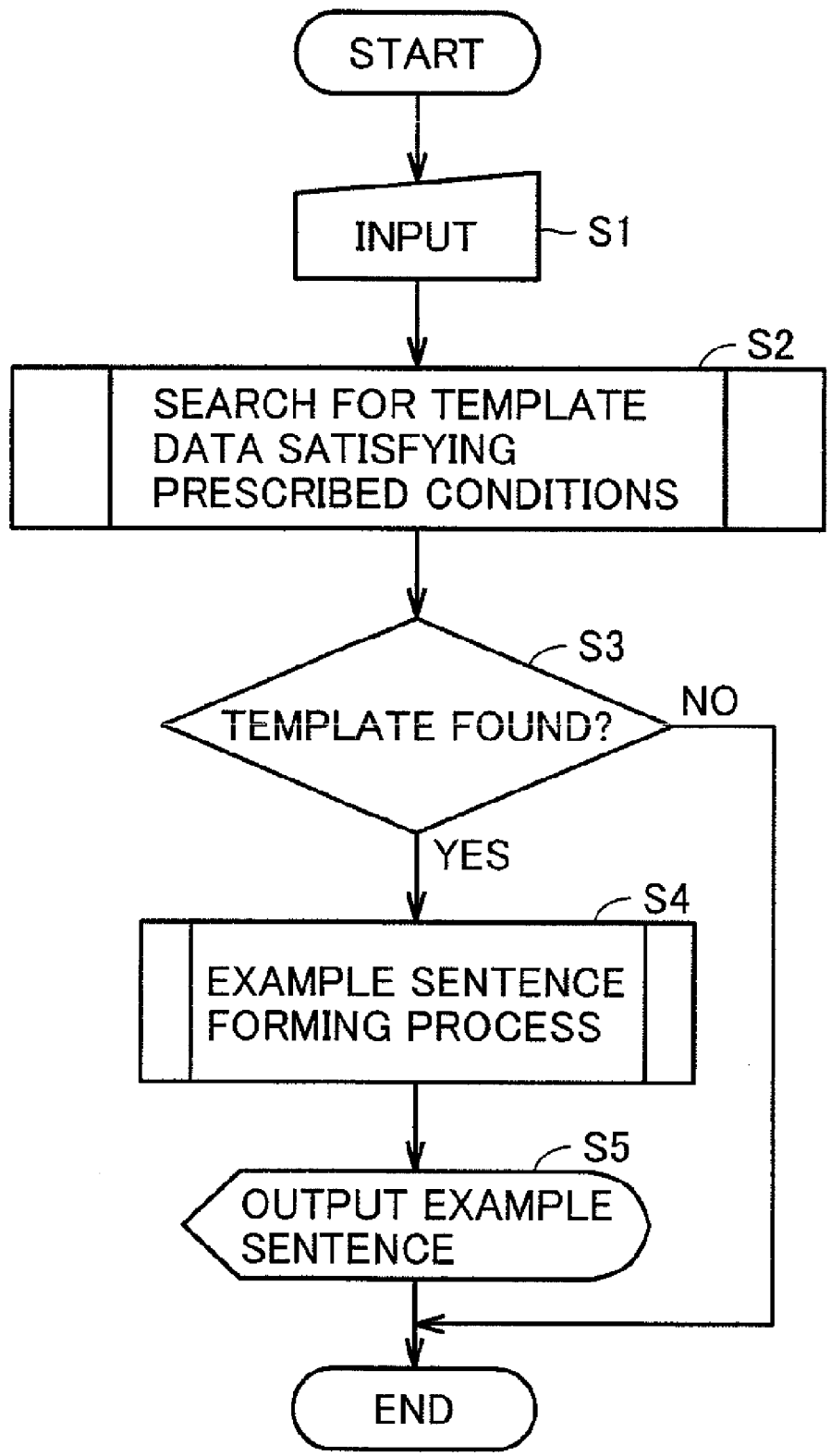
FIG. 12 is a flowchart showing an outline of the process in the translation apparatus.

FIG. 12 is a flowchart schematically showing the process in translation apparatus 1.

First, a Japanese sentence is input to translation apparatus 1 through input unit 11 (S1). The input sentence is temporarily stored in input sentence buffer 83 of memory 14. After step S1, control unit 12 searches for template data satisfying prescribed conditions, in template database 60 (S2).

After step S2, whether or not a template data satisfying the prescribed conditions exists is determined by control unit 12 (S3). If it is determined at step S3 that the template exists, control unit 12 causes the process to proceed to an example sentence forming process of step S4. If it is determined at step S3 that a template data does not exist, control unit 12 ends the process.

At step S4, replacing unit 24 forms, using the template data, a Japanese example sentence, and an English example sentence and a Chinese example sentence corresponding to the Japanese example sentence. After step S4, display control unit 25 displays example sentences of respective languages on output unit 11 (S5).

In the foregoing, a configuration has been described in which the template data include Japanese, English and Chinese templates, and example sentences of respective languages are formed using the templates of respective languages. The configuration, however, is not limited to the above.

By way of example, the following configuration may be possible. Specifically, when a user wants to know a result of translation of a Japanese sentence to English, the user may transmit a prescribed instruction to translation apparatus 1 through input unit 10, and then translation apparatus 1 displays a Japanese example sentence and an English example sentence, without showing a Chinese example sentence. Specifically, translation apparatus 1 need not output the language to which translation is considered unnecessary by the user, on output unit 11. Further, translation apparatus 1 may be configured not to perform the process of forming an example sentence in the unnecessary language in such a situation.

Next, details of the template search at step S2 above will be described with reference to FIGS. 13 and 14.

Figure 13:
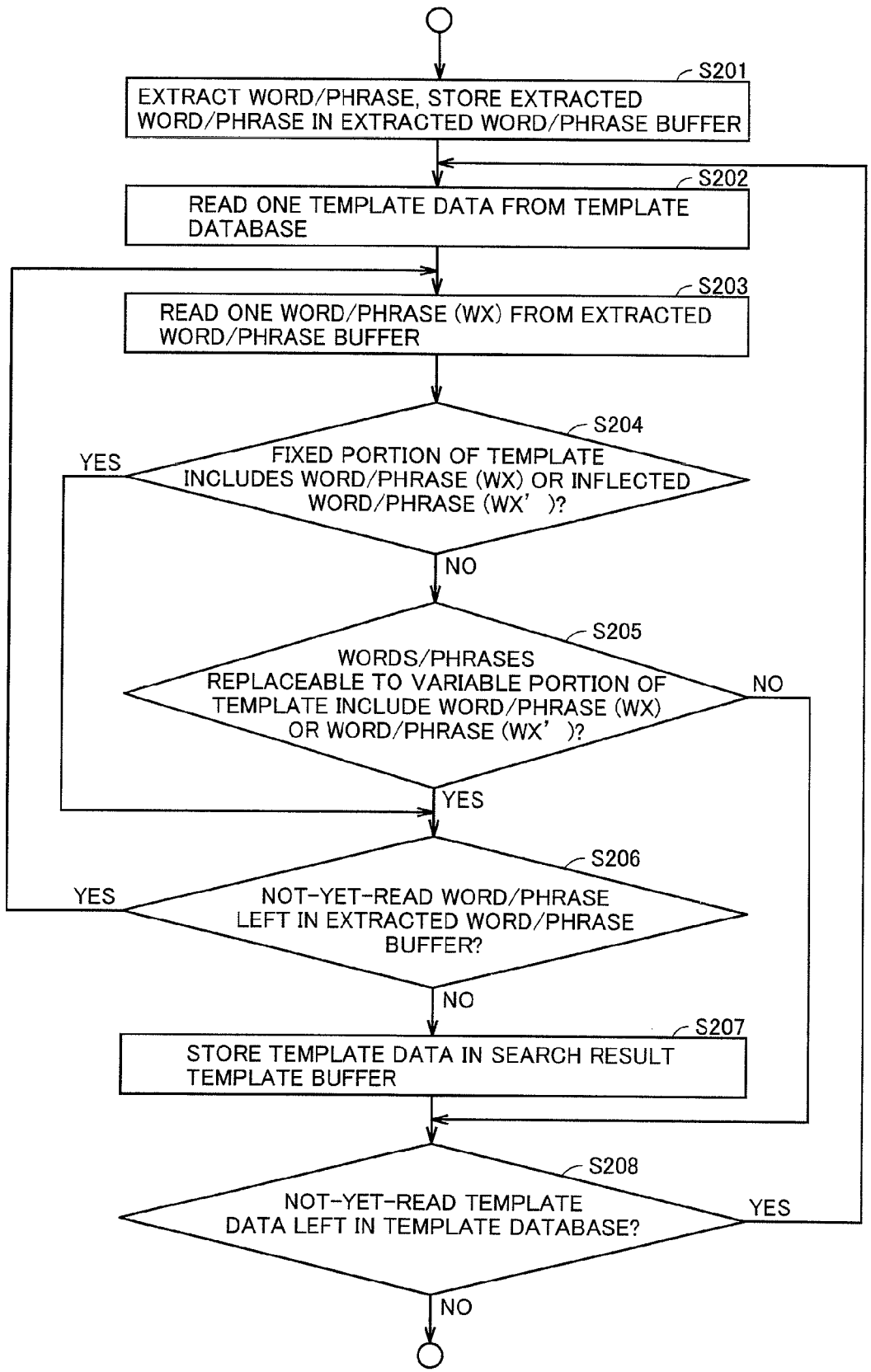
FIG. 13 is a flowchart representing a process flow in a template search.

FIG. 13 is a flowchart representing the process flow of the template search. FIG. 14 shows a data configuration stored in extracted word/phrase buffer 70.

First, extracting unit 20 extracts a word/phrase in accordance with the prescribed rule as described above from the input Japanese sentence, and stores the extracted word/phrase to extracted word/phrase buffer 70 (S201). By way of example, if a sentence W11 (see FIG. 77) is input, extracted words/phrases (word/phrase W14, word/phrase W12, word/phrase W13) are stored in the boxes of word/phrase (Japanese) in association with the word/phrase number, as shown in FIG. 14. The word/phrase number is a number for identifying each of the extracted words/phrases. In the following, for convenience of description, an extracted word/phase will be denoted as word/phrase (WX).

After step S201, data reading unit 21 reads one template data from template database 60 (S202). After step S202, control unit 12 reads one word/phrase (WX) from extracted word/phrase buffer 70 (S203).

After step S203, determining unit 22 determines whether or not the fixed portion of the Japanese template in the read template data includes the read word/phrase (WX) or a word/phrase (WX') that represents an inflection of the read word/phrase (WX) (S204). For determining whether or not the word/phrase (WX') exists, the information in the inflection boxes of dictionary data and the Japanese inflection table are used.

At step S204, if it is determined that the word/phrase exists, control unit 12 causes the process to proceed to step S206. If it is determined at step S204 that it does not exist, determining unit 22 determines whether or not the words/phrases that can replace the variable portion of the Japanese template (specifically, the candidates) include the read word/phrase (WX) or the word/phrase (WX') (S205).

If it is determined at step S205 that it exists, control unit 12 causes the process to proceed to step S206. If it is determined at step S205 that it does not exist, control unit 12 causes the process to proceed to step S208.

At S206, control unit 12 determines whether or not a not-yet-read word/phrase is left in extracted word/phrase buffer 70. If it is determined at S206 that a not-yet-read word/phrase exists, control unit 12 returns the flow to step S203. If it is determined at S206 that it does not exist, selecting unit 23 has the template data stored in search result template buffer 71 (S207). In this manner, by selecting unit 23, a template data satisfying prescribed conditions is selected from the plurality of template data, and stored in search result template buffer 71. After step S207, control unit 12 causes the process to proceed to step S208.

At step S208, control unit 12 determines whether or not a not-yet-read template data is left in template database 60. If it is determined at S208 that such data exists, control unit 12 returns the flow to step S202. If it is determined at step S208 that such data does not exist, control unit 12 causes the process flow to proceed to step S13 of FIG. 12.

Next, details of the example sentence forming process at step S4 will be described with reference to FIGS. 15 to 19.

Figure 15:
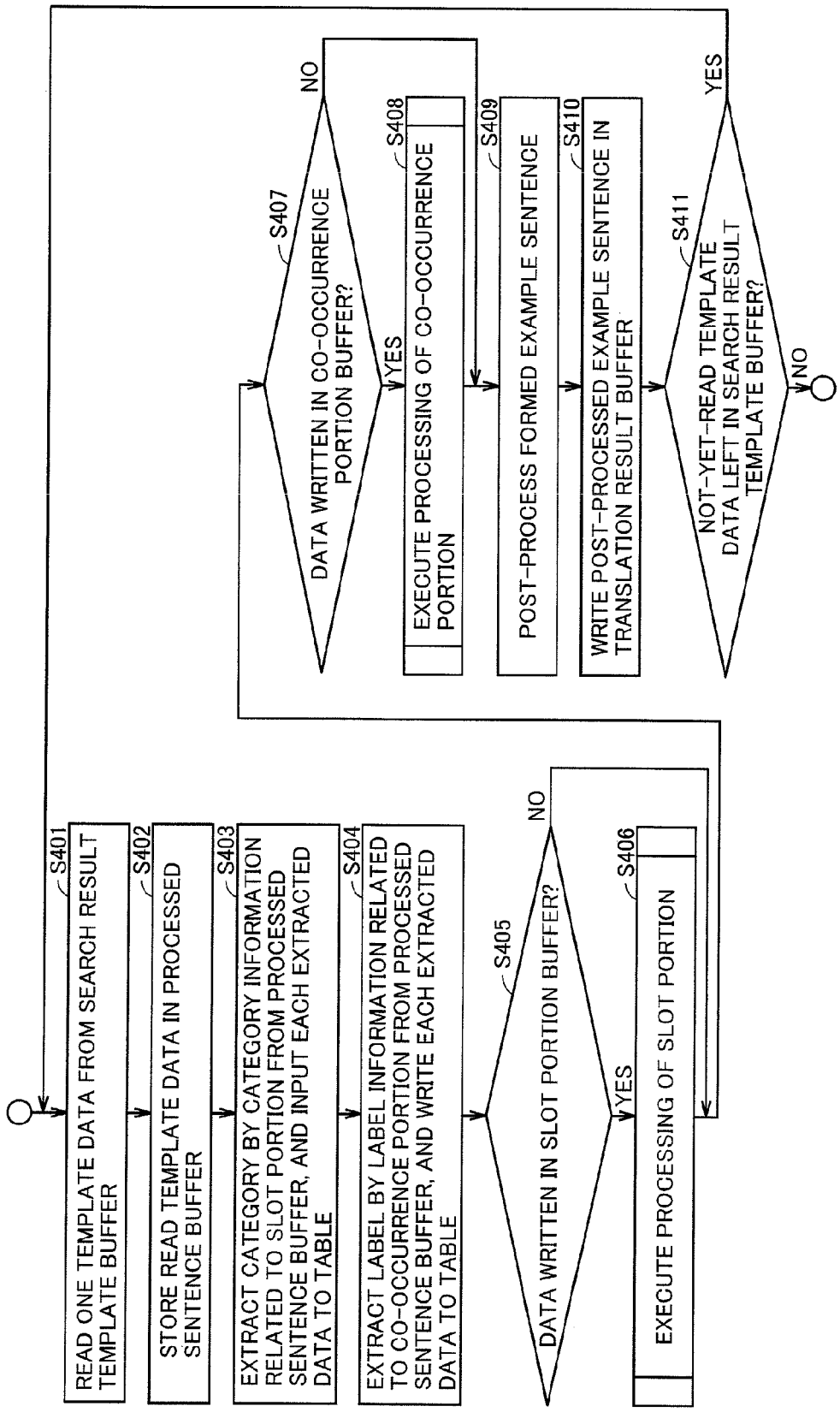
FIG. 15 is a flowchart representing a process flow in an example sentence forming process.

FIG. 15 is a flowchart representing a process flow of the example sentence forming process.

First, control unit 12 reads one template data from search result template buffer 71, and has the read template data stored in temporary template buffer 77 (S401). By way of example, if a template data such as shown in FIG. 3 is stored in search result template buffer 71, control unit 12 has the template data with a result number added stored in temporary template buffer 77 as shown in FIG. 16. The result number is a number for identifying a template data among a plurality of template data, and it is added when a template data is stored in search result template buffer 71.

After step S401, control unit 12 stores the read template in processed sentence storage buffer 75 (S402). At step S402, by way of example, control unit 12 causes the data with the result number and template ID removed from the template data shown in FIG. 16 to be stored in processed sentence storage buffer 75. FIG. 16 shows a configuration of temporary template data stored in temporary template data buffer 77. FIG. 17 shows a template data stored in processed sentence storage buffer 75.

After step S402, control unit 12 extracts information related to the slot portion category by category (that is, label starting with "&") from processed sentence storage buffer 75, and inputs each extracted data to a prescribed portion of a table having a prescribed form (S403).

By the process of step S403, as regards the example of data shown in FIG. 17, a slot number, a category corresponding to the slot number, and information of respective languages (inflection information and co-occurrence flag information) are stored in association with each other, in slot portion buffer 72 as shown in FIG. 18. The boxes of inflection information, co-occurrence flag and word/phrase for replacement include language-by-language boxes (hereinafter referred to as "small boxes"). FIG. 18 shows data stored in slot portion buffer 72.

Here, control unit 12 writes in the box of inflection information, the character strings following "+" of the slot portion, for each language. By way of example, control unit 12 writes "v.ren1" of {2:&VB_EAT+v.ren1} in the box of inflection information of Japanese template, and writes "ing" of {2:&VB_EAT+ing} in the box of inflection information of English template.

Further, if a sign "-i" is attached to the slot portion, control unit 12 writes "i" in the small box (in the figure, small box for English) related to the slot portion, of the co-occurrence flag box of the figure. Here, the sign represents relation to other variable portion. The box of word/phrase for replacement and the box of already-processed flag of the figure will be described later.

Further, in the following, for convenience of description, information consisting of one category and language-by-language pieces of information related to the category, including the inflection information, co-occurrence information and word/phrase for replacement described above, will be referred to as slot information. The example shown in FIG. 18 includes slot information related to "&HUMAN_SUBJ" and slot information related to "&VB_EAT."

After step S403, control unit 12 extracts the information related to the co-occurrence portion label by label (that is, label starting with "&") from processed sentence storage buffer 75, and writes each extracted data in the prescribed portion of the table of a prescribed form (S404).

By the process of step S404, as regards the example of data shown in FIG. 17, the co-occurrence number, label, language, priority processing flag, word/phrase for replacement and co-occurrence flag are stored in association with each other, as shown in FIG. 19, in co-occurrence portion buffer 73. FIG. 19 shows data stored in co-occurrence portion buffer 73.

Here, the co-occurrence number is a number added to distinguish the co-occurrence portion label by label. The language indicates which language template the template including the co-occurrence portion specified by the label name is. In other words, the language is a piece of information indicating which language is used in the co-occurrence portion specified by the label name.

The priority processing flag mentioned above is a flag used when the co-occurrence portion, which will be described later, is formed. As shown in the English template of FIG. 17, if "#" is added behind ":" of the co-occurrence portion, a flag "1" is set in the box of priority processing flag of FIG. 19 related to the label of co-occurrence portion.

In the following, for convenience of description, information consisting of one label and the information related to the label including the language, priority processing flag, word/phrase for replacement and co-occurrence flag, will be referred to as co-occurrence information. The example of FIG. 19 includes co-occurrence information related to "be_AUX" and co-occurrence information related to "DET_MY-NULL".

After step S404, control unit 12 determines whether or not any data is written in slot portion buffer 72 (S405). If it is determined at step S405 that data is written, replacing unit 24 executes the process of the slot portion (S406). After step S406, control unit 12 causes the process to proceed to step S407. Details of step S406 will be described later.

If it is determined at step S405 that no data is written, control unit 12 causes the process to proceed to step S407. The reason why control unit 12 determines whether or not any data is written at step S405 is that some template data does not have any slot portion.

At step S407, control unit 12 determines whether or not any data is written in co-occurrence portion buffer 73. If it is determined at step S407 that data is written, replacing unit 24 executes the process of co-occurrence unit (S408). After step S408, control unit 12 causes the process to proceed to step S409. Details of step S408 will be described later.

If it is determined at step S407 that no data is written, control unit 12 causes the process to proceed to step S409. The reason why control unit 12 determines whether or not any data is written at step S407 is that some template data does not have any co-occurrence portion.

At step S409, output sentence refining unit 26 performs post-processing of the example sentences formed by processing the slot portion and the co-occurrence portion. Details of the process will be described later. The example sentences include Japanese, English and Chinese example sentences. Specifically, by replacing unit 24 and output sentence refining unit 26, example sentences corresponding to the templates of respective languages are formed.

After step S409, control unit 12 writes the post-processed example sentences in translation result buffer 76 (S410). After step S410, control unit 12 determines whether or not any not-yet-read template data is left in search result template buffer 71 (S411).

If it is determined at step S411 that such data exists, control unit 12 returns the process to step S401. If it is determined at step S411 that such data does not exist, control unit 12 causes the process to proceed to step S5 of FIG. 12.

Next, details of the process of slot portion at step S406 will be described with reference to FIGS. 20A, 20B and 21 to 28.

Figure 20A:
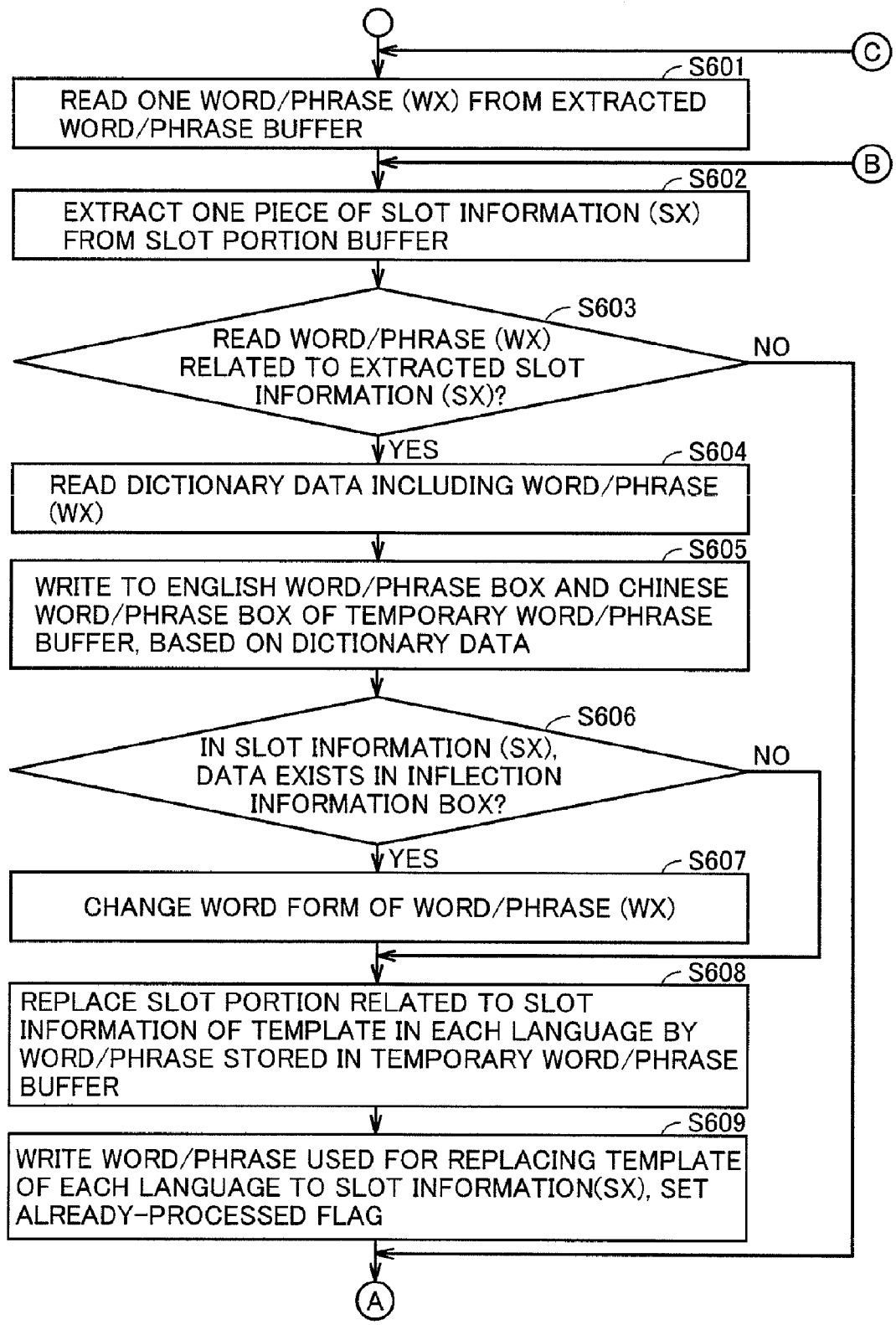
FIG. 20A is a flowchart representing a former half of a process flow of processing the slot portion of template data.
Figure 20B:
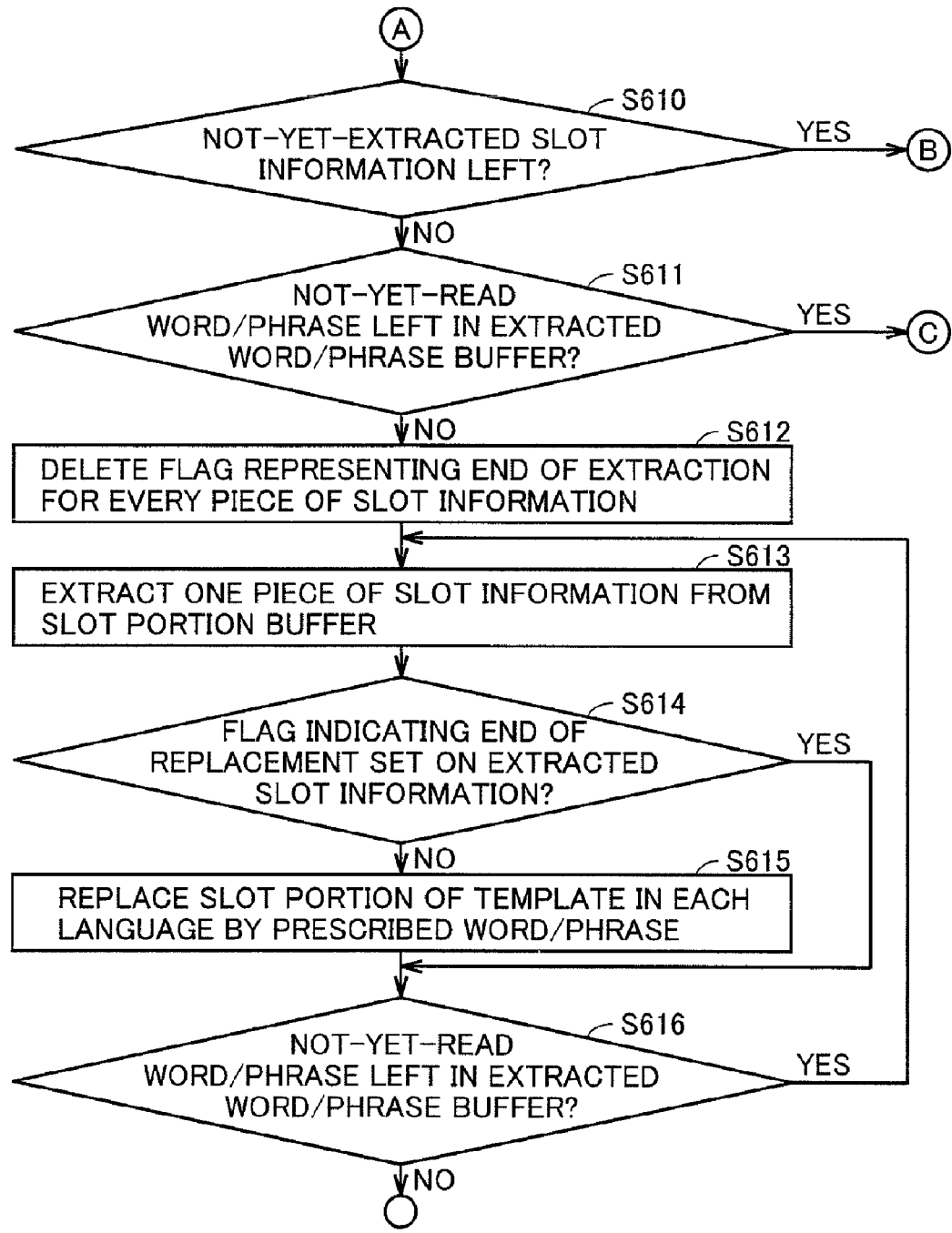
FIG. 20B is a flowchart representing a latter half of a process flow of processing the slot portion of template data.

FIG. 20A is a flowchart representing a former half of the process flow of processing the slot portion. FIG. 20B is a flowchart representing a latter half of the process flow of processing the slot portion.

First, slot replacing unit 41 reads one word/phrase (WX) from extracted word/phrase buffer 70, and writes the read word/phrase (WX) to temporary word/phrase buffer 79 (S601). By way of example, if word/phrase W14, word/phrase W12 and word/phrase W13 are stored in extracted word/phrase buffer 70 as shown in FIG. 14, slot replacing unit 41 reads the words/phrases in the order of word/phrase number shown in the figure. Here, slot replacing unit 41 first reads word/phrase W14. The configuration of temporary word/phrase buffer will be described later.

After S601, slot replacing unit 41 extracts one piece of slot information described above from slot portion buffer 72, and writes it in temporary slot buffer 80 (S602). By way of example, slot replacing unit 41 first extracts the piece of slot information related to "&HUMAN-SUBJ" from slot buffer 73 shown in FIG. 18. For the extracted piece of slot information, control unit 12 sets a flag (not shown) indicating that it has already been extracted by slot replacing unit 41. In the following, for the convenience of description, the piece of slot information stored in temporary slot buffer 80 as described above will be denoted as slot information (SX).

After step S602, slot replacing unit 41 determines whether or not the word/phrase (WX) written in temporary word/phrase buffer 79 is a word/phrase related to the extracted slot information (SX) (S603).

Specifically, the determination at step S603 is as follows. Assume that as the word/phrase (WX), word/phrase W14 (see FIGS. 14 and 77) has been read, and the slot information related to "&HUMAN-SUBJ" has been extracted as the slot information (SX). Here, slot replacing unit 41 looks up the thesaurus data shown in FIG. 7, to determine whether or not word/phrase W14 is included in the words/phrases classified to "&HUMAN-SUBJ". Since word/phrase W14 does not exist among the words/phrases included in the classification "&HUMAN-SUBJ", slot replacing unit 41 determines at step S603 that the word/phrase (WX) written to temporary word/phrase buffer 79 is not a word/phrase related to the extracted slot information (SX).

If it is determined at step S603 that it is a related word/phrase, control unit 12 causes the process to proceed to step S604. If it is determined at step S603 that it is not a related word/phrase, control unit 12 causes the process to proceed to step S610.

For convenience of description, prior to the description of steps S604 to S609, step S610 will be described.

At step S610, slot replacing unit 41 determines whether or not any piece of not-yet-extracted slot information is left in slot portion buffer 72. If it is determined at step S610 that such piece of slot information is left, control unit 12 causes the process to proceed to step S602. If it is determined at step S610 that such slot information does not exist, control unit 12 causes the process to proceed to step S611.

Here, in the example above, the piece of slot information related to "&HUMAN-SUBJ" has been extracted, while the piece of slot information related to "&VB_EAT" has not yet been extracted. Therefore, slot replacing unit 41 determines at step S610 that a piece of slot information is left. Then, at step S602, slot replacing unit 41 extracts the piece of slot information related to "&VB_EAT" at step S602, as shown in FIG. 21. FIG. 21 shows a configuration of slot information stored in temporary slot buffer 80.

Here, it follows that slot replacing unit 41 determines at step S603 whether or not the word/phrase W14 (WX) written to temporary word/phrase buffer 79 is a word/phrase related to the slot information related to "&VB_EAT". As described above, here, slot replacing unit looks up the thesaurus data shown in FIG. 7 to determine whether word/phrase W14 exists among the words/phrases of the classification of "&VB_EAT". Actually, word/phrase W14 exists among the words/phrases included in the classification of "&VB_EAT" and, therefore, slot replacing unit 41 determines at step S603 that the word/phrase (WX) written to temporary word/phrase buffer 79 is a word/phrase related to the extracted slot information (SX). As a result, control unit 12 causes the process to proceed to step S604.

Steps S604 to S609 will be described. In the description of steps S604 to S609, by way of example, it is assumed that word/phrase W14 has been read as the word/phrase (WX) and the piece of slot information related to "&VB_EAT" has been extracted as slot information (SX).

At step S604, dictionary searching unit 50 reads dictionary data including the word/phrase (WX) from dictionary database 61, and writes the read dictionary data to temporary dictionary buffer 78. Further, after step S604, slot replacing unit 41 writes data of English and Chinese written to the entry boxes of the temporary dictionary data, to the English and Chinese word/phrase boxes of temporary word/phrase buffer 79 (S605). After step S605, control unit 12 causes the process to proceed to step S606.

Steps S604 and S605 will be described with reference to specific examples in the following. First, at step S604, dictionary searching unit 50 writes dictionary data including word/phrase W14 (WX), as shown in FIG. 22, to temporary dictionary buffer 78. FIG. 22 shows dictionary data stored in temporary dictionary buffer 78. Here, the English data written to the entry box is "drink" and the Chinese data is word/phrase W17. Therefore, at step S605, slot replacing unit 41 writes "drink" and word/phrase W17 to the English and Chinese word/phrase boxes of temporary word/phrase buffer 79, respectively, as shown in FIG. 23. FIG. 23 shows data stored in temporary word/phrase buffer 79.

At step S606, word form change searching unit 43 determines whether or not any data is written in the box of inflection information, in the slot information (SX) written in temporary slot buffer 80. If it is determined at step S606 that data is written, slot replacing unit 41 changes the word form of the word/phrase (WX) in temporary word/phrase buffer 79, using the inflection information, the data in the inflection box of temporary dictionary buffer 78 and the Japanese inflection form table 62 shown in FIG. 5 (S607). Further, at step S607, slot replacing unit 41 changes the word forms of the English word/phrase and Chinese word/phrase corresponding to the word/phrase (WX), in temporary word/phrase buffer 79, using the inflection information. After step S607, the flow proceeds to step S608.

Steps S606 and S607 will be described with reference to specific examples in the following. First, as shown in FIG. 21, there is a piece of slot information (SX) related to "&VB_EAT" in temporary slot buffer 80 and, therefore, slot replacing unit 41 confirms the boxes of inflection information of the slot information. Here, in the boxes of inflection information, "v.ren1" indicating conjunctive form 1 of a verb is written for Japanese, and "ing" representing progressive form is written for English.

For word/phrase W14 (WX), in the box of inflection of temporary dictionary data shown in FIG. 22, a word/phrase W18 is written, indicating that it has the inflection represented by word/phrase W19 (see FIG. 77). Therefore, using the information represented by word/phrase W18 and the information "v.ren1", slot replacing unit 41 obtains the word/ phrase used for that inflection from Japanese inflection form table 62 shown in FIG. 5 (in this example, it obtains a word/phrase W31 (inflected suffix)). Then, slot replacing unit 41 replaces a word/phrase W32 (inflected suffix) of word/phrase W14 in temporary word/phrase buffer 79 by the obtained word/phrase W31 (see FIGS. 23, 77).

Further, for the word/phrase "drink", based on the information of "ing" in temporary slot buffer 80, slot replacing unit 41 obtains the information "*ing" from the box of inflection of temporary dictionary buffer 78. The information "*ing" represents that the word/phrase "drink" of the entry box of temporary dictionary buffer 78 should be inserted to the portion "*". Therefore, slot replacing unit 41 replaces "drink" in temporary word/phrase buffer 79 to "drinking", which is obtained by inserting "drink" to the portion "*".

For the word/phrase W17 in Chinese (see FIG. 22), inflection information is not written and, therefore, slot replacing unit 41 does not change the word form.

As a result of the foregoing, a word/phrase W33 (verb), "drinking" and a word/phrase W17 come to be written to the boxes of respective languages of temporary word/phrase buffer 79 as shown in FIG. 24. FIG. 24 shows data after the change of word form, stored in temporary word/phrase buffer 79.

Next, at step S608, slot replacing unit 41 replaces a slot portion related to the slot information described above in the template of each language stored in processed sentence storage buffer 75 by a word/phrase stored in the temporary word/phrase buffer 79. After step S608, control unit 12 causes the process to proceed to step S609.

Step S608 will be described with reference to specific examples in the following.

First, in processed sentence storage buffer 75, the template data shown in FIG. 17 are stored. Further, in temporary word/phrase buffer 79 (see FIG. 24), word/phrase W33 is written in the box of Japanese, "drinking" is written in the box of English and word/phrase W17 is written in the box of Chinese.

Then, slot replacing unit 41 replaces {2:&VB_EAT+v.ren1} of the Japanese template shown in FIG. 17 by word/phrase W33. Further, slot replacing unit 31 replaces {2:&VB_EAT+ing} of the English template of the figure by "drinking". Further, slot replacing unit 41 replaces {2:&VB_EAT} of the Chinese template of the figure by word/phrase W17.

From the foregoing, the template data as shown in FIG. 25 come to be stored in processed sentence storage buffer 75. FIG. 25 shows template data in the middle of the replacing process at the slot portions, stored in processed sentence storage buffer 75.

In FIG. 25, in order to distinguish a variable portion easily, the words/phrases for replacement (word/phrase W33, "drinking" and word/phrase W17) are shown in parentheses { }, for convenience of description. Actually, in translation apparatus 1, the variable portion as a whole including { } will be replaced by a word/phrase. Namely, the parentheses { } will not exist in the variable portion after replacement. The same applies to FIGS. 27, 34, 39, 40, 45, 50 and 55, which will be described later.

At step S609, control unit 12 writes the word/phrase used for replacing the template of each language, to the box of word/phrase for replacement of the slot information (SX) stored in slot portion buffer 72, and sets a flag indicating that replacing process has been finished, in the already-processed flag box.

By this process, the data stored in slot portion buffer 72 shown, for example, in FIG. 18, is updated. Here, control unit 12 writes word/phrase W33 in the box of Japanese, "drinking" in the box of English and word/phrase W17 in the box of Chinese of the word/phrase for replacement in the slot information related to "&VB_EAT" as shown in FIG. 26. Further, control unit 12 writes "1" in the box of already-processed flag in the slot information related to "&VB_EAT" as shown in the figure. FIG. 26 shows the slot information during the replacing process at the slot portion, stored in slot portion buffer 72.

After step S609, the flow proceeds to step S610. Since step S610 has been described above, description thereof will not be repeated.

After step S610, slot replacing unit 41 determines whether or not any not-yet-read word/phrase is left in extracted word/phrase buffer 70 (S611). If it is determined at step S611 that such a word/phrase is left, control unit 12 returns the process to step S601. If it is determined at step S611 that such a word/phrase does not exist, control unit 12 causes the process to proceed to step S612.

By the time the flow proceeds to step S612, the slot portions of the templates of respective languages in processed sentence storage buffer 75 have been replaced by the words/phrases as shown, for example, in FIG. 27. FIG. 27 shows the template data after the replacement process of slot portions is completed, stored in processed sentence storage buffer 75.

Further, slot portion buffer 72 makes a transition from the state shown in FIG. 26 to the state shown in FIG. 28. Specifically, control unit 12 writes a word/phrase W12 in the box of Japanese, "he" in the box of English and a word/phrase W34 (noun) in the box of Chinese, of the word/phrase for replacement of the slot information related to "&HUMAN_SUBJ". Further, as shown in the figure, in the already-processed flag box of the slot information related to "&HUMAN_SUBJ", control unit 12 writes "1". FIG. 28 shows the slot information in the state after the replacement process of the slot portion is completed, stored in slot portion buffer 72.

Here, since every piece of slot information has been read by the process above, an extracted flag (not shown) is set for every piece of slot information. It is possible, however, that if the number of words/phrases extracted by extracting unit 20 is n (n: natural number) and the number of slot portions in the Japanese template is n+1, a word/phrase is left not replaced at a slot portion. In that case, there is a piece of slot information for which the flag indicating completion of replacement process is not set.

At step S612, slot replacing unit 41 deletes the flag indicating extraction completion on every piece of slot information. After step S612, slot replacing unit 41 again extracts one piece of slot information from slot portion buffer 72, and again writes the extracted piece of slot information in temporary slot buffer 80 (S613).

After step S613, slot replacing unit 41 determines whether or not the flag indicating completion of replacement is set for the extracted piece of slot information (S614). If it is determined at step S614 that the flag is set, control unit 12 causes the process to proceed to step S616. If it is determined at step S614 that the flag is not set, a not-yet-input portion replacing unit 44 replaces the slot portion of the template of each language corresponding to the piece of slot information by a prescribed word/phrase (S615). Further, control unit 12 writes the same word/phrase as the replaced word/phrase, in the box of word/phrase for replacement of the slot information. After step S615, control unit 12 causes the process to proceed to step S616.

As to the method of replacement, by way of example, the word/phrase may be replaced by an input from the user through input unit 10. Alternatively, not-yet-input portion replacing unit 44 may replace the word/phrase by looking up the thesaurus data shown in FIG. 7 and by using any of the words/phrases of the layer to which the label of the slot portion belongs or any of the words/phrases of a lower layer. In that case, the representative value described above may be used as the word/phrase to replace. Further, even if user input is used, not-yet-input portion replacing unit 44 may display words/phrases included in the classification represented by the label of the slot portion on output unit 11 as the filling candidates, and the user may select one from the displayed words/phrases. The method of replacement by the not-yet-input portion replacing unit 44 is not specifically limited.

At step S616, slot replacing unit 41 determines whether or not any not-yet-read word/phrase is left in extracted word/phrase buffer 70. If it is determined at step S616 that such a word/phrase exists, control unit 12 again causes the process to proceed to step S613. If it is determined at step S616 that such a word/phrase does not exist, control unit 12 causes the process to proceed to step S407 of FIG. 15.

Details of the process of co-occurrence portion at step S408 will be described with reference to FIGS. 29A, 29B and 30 to 40.

Figure 29A:
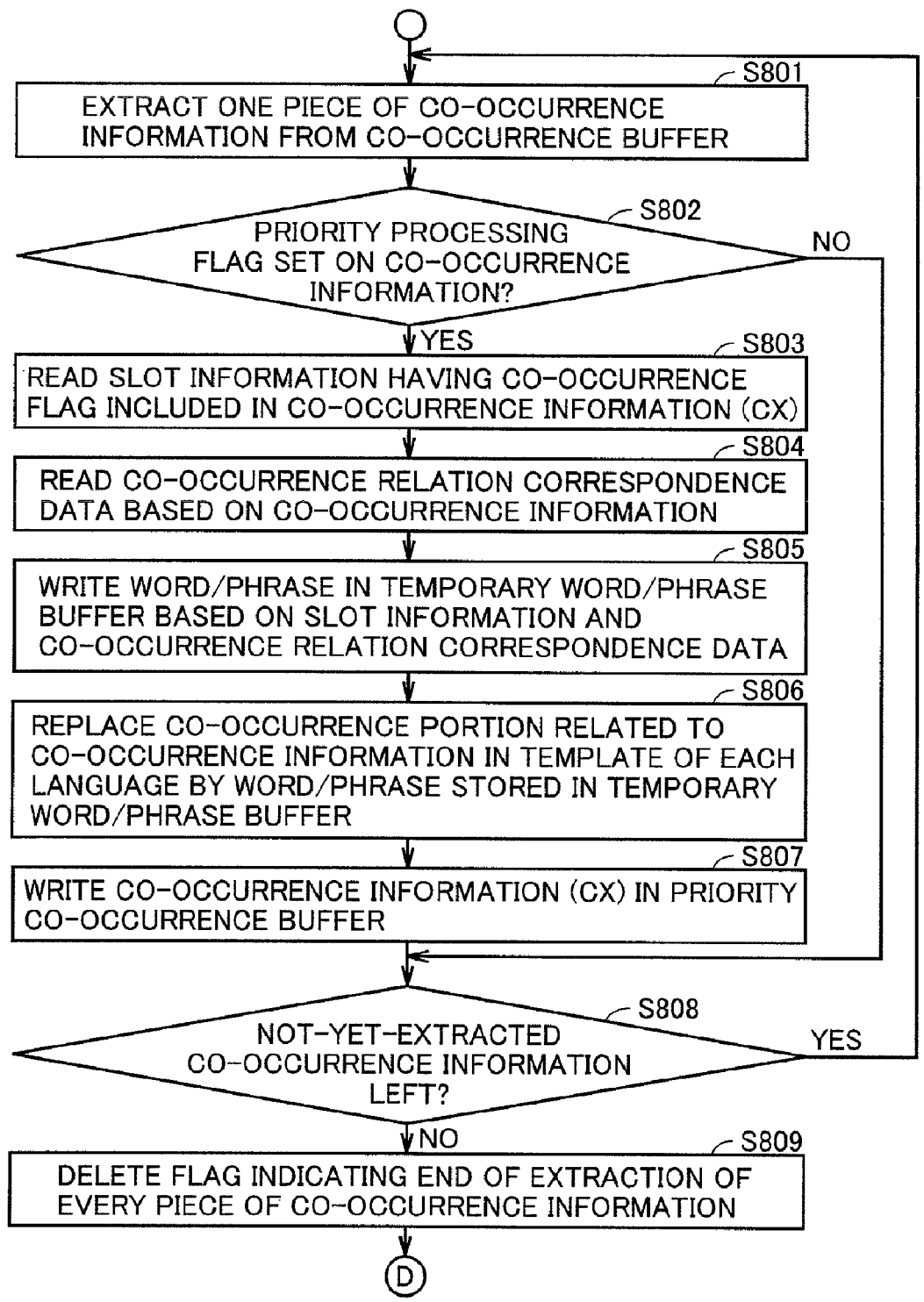
FIG. 29A is a flowchart representing a former half of the process flow of processing a co-occurrence portion of template data.
Figure 29B:
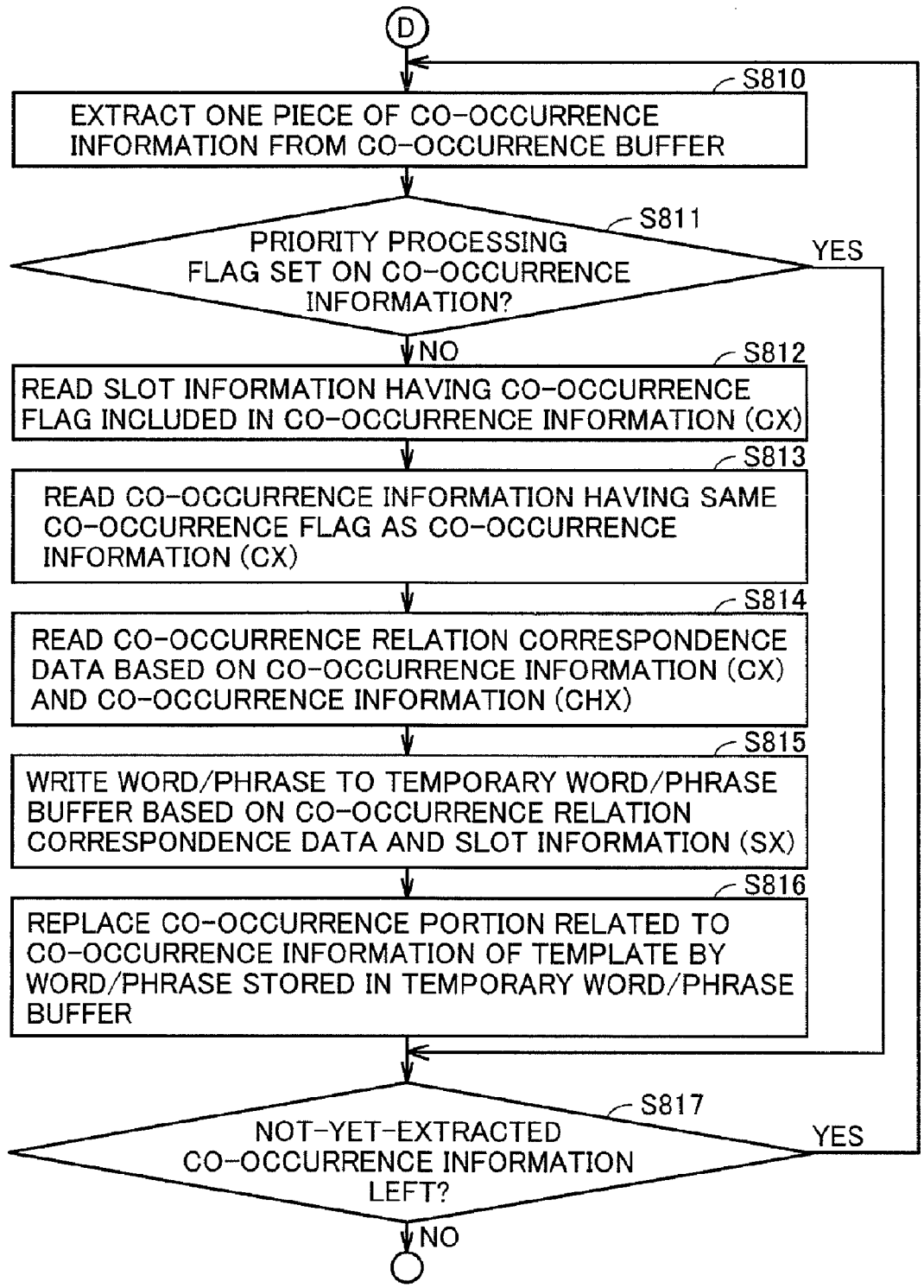
FIG. 29B is a flowchart representing a latter half of the process flow of processing a co-occurrence portion of template data.

FIG. 29A is a flowchart representing a former half of the process flow of the co-occurrence portion. FIG. 29B is a flowchart representing a latter half of the process flow of the co-occurrence portion.

First, co-occurrence replacing unit 42 extracts a piece of co-occurrence information described above from co-occurrence portion buffer 73, and writes it in temporary first co-occurrence buffer 81 (S801). By way of example, co-occurrence replacing unit 42 first extracts a piece of co-occurrence information related to "be_AUX" from the data in co-occurrence portion buffer 73 shown in FIG. 19, and writes the piece of co-occurrence information to temporary first co-occurrence buffer 81 as shown in FIG. 30. Further, for the extracted piece of co-occurrence information, control unit 12 sets a flag (not shown) indicating that it has been extracted by co-occurrence replacing unit 42. FIG. 30 shows the co-occurrence information stored in temporary first co-occurrence buffer 81. In the following, the piece of information written to temporary first co-occurrence buffer as described above will be denoted as co-occurrence information (CX), for convenience of description.

After step S801, control unit 12 determines whether or not a priority processing flag is set for the piece of co-occurrence information written to temporary first co-occurrence buffer 81 (S802). If it is determined at step S802 that the priority processing flag is set, control unit 12 causes the process to proceed to step S803. If it is determined at step S802 that the priority processing flag is not set, control unit causes the process to proceed to step S807. For instance, the priority processing flag is not set for the piece of co-occurrence information related to "be_AUX" as shown in FIG. 30 and, therefore, in this case, control unit 12 causes the process to proceed to step S808.

Here, for convenience of description, prior to the description of steps S803 to S807, step S808 will be described.

At step S808, co-occurrence replacing unit 42 determines whether or not any not-yet-extracted piece of co-occurrence information exists. If it is determined at step S808 that such a piece of co-occurrence information exists, control unit causes the process to proceed to step S801. If it is determined at step S808 that such a piece of co-occurrence information does not exist, control unit 12 causes the process to proceed to step S809.

Here, in the example above, though the piece of co-occurrence information related to "be_AUX" has been extracted, the piece of co-occurrence information related to "DET_MY-NULL" has not yet been extracted. Therefore, control unit 12 determines at step S808 that a piece of slot information exists. Then, at step S801, co-occurrence replacing unit 42 extracts the piece of co-occurrence information related to "DET_MY-NULL" as shown in FIG. 31. FIG. 31 shows a configuration of co-occurrence information stored in temporary first co-occurrence buffer 81.

Further, as shown in the figure, on the piece of co-occurrence information related to "DET_MY-NULL", the priority processing flag is set. Therefore, at step S802, control unit 12 determines that the priority processing flag is set, and as a result, causes the process to proceed to step S803.

Steps S803 to S807 will be described. In the description of steps S803 to S807, by way of example, it is assumed that the piece of information related to "DET_MY-NULL" has been extracted as the co-occurrence information (CX).

At step S803, co-occurrence replacing unit 42 reads a piece of slot information having a co-occurrence flag included in the co-occurrence information (CX) from slot portion buffer 72, and writes the read piece of slot information in temporary slot buffer 80.

A specific example will be described. For the co-occurrence information related to "DET_MY-NULL" shown in FIG. 21, the co-occurrence flag "i" is set. On the other hand, slot portion buffer 72 includes a piece of slot information related to "&HUMAN-SUBJ" including the co-occurrence flag "i". Therefore, co-occurrence replacing unit 42 writes the piece of slot information related to "&HUMAN-SUBJ" in temporary slot buffer 80, as shown in FIG. 32. FIG. 32 shows a configuration of slot information stored in temporary slot buffer 80.

After step S803, based on the co-occurrence information written in temporary first co-occurrence buffer 81, co-occurrence replacing unit 42 reads co-occurrence relation correspondence data from co-occurrence relation correspondence database (S804). After step S804, based on the slot information written in temporary slot buffer 80 and the read co-occurrence relation correspondence data, co-occurrence replacing unit 42 writes a word/phrase in temporary word/phrase buffer 79 (S805). After step S805, control unit 12 causes the process to proceed to step S806.

Steps S804 and S805 will be described with reference to a specific example.

First, at step S804, co-occurrence replacing unit 42 reads the co-occurrence relation data shown in FIG. 9B. At step S805, based on the slot information shown in FIG. 32 and on the read co-occurrence relation data, co-occurrence replacing unit 42 writes a word/phrase in temporary word/phrase buffer 79. In this example, the category (a type of label) to which the word/phrase W12 (see FIG. 7) to replace the slot information belongs is "&HUMAN-PRON_SUBJ(&HUMAN-SUBJ)". Therefore, co-occurrence replacing unit 42 writes a character or characters used when the label is designated as the conditions.

Referring to FIG. 9B, if the label belongs to "&HUMAN-MY", the characters "my" are written and otherwise, "(NULL)" is written. Therefore, at step S805, co-occurrence replacing unit 42 writes "(NULL)" in the box of English of temporary word/phrase buffer 79, as shown in FIG. 33. (NULL) will be described later. FIG. 33 shows data stored in temporary word/phrase buffer 79.

When the candidate of replacement for the co-occurrence portion is determined, it is necessary to follow the tree of thesaurus and consider the inclusion relation of labels, as described above.

At step S806, co-occurrence replacing unit 42 replaces the co-occurrence portion related to the piece of co-occurrence information of the template of each language stored in processed sentence storage buffer 75 by the word/phrase stored in temporary word/phrase buffer 79. After step S806, the flow proceeds to step S807.

Step S806 will be described with reference to a specific example. First, co-occurrence replacing unit 42 replaces the co-occurrence portion "-i:#DET_MY-NULL" of "{-i: #DET_MY-NULL}" of the English template shown in FIG. 27, by "(NULL)". In the present embodiment, "(NULL)" is a sign of not writing anything. Therefore, here, co-occurrence replacing unit 42 deletes "-i:#DET_MY-NULL". As a result, in the English template mentioned above, the co-occurrence portion between "{-i:be_AUX+pres}" and "{he}" comes to be simply represented by "{ }". FIG. 34 shows template data during the process of replacement at the co-occurrence portion, stored in processed sentence storage buffer 75.

At step S807, control unit 12 writes the co-occurrence information (CX) in priority co-occurrence buffer 74, as shown in FIG. 35. FIG. 35 shows co-occurrence information stored in the priority co-occurrence buffer.

After S807, control unit 12 causes the process to proceed to step S808. Step S808 has already been described and, therefore, description thereof will not be repeated.

At step S809, co-occurrence replacing unit 42 deletes the flag indicating extraction completion, on every piece of co-occurrence information. After step S809, co-occurrence replacing unit 42 extracts one piece of co-occurrence information from co-occurrence portion buffer 73, and writes the extracted piece of co-occurrence information in temporary first co-occurrence buffer 80 (S810).

By way of example, co-occurrence replacing unit 42 first extracts the piece of co-occurrence information related to "be_AUX" from co-occurrence portion buffer 73 shown in FIG. 19. Further, for the extracted piece of co-occurrence information, control unit 12 sets a flag (not shown) indicating that it has been extracted.

After step S810, control unit 12 determines whether or not the priority processing flag is set for the co-occurrence information written to temporary first co-occurrence buffer 80 (S811). If it is determined at step S811 that the priority processing flag is set, control unit 12 causes the process to proceed to step S817. If it is determined at step S811 that the priority processing flag is not set, control unit 12 causes the process to proceed to S812.

In the example above, again, co-occurrence replacing unit 42 first extracts the piece of co-occurrence information related to "be_AUX" from co-occurrence portion buffer 73 shown in FIG. 19, and again writes the piece of co-occurrence information in temporary first co-occurrence buffer 81 as shown in FIG. 30. For the piece of co-occurrence information related to "be_AUX", the priority processing flag is not set as shown in the figure and, therefore, here, control unit 12 causes the process to proceed to step S812.

The reason why presence/absence of priority flag is determined at step S811 is to exclude a co-occurrence portion of which processing is no longer necessary, such as the co-occurrence portion "{-i:#DET_MY-NULL}" from the process of subsequent steps S812 to S816.

For convenience of description, prior to the description of steps S812 to S816, step S817 will be described.

At step S817, co-occurrence replacing unit 42 determines whether or not any not-yet-extracted piece of co-occurrence information exists. If it is determined at step S817 that such a piece of co-occurrence information exists, control unit causes the process to proceed to step S810. If it is determined at step S817 that such a piece of co-occurrence information does not exist, control unit 12 causes the process to proceed to step S409.

In the example above, though the piece of co-occurrence information related to "be_AUX" has been extracted, the piece of co-occurrence information related to "DET_MY-NULL" has not yet been extracted. Therefore, co-occurrence replacing unit 42 determines that a piece of co-occurrence information exists. At step S810, co-occurrence replacing unit 42 extracts the piece of co-occurrence information related to "DET_MY-NULL" as shown in FIG. 31.

Steps S812 to S815 will be described. In the description of steps S812 to S815, by way of example, it is assumed that the piece of information related to "be_AUX" has been extracted as the co-occurrence information (CX).

At step S812, co-occurrence replacing unit 42 reads a piece of slot information having the co-occurrence flag included in the piece of co-occurrence information (CX), and writes the read piece of slot information in temporary slot buffer 80.

By way of example, the piece of slot information having the co-occurrence flag "i" included in the piece of co-occurrence information (CX) shown in FIG. 30 without priority processing flag is the slot information related to "&HUMAN-SUBJ". Therefore, co-occurrence replacing unit 42 reads the piece of slot information related to "&HUMAN-SUBJ" from slot portion buffer 72, and writes the read piece of slot information (SX) in temporary slot buffer 80, as shown in FIG. 36. FIG. 36 shows slot information stored in temporary slot buffer 80.

After step S812, co-occurrence replacing unit 42 reads co-occurrence information having the same co-occurrence flag as the above-described piece of co-occurrence information (CX) from priority co-occurrence buffer 74 (S813). For instance, priority co-occurrence buffer 74 includes a piece of co-occurrence information related to "DET_MY-NULL" as the co-occurrence information having the same co-occurrence flag "i" as the co-occurrence information (CX) related to "be_AUX". Therefore, co-occurrence replacing unit 42 reads the piece of co-occurrence information related to "DET_MY-NULL" and writes the read piece of co-occurrence information in temporary second co-occurrence buffer 82, as shown in FIG. 37. FIG. 37 shows co-occurrence information stored in the temporary second co-occurrence buffer. In the following, the co-occurrence information written in the temporary second co-occurrence buffer 82 as above will be referred to as co-occurrence information (CHX).

After step S813, based on the co-occurrence information (CX) written in temporary first co-occurrence buffer 81 and co-occurrence information (CHX) written in temporary second co-occurrence buffer 82, co-occurrence replacing unit 42 reads the co-occurrence relation correspondence data from the co-occurrence relation correspondence database (S814). After step S814, based on the read co-occurrence relation correspondence data and the slot information (SX) written in temporary slot buffer 80, co-occurrence replacing unit 42 writes a word/phrase in temporary word/phrase buffer (S815). After step S815, control unit 12 causes the process to proceed to step S816.

Steps S814 and S815 will be described with reference to a specific example. In the following, a configuration in which the co-occurrence relation correspondence data is read from the co-occurrence relation correspondence database based on the co-occurrence information (CX) will be described.

First, at step S814, co-occurrence replacing unit 42 reads the co-occurrence relation correspondence data shown in FIG. 9A, based on the co-occurrence information (CX) shown in FIG. 30. Specifically, co-occurrence replacing unit 42 reads the co-occurrence relation correspondence data having the same label as the label of co-occurrence information shown in FIG. 30. At step S815, based on the co-occurrence relation correspondence data shown in FIG. 9A and the slot information (SX) shown in FIG. 36, co-occurrence replacing unit 42 writes a word/phrase in temporary word/phrase buffer 79.

In this example, the word/phrase for replacement of slot information is "he" and, therefore, co-occurrence replacing unit 42 writes the word/phrase used in the co-occurrence portion when "he" is used, in temporary word/phrase buffer 79. With reference to FIG. 9A, when the word/phrase for replacement is "I", the word/phrase "am" is written to temporary word/phrase buffer 79. If the word/phrase for replacement is "you" or a word/phrase in the plural form, co-occurrence replacing unit 42 writes the word/phrase "are" in temporary word/phrase buffer 79. If the word/phrase for replacement is any other word/phrase, co-occurrence replacing unit 42 writes the word/phrase "is" in temporary word/phrase buffer 79. Therefore, co-occurrence replacing unit 42 writes the word/phrase "is" in the box of English of temporary word/phrase buffer 79, as shown in FIG. 38. FIG. 38 shows the word/phrase written in temporary word/phrase buffer 79.

At step S816, co-occurrence replacing unit 42 replaces the co-occurrence portion related to the above-described co-occurrence information of the template stored in processed sentence storage buffer 75 by the word/phrase stored in temporary word/phrase buffer 79. Specifically, co-occurrence replacing unit 42 replaces {-i:be_AUX+pres} of the English template to "is" as mentioned above. Consequently, the template data as shown in FIG. 39 comes to be stored in processed sentence storage buffer 75. FIG. 39 shows the template data in the state after the completion of co-occurrence portion replacement process, stored in processed sentence storage buffer 75.

After step S816, the flow proceeds to S817.

The process at step S409 of FIG. 15 will be described.

At step S409, output sentence refining unit 26 changes the word/phrase W35 (syllable) of Japanese template in the template data shown in FIG. 39, for example, to a word/phrase W36 (syllable (voiced sound of word/phrase W35)) as shown in FIG. 40. FIG. 40 shows example sentence data stored in processed sentence buffer 75.

As described above, translation apparatus 1 has rules for refining sentences stored therein, and after all variable portions are replaced, for example, the sentence is refined using the rules. One example of the rules is as follows. The inflected form of the verb having the inflection of word/phrase W19 is the inflected form (that is, ren1) indicated by word/phrase W26, and if the verb is immediately followed by word/phrase W35, it must be changed to word/phrase W36, and if the verb is immediately followed by word W38 (syllable) shown in FIG. 77, it must be changed to word/phrase W39 (syllable (voiced sound of word/phrase W38)) shown in FIG. 77.

As a result of the processes described above, in translation apparatus 1, based on the templates of respective languages, an example sentence in Japanese is obtained, and an example sentence in English as a translation of the Japanese example sentence and an example sentence in Chinese as a translation of the Japanese example sentence are obtained. Each of these example sentences are displayed on the output unit under the control of display control unit 25 and, therefore, it is possible for the user to confirm at least the translation result of the sentence same as that input by himself/herself or a closest example sentence.

As described above, translation apparatus 1 is configured to include: data reading unit 21 for reading, from a storage 13 storing templates of a first language (for example, Japanese) and templates of a second language (for example, English) corresponding to the said templates, including a fixed portion consisting of a prescribed word/phrase and a variable portion replaceable by any of a predetermined plurality of words/phrases at corresponding positions respectively, templates of the first language and templates of the second language; a determining unit 22 for determining, on the plurality of templates in the first language read by data reading unit 21, whether a word/phrase included in a sentence input in a first language through an input unit 10 matches with the prescribed word/phrase or any of the afore-mentioned plurality of words/phrases; a selecting unit 23 for selecting, based on the result of determination, at least one template from the plurality of templates; and a replacing unit 24, if a template having a variable portion replaceable by the matched word/phrase is selected by selecting unit 23, in the template of the second language corresponding to the selected template read by data reading unit 21, replacing the variable portion corresponding to the variable portion replaceable by the matched word/phrase, by a word/phrase in the second language corresponding to the matched word/phrase.

In such a configuration, the word/phrase of the variable portion of each template in the first language can be selected from the plurality of words/phrases mentioned above and, therefore, it is possible to select a word/phrase for the variable portion from a wide variety. By way of example, if the number of replaceable words/phrases for the variable portion is n, translation apparatus 1 can form n different example sentences using one template. If there are two variable portions, and the number of replaceable words/phrases is n for one variable portion and m for the other variable portion, translation apparatus 1 can form n×m different example sentences using one template.

Assume that a conventional apparatus using the approach without any variable portion and translation apparatus 1 in accordance with the present embodiment have the same number of templates. Then, the number of example sentences that can be formed is clearly larger in translation apparatus 1 in accordance with the present embodiment. Therefore, possibility of selecting a correct example sentence is higher in translation apparatus 1 of the present invention than the conventional apparatus.

Further, as the thesaurus data is used, it is possible in translation apparatus to easily determine a word/phrase to be included in one variable portion. Further, as the thesaurus data is used, the plurality of words/phrases for one variable portion come to have similar concepts. Therefore, generation of meaningless example sentences can be prevented.

Translation apparatus 1 has a configuration that includes display control unit 25 that causes at least an image based on the template in the second language after replacement by replacing unit 24 to be displayed on output unit 11. Therefore, by this configuration, it is possible for the user of translation apparatus 1 to confirm the example sentence in the second language.

Further, translation apparatus 1 is so configured that, when a template in the first language is selected by selecting unit 23, the variable portion replaceable by the said matching word/phrase is replaced by the said matching word/phrase, and an image based on the template in the first language after replacement by replacing unit 24 is output on output unit 11. Therefore, by such a configuration, it is possible for the user to simultaneously confirm the example sentence in the first language and the example sentence in the second language.

Particularly, in translation apparatus 1, in storage device 13, for each of the above-described predetermined plurality of words/phases of a variable portion of the template in the first language, one word/phrase translated to the second language is stored in a corresponding manner. Then, replacing unit 24 replaces the variable portion of the template in the second language by the said word/phrase translated to the second language stored in the corresponding manner in storage device 13. Therefore, in translation apparatus 1, a word/phrase in the second language that corresponds to the word/phrase replaced at the variable portion of the template in the first language is uniquely determined. Therefore, by translation apparatus 1, it is possible to obtain a correct example sentence in the second language based on the template in the second language.

Further, in translation apparatus 1, a variable portion of a template in the first language and a variable portion of a template in the second language corresponding to the variable portion have corresponding pieces of information related to word/phrase inflection. Replacing unit 24 changes the word form of the replaced word/phrase, based on the information related to word/phrase inflection. Therefore, by translation apparatus 1, each of the example translations in the first language and the second language can be made more accurate than when the word form is not changed.

Further, as described above, in translation apparatus 1, a slot portion and a co-occurrence portion are included as variable portions in the template in the second language, replacing unit 24 replaces the slot portion by the word/phrase in the second language, and determines the word/phrase in the co-occurrence portion in accordance with the word/phrase after replacement. Therefore, it is possible to replace the co-occurrence portion using the word/phrase corresponding to the word/phrase provided as replacement in the slot portion. Therefore, as compared with an approach in which the word/phrase is not determined in accordance with the replaced word/phrase, more accurate example sentence can be formed by translation apparatus 1.

In the description of the specific example related to steps S814 and S815 of FIG. 29B, co-occurrence replacing unit 42 reads the co-occurrence relation correspondence data from the co-occurrence relation correspondence database from the co-occurrence information (CX) written in temporary first co-occurrence buffer 81. Here, a configuration in which co-occurrence replacing unit 42 reads the co-occurrence relation correspondence data from the co-occurrence relation correspondence database based on the co-occurrence information (CX) written in temporary first co-occurrence buffer 81 and the co-occurrence information (CHX) written in temporary second co-occurrence buffer 82 will be described with reference to FIGS. 41 to 45.

FIG. 41 shows a configuration of template data stored in template database 60. For convenience of description, an English template and a Japanese template are shown. As shown in the figure, the Japanese template includes a slot portion "{1:NOUN}". The English template includes a slot portion "{1-i:NOUN}" and co-occurrence portions "{-i:DET_A}" and "{-i#CLASSIFIER}".

Here, the co-occurrence information related to "{-i#CLASSIFIER}" corresponds to the co-occurrence information (CHX). Specifically, in the following, based on the slot information related to "{1:NOUN}" and the co-occurrence information "{-i#CLASSIFIER}", the word/phrase to replace "{-i:DET_A}" is determined.

FIG. 42 shows examples of word/phrase as replacements at the slot portion of Japanese template in the template data shown in FIG. 41. Example inputs A, B, C and D represent examples of word/phrase as replacements at the slot portion "{1:NOUN}". For instance, in example input A, the slot portion "{1:NOUN}" is replaced by "コーヒー".

FIG. 43 shows dictionary data stored in dictionary database 61. As shown in the figure, the dictionary data stores words/phrases in Japanese and corresponding words/phrases in English, in the corresponding manner. Further, in the dictionary data, for each word/phrase in English, information related to a counter suffix is stored in a corresponding manner.

Figure 44:
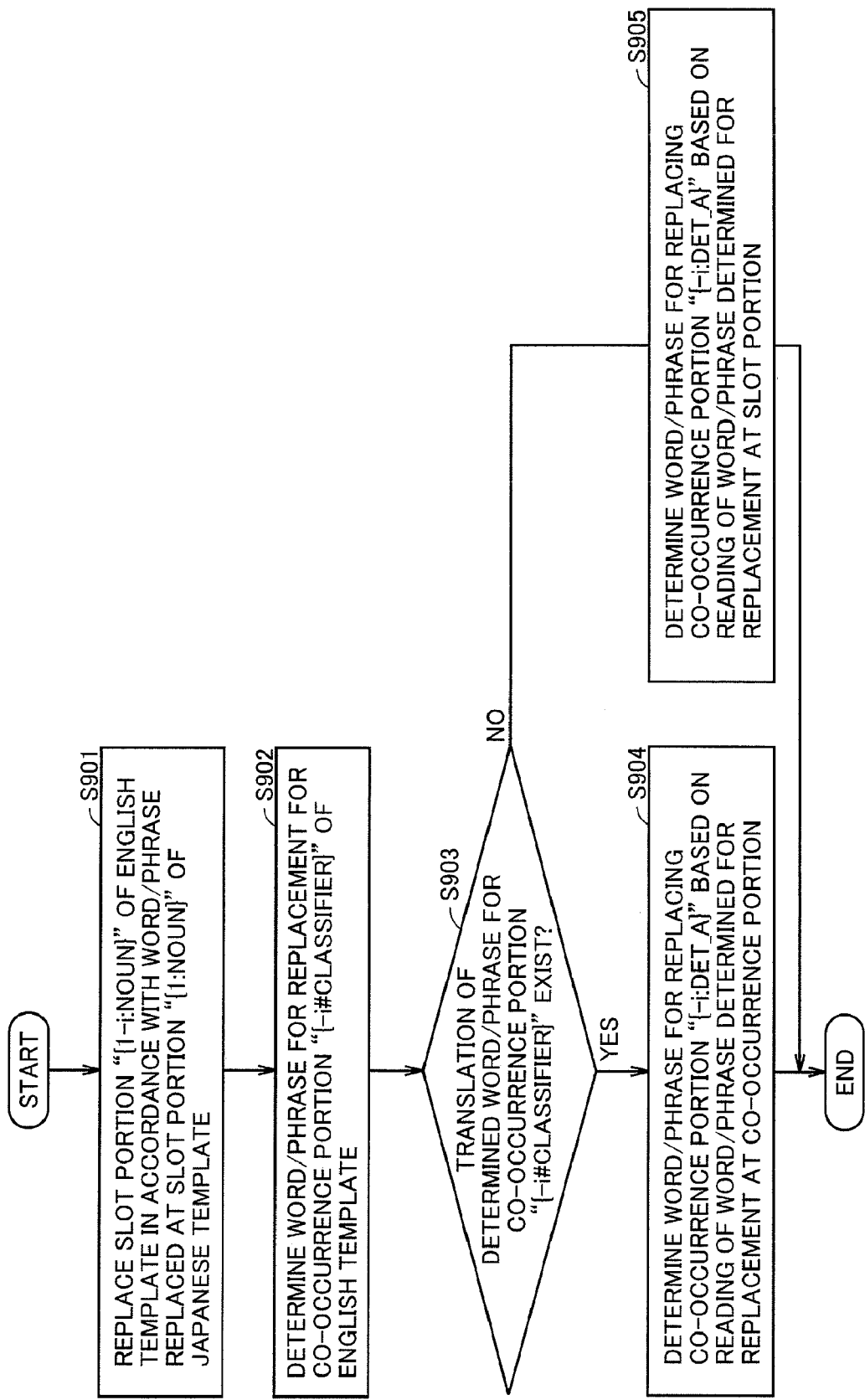
FIG. 44 shows a flowchart representing a flow of forming an example sentence in English.

FIG. 44 is a flowchart representing a flow of forming an example sentence in English, using the template data and dictionary data as described above.

First, in accordance with the word/phrase that replaced the slot portion "{1:NOUN}" of the Japanese template, slot replacing unit 41 looks up the dictionary data, and thereby replaces the slot portion "{1-i:NOUN}" by, for example, the word/phrase "coffee" (S901). After step S901, co-occurrence replacing unit 42 determines a word/phrase to replace the co-occurrence portion "{-i#CLASSIFIER}" of the English template (S902).

For the example input A, at step S902, co-occurrence replacing unit 42 determines to replace the co-occurrence portion "{-i#CLASSIFIER}" by a word/phrase "cup of" by looking up the dictionary data. For the example input B, similarly, co-occurrence replacing unit 42 determines to replace the co-occurrence portion "{-i#CLASSIFIER}" by a word/phrase "order of". On the other hand, for the example input C, in the dictionary data, the information of counter suffix corresponding to the word/phrase "pen" is "(NULL)" and, therefore, co-occurrence replacing unit 42 determines to replace the co-occurrence portion "{-i#CLASSIFIER}" by "(NULL)". The operation for example input D is the same as that for "example input C".

After step S902, co-occurrence replacement unit 42 determines whether or not there is a translation of the determined word/phrase in connection with the co-occurrence portion "{-i#CLASSIFIER}" (S903).

If it is determined at step S903 that a translation exists, co-occurrence replacing unit 42 determines whether the co-occurrence portion "{-i:DET_A}" is to be replaced by "a" or "an", based on the pronunciation of the determined word/phrase (S904). By way of example, for example input A, co-occurrence replacing unit 42 determines to replace the co-occurrence portion "{-i:DET_A}" by "a". For example input B, co-occurrence replacing unit 42 determines to replace the co-occurrence portion "{-i:DET_A}" by "an".

If it is determined at step S903 that a translation does not exist, co-occurrence replacing unit 42 determines whether the co-occurrence portion "{-i:DET_A}" is to be replaced by "a" or "an", based on the pronunciation of the word/phrase determined to be replaced at the slot portion of "{1-i:NOUN}" (S905). By way of example, for example input C, co-occurrence replacing unit 42 determines to replace the co-occurrence portion "{-i:DET_A}" by "a". Further, for example input D, co-occurrence replacing unit 42 determines to replace the co-occurrence portion "{-i:DET_A}" by "an".

After steps S904 and S905, control unit 12 causes the process to proceed to step S906. At step S906, using the word/phrase determined to be the word/phrase for replacement at co-occurrence portion "{-i#CLASSIFIER}" and the word/phrase determined to be the word/phrase for replacement at co-occurrence portion "{-i:DET_A}", co-occurrence replacing unit 42 replaces respective co-occurrence portions. Here, "(NULL)" is a sign representing writing of nothing and, therefore, co-occurrence replacing unit 42 deletes "{-i#CLASSIFIER}".

As a result, translation apparatus 1 generates example sentences in English in which the slot portion and the two co-occurrence portions are replaced, for each of the example inputs A to D, as shown in FIG. 45.

In the foregoing, a configuration has been described in which the words/phrases to be replaced at the slot portions can be determined independently with each other. Specifically, in the configuration of FIG. 3, there is no problem no matter which of "{1*&HUMAN-SUBJ}" and "{2:&vb_EAT+v.ren1}" is determined first. In the following, two examples, in which co-occurrence relation is formed between the slot portions will be described, with reference to FIGS. 46 to 55.

The first example will be described with reference to FIGS. 46 to 50.

FIG. 46 shows a configuration of template data stored in template database 60. For convenience of description, a Japanese template and an English template are shown. As can be seen from the figure, the Japanese template includes two slot portions, "{1:THIS-THAT}" and "{2:GOODS}". The English template includes two slot portions, "{1-i:THIS-THAT}" and "{2-i:GOODS}". Both slot portions of the English template have the sign "-i". Specifically, these slot portions have co-occurrence relation with each other.

FIG. 47 shows examples of words/phrases replaced at the slot portions of the Japanese template in the template data shown in FIG. 46. In FIG. 47, example inputs A, B, C and D are examples of words/phrases replaced at the slot portions "(1:THIS-THAT)" and "{2:GOODS}". For instance, in example input A the slot portion "{1-i:THIS-THAT}" is replaced by a word/phrase W40 (demonstrative pronoun), and the slot portion "{2-i:GOODS}" is replaced by a word/phrase W41 (noun).

FIG. 48 shows dictionary data stored in dictionary database 61. As shown in the figure, the dictionary data stores words/phrases in Japanese and corresponding words/phrases in English, in a corresponding manner. Further, the dictionary data stores, for each of the words/phrases in English, information related to the plural form of the word/phrase in a corresponding manner.

Figure 49:
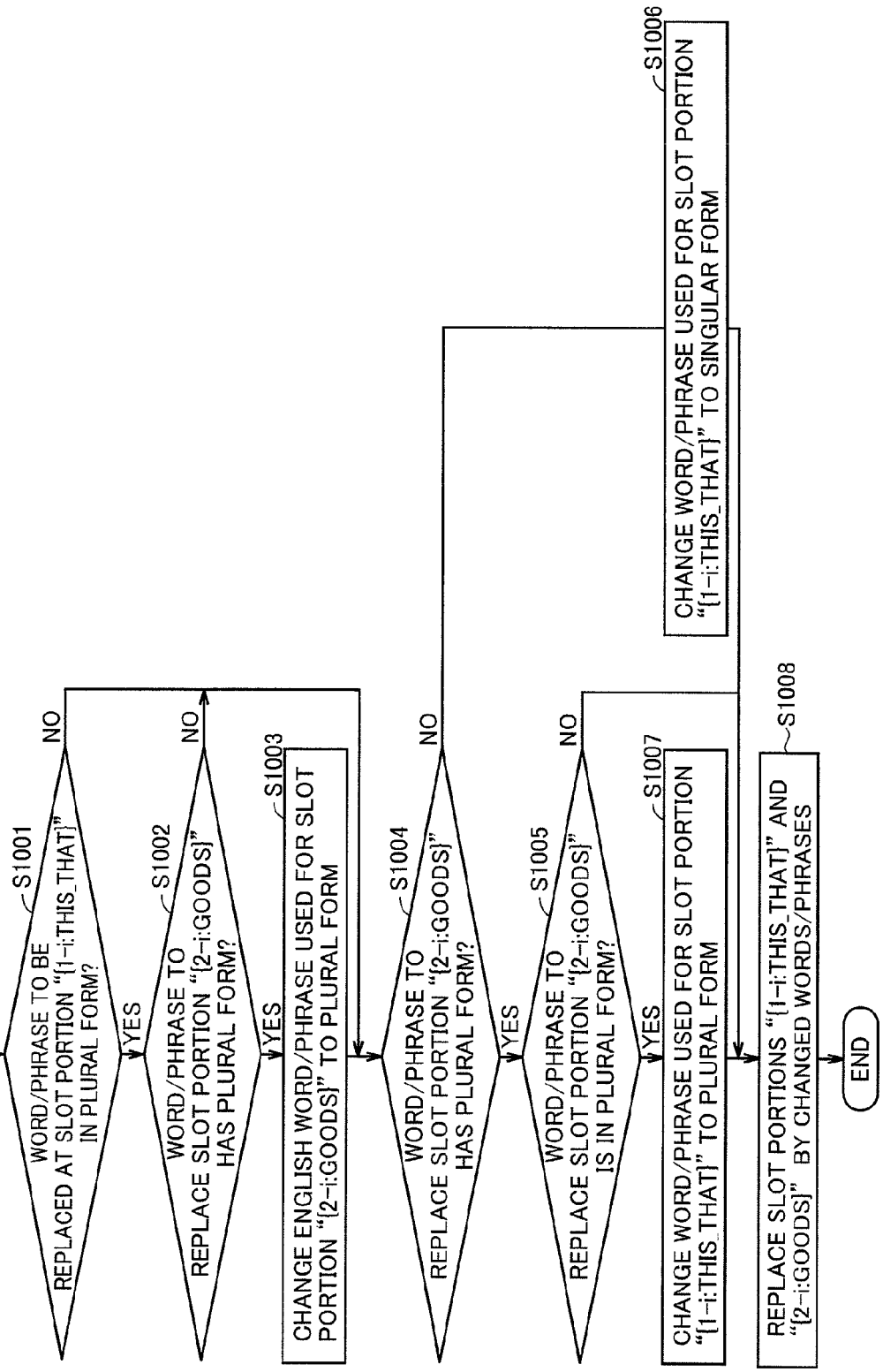
FIG. 49 is a flowchart representing a flow of forming an example sentence in English.

FIG. 49 is a flowchart representing a flow of forming an example sentence in English using the template data and the dictionary data as above. In the following, it is assumed that the replacing process at the slot portions in the Japanese template has been completed, and the replacing process at the slot portions of the English template will be described.

First, slot replacing unit 41 determines whether or not the word/phrase to be replaced at the slot portion "{1-i:THIS-THAT}" of the English template is in the plural form (S1001). Here, whether the word/phrase is in the plural form is determined by slot replacing unit 41 looking up dictionary database 61. Dictionary database 61 stores information indicating whether the word/phrase is in the plural form or not.

For the example inputs A, B and C, slot replacing unit 41 determines that the word/phrase is not in the plural form at step S1001. For the example inputs D, E and F, slot replacing unit 41 determines that the word/phrase is in the plural form at step S1001.

If it is determined at step 1001 that the word/phrase is in the plural form, slot replacing unit 41 determines whether or not the word/phrase to be replaced at the slot portion "{2-i:GOODS}" has a plural form (S1002). If it is determined at step S1001 that the word/phrase is not in the plural form, control unit 12 causes the process to proceed to step S1004.

If it is determined that the word/phrase has the plural form at step S1002, slot replacing unit 41 refers to the dictionary data shown in FIG. 48, and changes the word/phrase in English used at the slot portion "{2-i:GOODS}" of the English template to the plural form (S1003). On the other hand, if it is determined that the word/phrase does not have the plural form at step S1002, control unit 12 causes the process to proceed to step S1004.

For instance, for example input D, at step S1003, slot replacing unit 41 changes the word/phrase "book" to the plural form "books". Similarly, for example input E, slot replacing unit 41 changes the word/phrase "trousers" to the plural form "trousers" (here, the singular form and the plural form are the same). On the other hand, for example input F, the word/phrase "luggage" does not have a plural form as shown in FIG. 48 and, therefore, here, control unit 12 causes the process to proceed to step S1004.

At step S1004, slot replacing unit 41 again determines whether or not the word/phrase to be replaced at the slot portion "{2-i:GOODS}" of the English template has a plural form. If it is determined at step S1004 that it has the plural form, slot replacing unit 41 determines whether or not the word/phrase to be replaced at the slot portion "{2-i:GOODS}" of the English template is in the plural form (S1005). If it is determined at S1004 that it does not have the plural form, slot replacing unit 41 refers to the dictionary data and changes the word/phrase used at the slot portion "{1-i:THIS-THAT}" of the English template to the singular form (S1006). After step S1006, the flow proceeds to step S1008.

For instance, for example inputs A, B, D and E, at step S1004, slot replacing unit 41 determines that the word/phrase to be replaced at the slot portion "{2-i:GOODS}" of the English template has a plural form. On the other hand, for example inputs C and F, at step S1006, slot replacing unit 41 changes the slot portion "{2-i:GOODS}" to the singular form. More specifically, for example input C, though there is no substantial change, the slot replacing unit 41 changes "this" to "this". For example input F, slot replacing unit 41 changes "these" to "this".

At step S1005, slot replacing unit 41 determines that, among example inputs A, B, D and E, B, D and E have the word/phrase to be replaced at the slot portion "{2-i:GOODS}" in the plural form. On the other hand, at the same step, slot replacing unit 41 determines that for example input A, the word/phrase to be replaced at the slot portion "{2-i:GOODS}" is not in the plural form.

If it is determined at step S1005 that the word/phrase is in the plural form, slot replacing unit 41 changes the word/phrase used for the slot portion "{1-i:THIS-THAT}" of the English template to the plural form (S1007). After step S1007, control unit 12 causes the process to proceed to step S1008. If it is determined at step S1005 that it is not in the plural form, the word/phrase is not changed to the plural form and control unit 12 causes the process to proceed to step S1008.

By way of example, for example inputs B, D and E, at step S1007, slot replacing unit 41 changes the word/phrase to be replaced at the slot portion "{1-i:THIS-THAT}" of the English template to the plural form. Specifically, for example input B, slot replacing unit 41 changes "this" to "these". Though there is no substantial change, the slot replacing unit 41 changes "these" to "these" for example inputs D and E.

At step S1008, slot replacing unit 41 replaces the slot portions "{1-i:THIS-THAT}" and "{2-i:GOODS}" using the words/phrases after the changing process described above.

As a result of the foregoing, example sentences in English with the two slots replaced by words/phrases are generated for the example inputs A to F, as shown in FIG. 50.

Next, the second example will be described with reference to FIGS. 51 to 55.

FIG. 51 shows a configuration of template data stored in template database 60. For convenience of description, a Japanese template and an English template are shown. As shown in the figure, the Japanese template includes three slot portions "{1-i:NOUN}", "{2:NUM}" and "{3-i:CLASSIFIER}". Further, the English template includes three slot portions "{2-j:NUM}", "{3-j:CLASSIFIER}" and "{1-j:NOUN}". These three slot portions of the English template has the sign "-j" representing the co-occurrence relation. Specifically, these slots have co-occurrence relation with each other.

FIG. 52 shows examples of words/phrases to be replaced at the slot portions of the Japanese template of the template data shown in FIG. 51. In FIG. 52, example inputs A and B include examples of words/phrases to be replaced at the slot portions, "{1-i:NOUN}", "{2:NUM}" and "{3-i:CLASSIFIER}". For instance, in example input A, the slot portion "{1-i:NOUN}" is replaced by a word/phrase W42 (noun), the slot portion "{2:NUM}" is replaced by "2", and the slot portion "{3-i:CLASSIFIER}" is replaced by a word/phrase W43 (noun).

FIG. 53 shows dictionary data stored in dictionary database 61. As shown in the figure, the dictionary data stores words/phrases in Japanese and corresponding words/phrases in English, in a corresponding manner.

Figure 54:
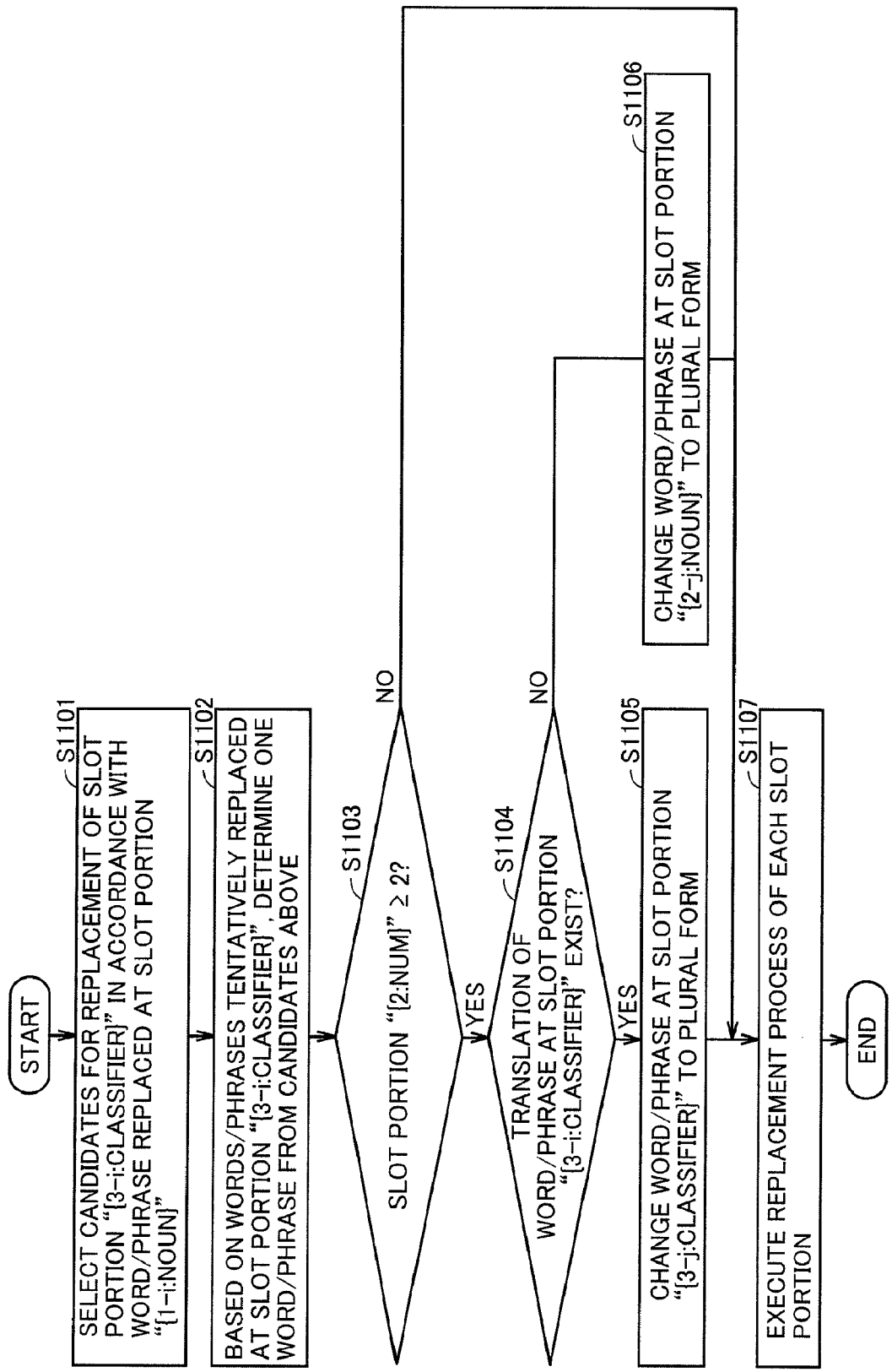
FIG. 54 is a flowchart showing a flow of forming an example sentence in English.

FIG. 54 is a flowchart representing a flow of forming an example sentence in English, using the template data and dictionary data as described above.

First, slot replacing unit 41 looks up the dictionary data, and selects a candidate of a word/phrase replaceable at the slot portion "{3-i:CLASSIFIER}" of the Japanese template, in accordance with the word/phrase replaced at the slot portion "{1-i:NOUN}" of the Japanese template (S1101). By way of example, for example input A shown in FIG. 52, slot replacing unit 41 selects word/phrase W43 and word/phrase W41 (see FIG. 53). Further, for example input B shown in the figure, slot replacing unit 41 selects a word/phrase W44 (NOUN) as the candidate.

After step S1101, based on the tentatively replaced word/phrase at the slot portion "{3-i:CLASSIFIER}", slot replacing unit 41 determines one word/phrase from the candidates (S1102). By way of example, slot replacing unit 41 determines the word/phrase W43 to be the word/phrase replaceable at slot portion "{3-i:CLASSIFIER}" of the Japanese template for example input A, and determines the word/phrase W44 to be the word/phrase replaceable at slot portion "{3-i:CLASSIFIER}" for example input B.

After step S1102, control unit 12 causes the process to proceed to the processing of English template.

After step S1102, slot replacing unit 41 determines whether or not the slot portion "{2:NUM}" of the Japanese template is "2" or larger (S1103). If it is determined to be "2" or larger at step S1103, slot replacing unit 41 determines whether or not a translation of the word/phrase at the slot portion "{3-i:CLASSIFIER}" of the Japanese template exists (S1104). If it is determined that it is smaller than "2", the flow proceeds to step S1107.

If it is determined at S1104 that a translation exists, slot replacing unit 41 changes the word/phrase at the slot portion "{3-j:CLASSIFIER}" of the English template to the plural form (S1105). After step S1105, control unit 12 causes the process to proceed to step S1107. If it is determined at step S1104 that no translation exists, slot replacing unit 41 changes the word/phrase at the slot portion "{2-j:NOUN}" of the English template to the plural form (S1106). After step S1106, control unit 12 causes the process to proceed to step S1107.

For example input A, at step S1105, slot replacing unit 41 changes "glass of" to "glasses of" For example input B, at step S1106, slot replacing unit 41 changes "magazine" to "magazines."

At step S1107, translation apparatus 1 performs the replacing process using the words thus changed.

As a result, translation apparatus 1 generates example sentences in English with each slot replaced by a word/phrase, both for example inputs A and B.

In the embodiment above, a configuration has been described as an example in which all template data in the template database are the object of search, and a template having an extracted word/phrase included at a fixed portion or a variable portion is searched. The invention, however, is not limited to such an example, and only some of the template data may be used as the object of search.

Further, in the foregoing, a configuration has been described as an example in which templates of a plurality of languages are included in one template data, as shown in FIG. 3. However, the invention is not limited to the above. By way of example, one template data may include template data of one language. In such a case, a template data of another language corresponding to the said template data of one language should be stored in storage device 13 in association with the said template data of one language.

Further, though an example using a thesaurus has been described in the foregoing as shown in FIG. 7, it is not limiting.

What is necessary is that the predetermined number of words/phrases replaceable at the variable portion described above can be specified by identification indicators. Specifically, the words/phrases are not limited to words/phrases identified by labels of classification in the thesaurus, and any words/phrases that can be specified by identification indicators representing some classifications of data for which such classifications are provided in advance may be used.

By way of example, in the dictionary data of the first language stored in storage device 13, all or some of the words/phrases included in the dictionary data may be classified such that each belongs to at least one group, and the prescribed identification indicator may be an indicator indicating a prescribed group of said plurality of groups. Specifically, a word/phrase "A" is classified to belong to at least one group (for example to Group A and Group B). If an indicator indicating Group B is used as the prescribed identification indicator described above, all words/phrases belonging to Group B may be the object of replacement at one variable portion.

Further, though translation apparatus 1 configured to output an image at output unit 11 has been described, it is not limiting. By way of example, translation apparatus 1 may be configured to provide voice output of resulting example sentence of each language, together with the image output. Further, translation apparatus 1 may be configured to provide voice output only, without outputting image of the example sentence.

As described above, by using translation apparatus 1 in accordance with the present embodiment, at the time of matching between the input sentence and the template, expressions (words/phrases) of the same semantic concept are identified. As a result, selection of an appropriate example sentence (example sentence as a base) becomes possible in translation apparatus 1. Further, even if the number of variable portions in one sentence of a template increases, the degree of similarity (degree of matching) does not unduly decrease. Further, since a portion to be a variable portion is specified in advance as a slot in the template, unmatching portion can be specified without fail in translation apparatus 1. Since words/phrases replaceable at the variable portion are designated in advance in the parallel translation dictionary, reliable replacement of translation is possible in translation apparatus 1. Further, a template describing co-occurrence relation, co-occurrence relation correspondence data and data including inflection information are used and, therefore, it becomes possible by translation apparatus 1 to obtain a translation result that can be considered "100% correct", which could not be attained by various types of conventional translation apparatuses such as the example-based apparatus.

<Modification of Translation Apparatus 1>

It is noted that translation apparatus 1 as above has Japanese templates and English templates having such a form as shown in FIG. 3 stored in template database 60 of storage device 13, even if no translation process is executed. In the following, a configuration will be described in which Japanese templates and English templates are generated based on templates stored in advance in a template database of storage device 13 while the translation apparatus 1 executes a translation process. In the following description, the same components are denoted by the same reference characters. Their names and functions are also the same. Therefore, detailed description thereof will not be repeated.

Figure 56:
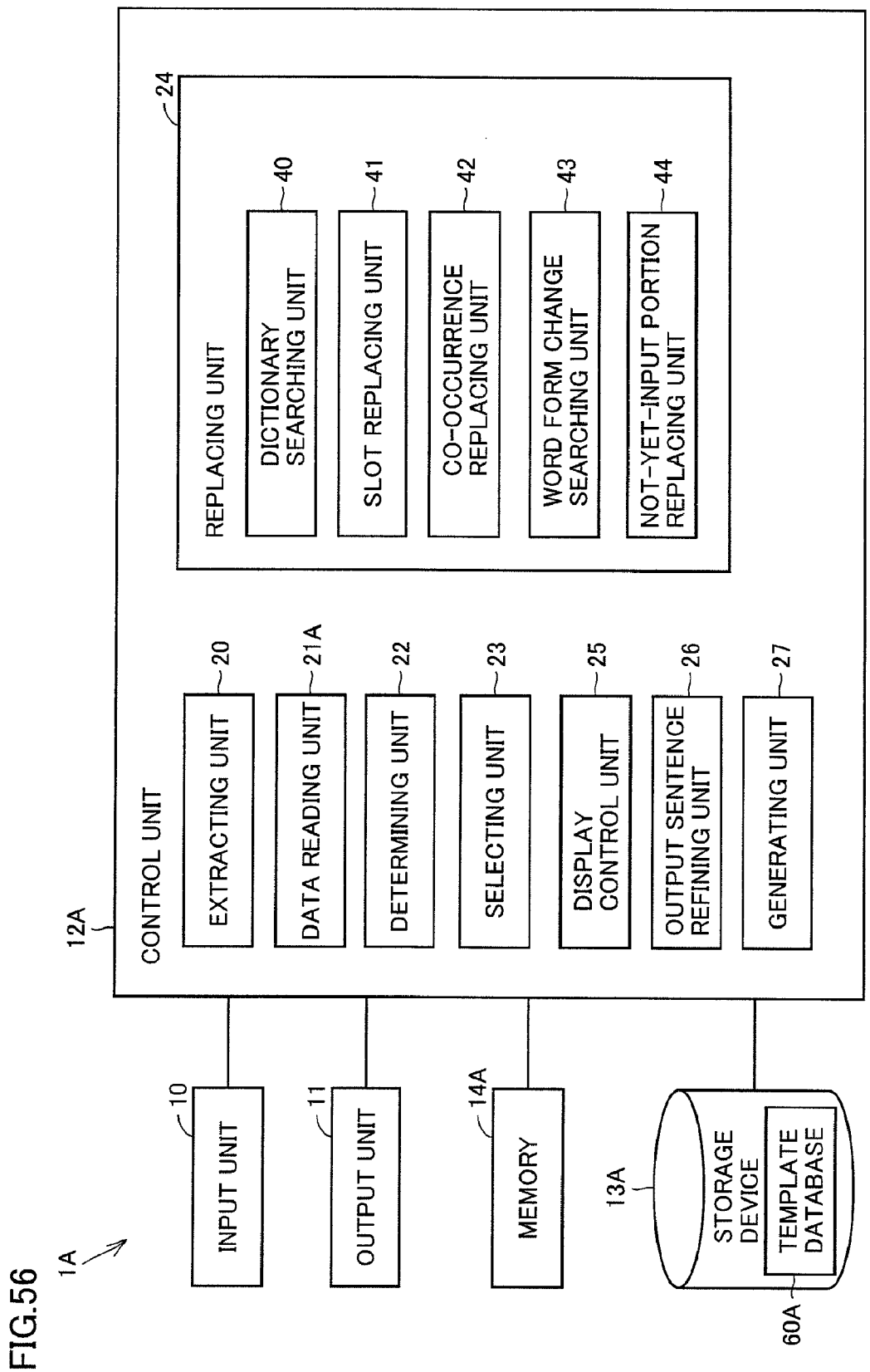
FIG. 56 shows a schematic configuration of another translation apparatus.

FIG. 56 shows a schematic configuration of a translation apparatus 1A. Referring to FIG. 56, translation apparatus 1A includes an input unit 10, an output unit 11, a control unit 12A, a storage device 13A, and a memory 14A. Specifically, translation apparatus 1A is different as it has control unit 12A and storage device 13A, from translation apparatus 1 having control unit 12 and storage device 13.

Storage device 13A stores a template database 60A, a dictionary database 61, a Japanese inflection form table 62, a category database 63, thesaurus data 64, and a co-occurrence relation database 65.

Template database 60A stores, in place of a Japanese template data, a template (hereinafter referred to as a first template) for generating the Japanese template. Storage device 13A stores, in place of an English template, a template (hereinafter referred to as a second template) for generating the English template. Further, storage device 13A stores, in place of a Chinese template, a template (hereinafter referred to as a third template) for generating the Chinese template. Outlines of the first, second and third templates will be described later (see FIG. 57).

Memory 14A includes: an extracted word/phrase buffer 70; a search result template buffer 71; a slot portion buffer 72; a co-occurrence portion buffer 73; a priority co-occurrence buffer 74; a processed sentence storage buffer 75; a translation result buffer 76; a temporary template buffer 77; a temporary dictionary buffer 78; a temporary word/phrase buffer 79; a temporary slot buffer 80; a temporary first co-occurrence buffer 81; a temporary second co-occurrence buffer 82; an input sentence buffer 83; a developed data storage buffer (not shown); a pending buffer (not shown); and an element buffer (not shown).

Control unit 12A includes: an extracting unit 20, a data reading unit 21A, a determining unit 22, a selecting unit 23, a replacing unit 24, a display control unit 25, an output sentence refining unit 26; and a generating unit 27.

Data reading unit 21A reads the first and second templates from storage device 13A.

Based on the read first, second and third templates, generating unit 27 generates a plurality of Japanese templates and a plurality of English and Chinese templates that are each in correspondence with the Japanese templates. Generating unit 27 stores the generated Japanese templates, English templates and Chinese templates in storage device 13A.

By the process described above, it is possible in translation apparatus 1 to store the Japanese templates, English templates and Chinese templates in storage device 13A. In the following, details of the process by generating unit 27 will be described, together with the configuration of the first, second and third templates.

FIG. 57 shows a configuration of one template data included in template database 60A. Referring to FIG. 57, the template data includes a template ID, the first template, the second template and the third template.

The first template includes: a first portion consisting of prescribed words/phrases; a variable portion that can be replaced by any of a predetermined plurality of words/phrases; and a second portion for which any element can be selected from a predetermined plurality of elements.

In FIG. 57, a word/phrase W36, a word/phrase W45 (characters representing negation) and a word/phrase W46 (point) correspond to the first portion. {1:&LANGUAGE} corresponds to the variable portion. Further, a character string W47 and {2:(&VB_EXPLAIN+v.kanou)|(&VB_PRONOUNCE+v.kanou)|(&VB_INTERPRET+v.kanou)} correspond to the second portion.

The second template includes, as does the first template, the first portion, the variable portion and the second portion. In FIG. 57, "I" and "can't" correspond to the first portion. {1:&LANGUAGE} corresponds to the variable portion. Further, {2: (&VB_EXPLAIN+inf) it in|(&VB_PRONOUNCE+inf) it in|(&VB_INTERPRET+inf) it in} correspond to the second portion.

The third template also includes, similar to the first and second templates, the first portion, the variable portion and the second portion, as shown in FIG. 57.

As described above, the first template and the second template (or the third template) includes the first portion consisting of prescribed words/phrases, and a second portion for which any of a predetermined plurality of elements can be selected.

The outline of the process by translation apparatus 1A is the same as that shown in the flowchart of FIG. 12. It is noted, however, that the process of template search (step S2) in translation apparatus 1A is different from the flowchart of FIG. 13.

Figure 58:
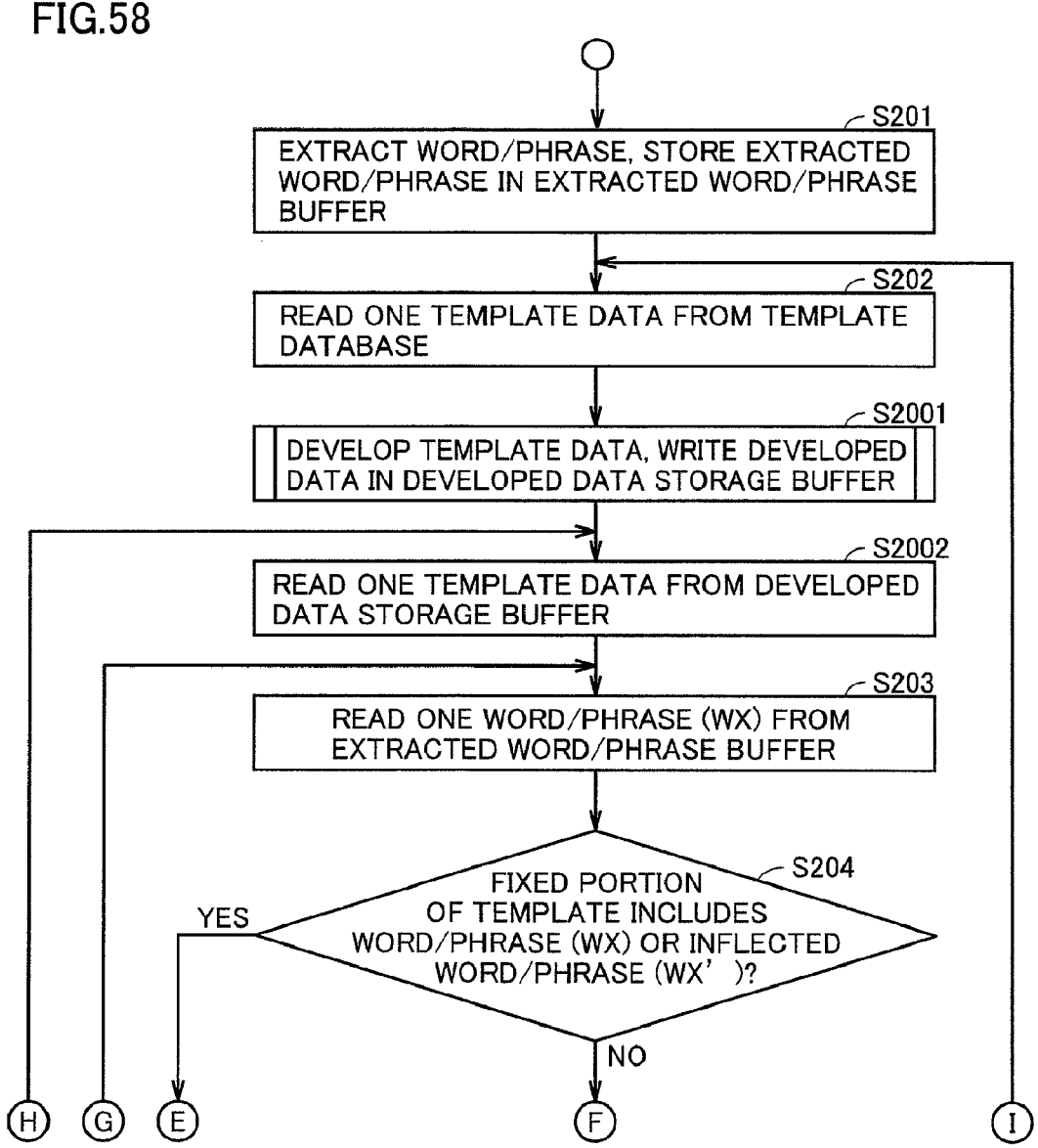
FIG. 58 is a flowchart representing a former half of a flow of template search.
Figure 59:
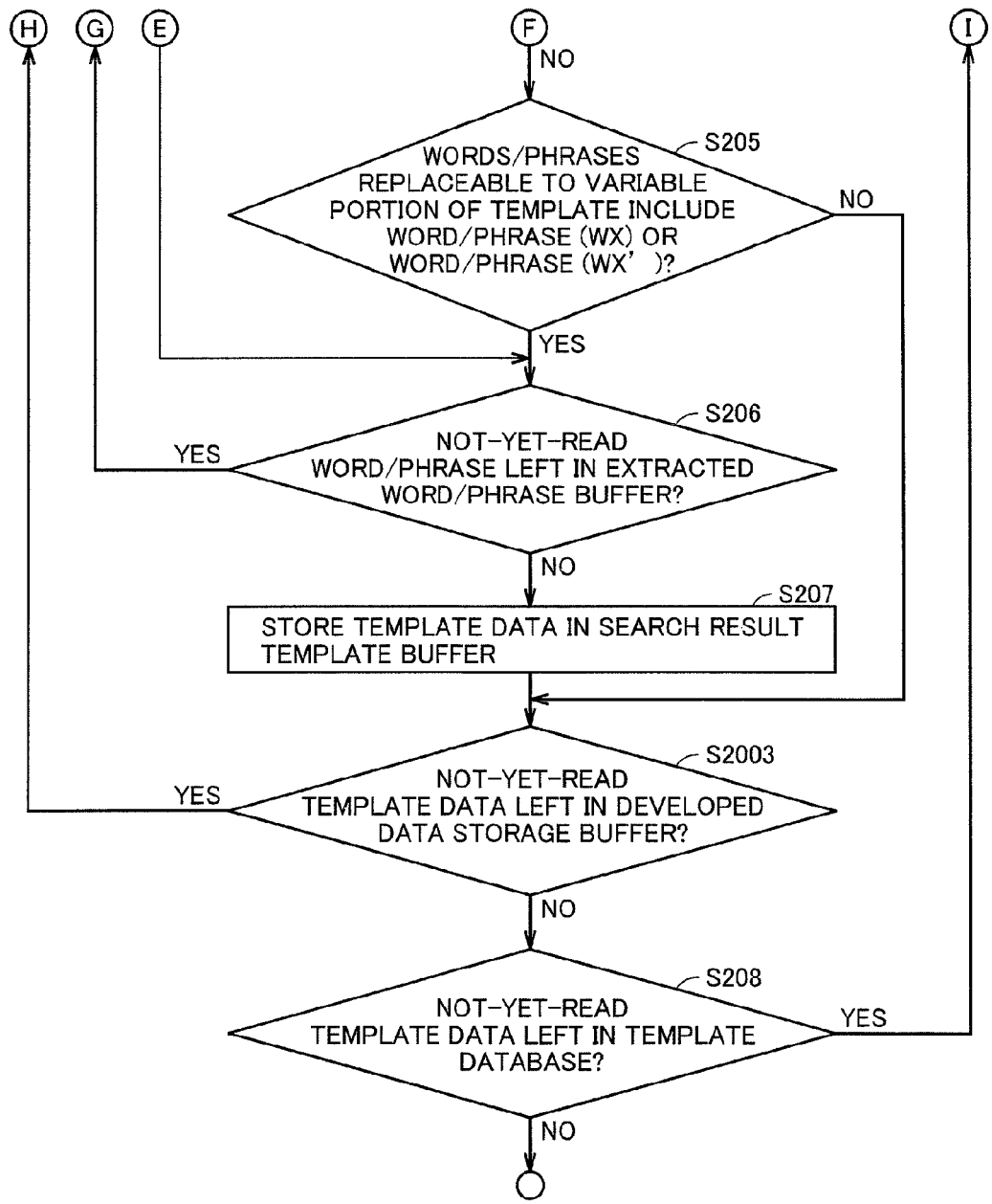
FIG. 59 is a flowchart representing a latter half of the flow of template search.

FIG. 58 is a flowchart representing a former half of a flow of template search. FIG. 59 is a flowchart representing a latter half of the flow of template search. Referring to FIG. 58, the process of FIG. 58 differs from the process shown in FIG. 13 (steps S201 to S204), in that it newly includes two steps S2001 and S2002 between steps S202 and S203. Referring to FIG. 59, the process of FIG. 59 differs from the process shown in FIG. 13 (steps S205 to S208) in that it newly includes step S2003 between steps S207 and S208.

Again referring to FIG. 58, at step S2001, generating unit 27 develops the template data (see FIG. 57) read from storage device 13A, and writes the template data obtained by the development to the developed data storage buffer. By the development of template data, generating unit 27 writes at least one template data in the developed data storage buffer. At step S2002, generating unit 27 reads one template data from the developed data storage buffer.

Again referring to FIG. 59, at step S2003, generating unit 27 determines whether or not any not-yet-read template data is left in the developed data storage buffer. If it is determined that such a template data exists (YES at S2003), translation apparatus 1A returns the process to step S2002. If it is determined that any template data does not exist (NO at step S2003), translation apparatus 1A causes the process to proceed to step S208. At step S208, control unit 12 determines whether or not any not-yet-read template data exists in the template database 60A.

Figure 60:
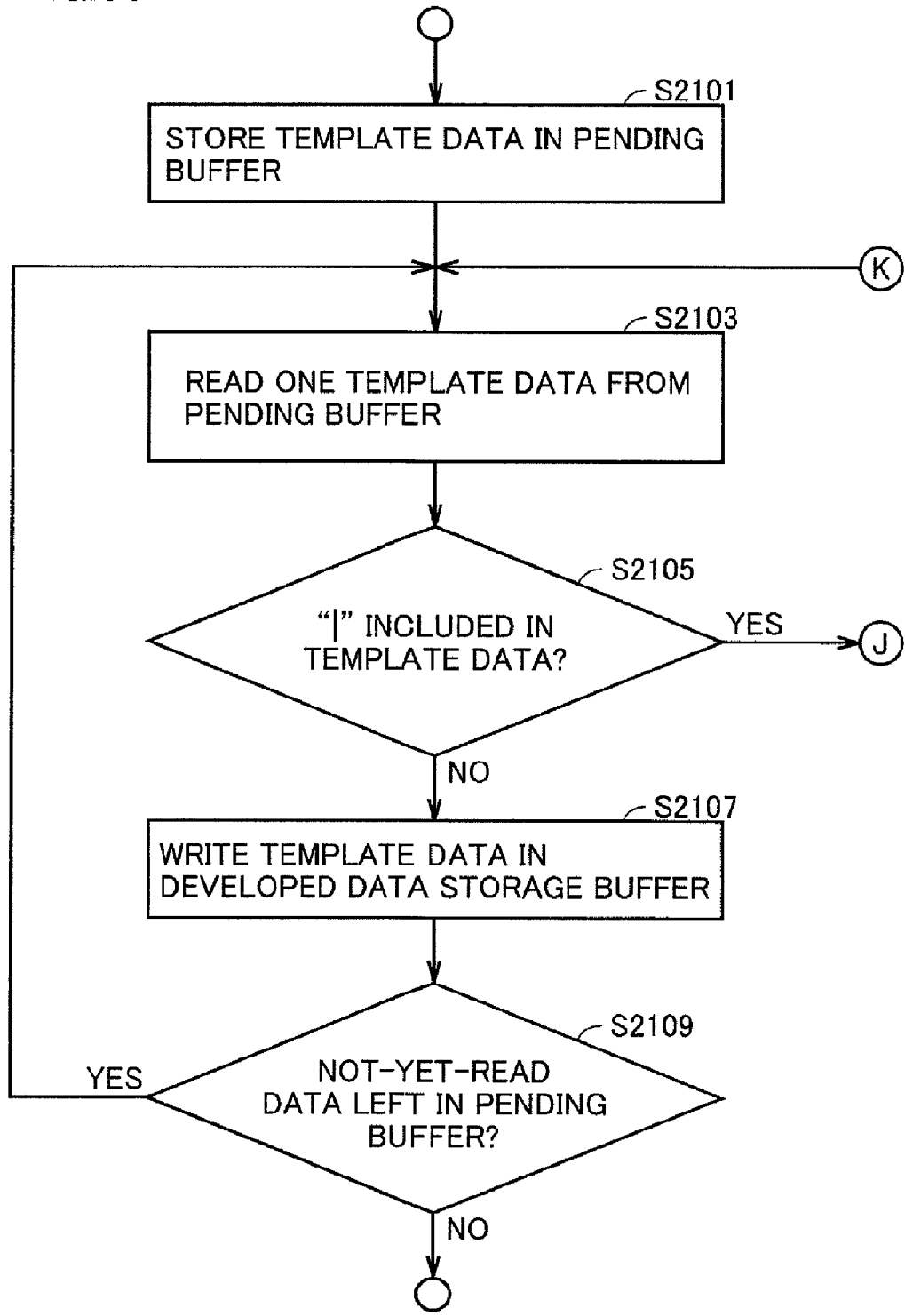
FIG. 60 is a flowchart showing details of a part of step S2001 of FIG. 58.
Figure 61:
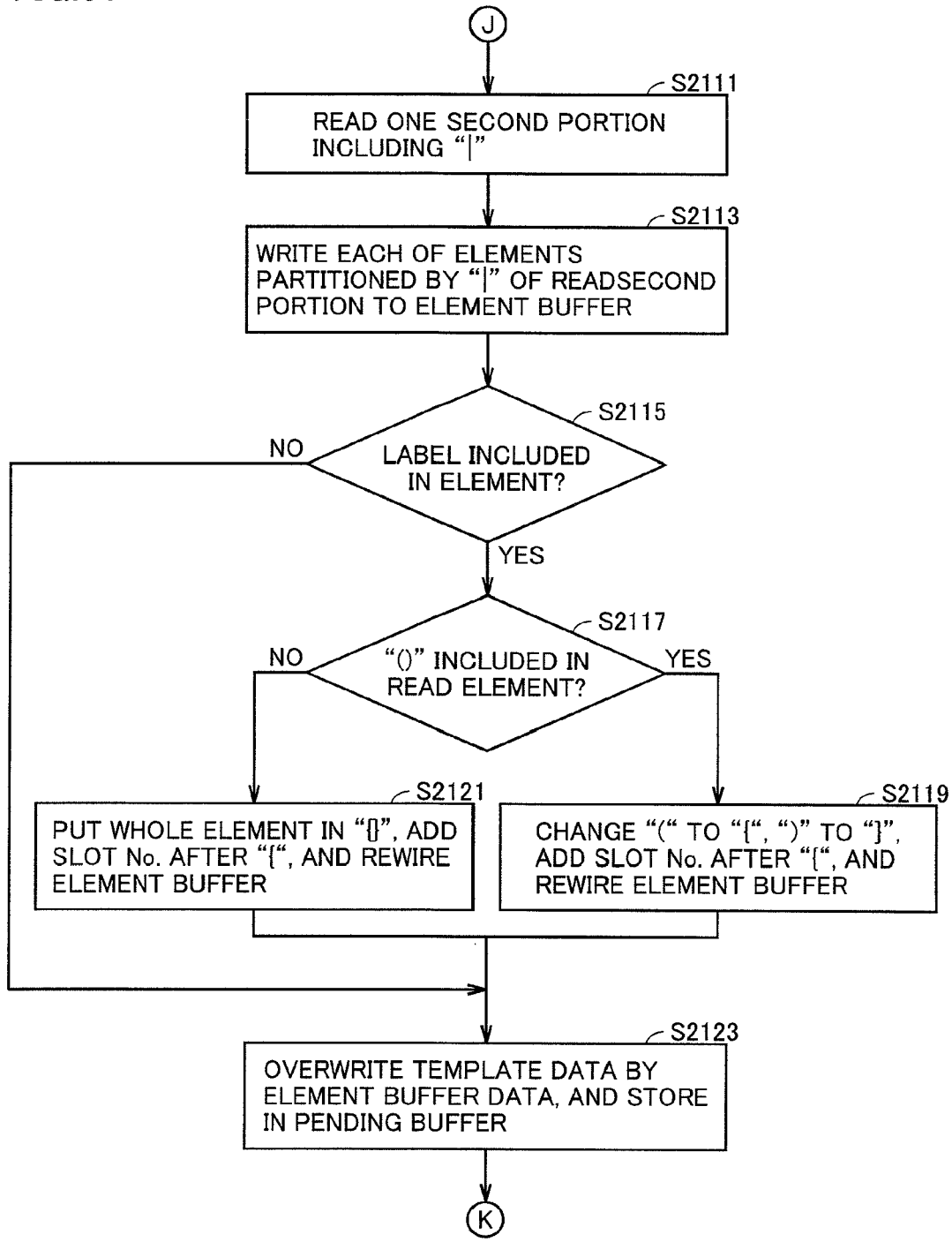
FIG. 61 is a flowchart showing details of the remaining part of step S2001 of FIG. 58.

FIG. 60 is a flowchart representing part of the details of step S2001 shown in FIG. 58. FIG. 61 is a flowchart representing the remaining part of the details of step S2001.

Referring to FIG. 60, at step S2101, translation apparatus 1A stores one template data that has been read at step S202, in the pending buffer. By way of example, translation apparatus 1 stores the template data shown in FIG. 57 in the pending buffer. In the following, description will be given assuming that the template data shown in FIG. 57 (referred to as "template data (ID1971-1)") is stored in the pending buffer, as an example.

At step S2103, translation apparatus 1A reads one template data from the pending buffer. Since only the template data (ID1971-1) is stored in the pending buffer, translation apparatus 1A reads this template data (ID1971-1).

At step S2105, translation apparatus 1A determines whether or not a sign such as "|" indicating a partition exists in the read template data. If it is determined that the sign "|" exists (YES at step S2105), translation apparatus 1A causes the process to proceed to S2111 (see FIG. 61).

If it is determined that the sign "|" does not exist (NO at step S2105), translation apparatus 1A writes the template data in the developed data storage buffer at step S2107. Thereafter, at step S2109, translation apparatus 1A determines whether or not any not-yet-read template data exists in the pending buffer (YES at step S2109). If it is determined that a template data exists (YES at step S2109), translation apparatus 1A returns the process to step S2103. If it is determined that no template data exists (NO at step S2109), translation apparatus 1A causes the process to proceed to step S2002 (see FIG. 58).

Since the template data (ID1971-1) includes the sign "|", translation apparatus 1A executes step S2111 after step S2105. Referring to FIG. 61, at step S2111, translation apparatus 1A reads one second portion including the sign "|". By way of example, translation apparatus 1A reads the character string W47 (see FIG. 57) from the first template of template data (ID1971-1).

At step S2113, translation apparatus 1A writes each of the elements partitioned by the sign "|" in the parenthesis "{ }" of the read second portion to the element buffer. Specifically, translation apparatus 1A writes a word/phrase W48 (adverb), a word/phrase W49 (adverb) and " " (blank) to the boxes of Japanese in the element buffer. FIG. 62 shows a state of the element buffer after elements are written, in the process of step S2113 for the first time. Since the second portion corresponding to character string W47 does not exist in the second and third templates, translation apparatus 1A maintains the state of "NULL" in the boxes of English and Chinese in the element buffer.

At step S2115, translation apparatus 1A determines whether or not a label exists in the element. If it is determined that a label exists (YES at step S2115), at step S2117, translation apparatus 1A determines whether or not "( )" exists in the read element. If it is determined that "( )" exists (YES at S2117), at step S2119, translation apparatus 1A changes "(" to "{" and ")" to "}" in the element buffer at step S2119. Further, at step S2119, translation apparatus 1A adds a slot number after "{". If it is determined that "( )" does not exist (NO at step S2117), translation apparatus 1A puts the element as a whole in the parentheses "( )", and adds a slot number after "{".

If it is determined that a label does not exist (NO at step S2115), translation apparatus 1A causes the process to proceed to step S2123. At step S2123, translation apparatus 1A overwrites the template data using each element in the element buffer, and stores the thus overwritten template data in the pending buffer.

As described above, when word/phrase W48, word/phrase W49 and " " (blank) are written in the element buffer (see FIG. 62), at step S2115, translation apparatus 1A determines that there is no label. Therefore, as a result of the process at step S2123, translation apparatus 1A stores the template data shown in FIG. 63, the template data shown in FIG. 64 and the template data shown in FIG. 65, in the pending buffer.

Specifically, FIG. 63 shows one template data (hereinafter referred to as template data (1971-1_1)) after storage in the pending buffer. The template data (1971-1_1) is the data obtained by translation apparatus 1 overwriting the character string W47 of template data (ID1971-1) using word/phrase W48 (element).

Further, FIG. 64 shows another template data (hereinafter referred to as template data (1971-1_2)) after storage in the pending buffer. The template data (1971-1_2) is the data obtained by translation apparatus 1 overwriting the character string W47 of template data (ID1971-1) using word/phrase W49 (element).

Further, FIG. 65 shows a further template data (hereinafter referred to as template data (1971-1_3)) after storage in the pending buffer. The template data (1971-1_3) is the data obtained by translation apparatus 1 overwriting the character string W47 of template data (ID1971-1) using " " (blank).

When translation apparatus 1 stores template data (1971-1_1), template data (1972-1_2) and template data (1971-1_3) in the pending buffer, at step S2103, translation apparatus 1 reads one template data from the stored three template data. Here, assume that translation apparatus 1A reads template data (ID1971-1_1). Here, the determination at step S2105 of translation apparatus 1A is positive, and translation apparatus 1A causes the process to proceed to step S2111.

FIG. 66 shows a state of the element buffer after elements are written by the process at step S2113 for the second time. Referring to FIG. 66, translation apparatus 1A writes "(&VB_EXPLAIN+v.kanou)", "(&VB_PRONOUNCE+v.kanou)" and "(&VB_INTERPRET+v.kanou)" in the boxes of Japanese in the element buffer. Further, translation apparatus 1A writes "(&VB_EXPLAIN+inf) it in", "(&VB_PRONOUNCE+inf) it in" and "(&VB_INTERPRET+inf) it in" in the boxes of English in the element buffer. Translation apparatus 1A also performs the process similar to that performed on Japanese and English boxes, on the boxes of Chinese.

If the state of element buffer attains to the state shown in FIG. 66 by the process of step S2113, since a label is included in the elements, in translation apparatus 1A, the determination at step S2115 is positive, and the process proceeds to step S2117. Further, since "( )" exists in the read elements, in translation apparatus 1A, the determination at step S2117 is positive, and the process proceeds to step S2119.

After the process of step S2117 for the first time, translation apparatus 1A first changes "(" to "{" and ")" to "}" in the boxes of respective languages. Further, translation apparatus 1A adds slot number "2" after "{". FIG. 67 shows the state of element buffer after this first time process of step S2117.

After step S2117, translation apparatus 1A performs the process of step S2123, whereby template data (ID1971-1_2), template data (ID1971-1_3), the template data shown in FIG. 68, the template data shown in FIG. 69 and the template data shown in FIG. 70 are stored.

FIG. 68 shows a template data (hereinafter referred to as "template data (ID 1971-1_11)) obtained by overwriting template data (ID1971-1_1) using element 1 shown in FIG. 67.

FIG. 69 shows a template data (hereinafter referred to as "template data (ID 1971-1_12)) obtained by overwriting template data (ID1971-1_1) using element 2 shown in FIG. 67. FIG. 70 shows a template data (hereinafter referred to as "template data (ID 1971-1_13)) obtained by overwriting template data (ID1971-1_1) using element 3 shown in FIG. 67.

After step S2123, at step S2103, translation apparatus 1A reads one template data from the five template data described above.

By the end of a series of processes shown in FIGS. 60 and 61, nine template data shown in FIGS. 68 to 76 have been written in the developed data storage buffer.

FIG. 71 shows a template data obtained by overwriting template data (ID1971-1_2) using element 1 shown in FIG. 67. FIG. 72 shows a template data obtained by overwriting template data (ID1971-1_2) using element 2 shown in FIG. 67. FIG. 73 shows a template data obtained by overwriting template data (ID1971-1_2) using element 3 shown in FIG. 67.

FIG. 74 shows a template data obtained by overwriting template data (ID1971-1_3) using element 1 shown in FIG. 67. FIG. 75 shows a template data obtained by overwriting template data (ID1971-1_3) using element 2 shown in FIG. 67. FIG. 76 shows a template data obtained by overwriting template data (ID1971-1_3) using element 3 shown in FIG. 67.

In this manner, translation apparatus 1A can form nine templates shown in FIGS. 63 to 65 and 71 to 76, based on one template shown in FIG. 57.

In the foregoing, a configuration has been described as an example in which templates of a plurality of languages are included in one template data, as shown in FIG. 57. However, the invention is not limited to the above. By way of example, one template data may include template data of one language. In such a case, a template data of another language corresponding to the said template data of one language should be stored in storage device 13A in association with the said template data of one language.

As described above, in storage apparatus 13A of translation apparatus 1A, at least the first template for generating a Japanese template and a second template for generating an English template corresponding to the Japanese template are stored. Data reading unit 21A reads the first and second templates from storage apparatus 13A. Generating unit 27 generates a plurality of Japanese templates and a plurality of corresponding English templates, from the read first and second templates. Further, generating unit 27 stores the generated Japanese templates and English templates in storage device 13A.

Therefore, translation apparatus 1A can generate a plurality of Japanese templates from the first template. Further, translation apparatus 1A can generate a plurality of English templates corresponding to the Japanese templates from the second template.

Therefore, as compared with translation apparatus 1 in which Japanese templates and English templates are stored in advance in storage device 13, the number of templates to be stored in translation apparatus 1A can be reduced. Therefore, the capacity of storage area for the templates in translation apparatus 1A can be made smaller than in translation apparatus 1.

Further, the first and second templates include the first portion consisting of prescribed words/phrases, and a second portion for which any element can be selected from a predetermined plurality of elements. Generating unit 27 successively selects elements for corresponding positions of the first and second templates in the first and second templates, and thereby generates a plurality of Japanese templates and a plurality of corresponding English templates.

Therefore, translation apparatus 1A can generate Japanese templates and English templates in accordance with the number of elements included in the second portion.

Further, as shown in FIG. 57, the element may be a variable portion. If the element is a variable portion, translation apparatus can generate larger number of example sentences than when the element is not a variable portion.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. An information processing device, comprising:
a reading unit for reading, from a storage device storing a template in a first language and a template in a second language corresponding to the template, said template in the first language and said template in the second language; wherein
said template in the first language and said template in the second language include a fixed portion consisting of a prescribed word/phrase and a variable portion replaceable by any of a predetermined plurality of words/phrases, at positions corresponding to each other;
said information processing device further comprising:
a determining unit for determining, as regards the plurality of templates in said first language read by said reading unit, whether or not a word/phrase included in a sentence input in the first language through an input device matches any of said prescribed word/phrase and said predetermined plurality of words/phrases;
a selecting unit for selecting at least one template from said plurality of templates, based on the result of said determination; and
a replacing unit, if a template including a variable portion replaceable by said matched word/phrase is selected by said selecting unit, in a template in the second language corresponding to said selected template read by said reading unit, for replacing a variable portion corresponding to said variable portion replaceable by said matched word/phrase by a word/phrase in said second language corresponding to said matched word/phrase; wherein
the template in said second language includes, as said variable portion, a first variable portion and a second variable portion; and
said replacing unit replaces said first variable portion by a word/phrase in said second language, and determines a word/phrase of said second variable portion in accordance with the replaced word/phrase.

2. The information processing device according to claim 1, comprising
a display control unit for displaying at least a result of translation of said sentence input in the first language, based on the template in said second language after replacement by said replacing unit on a display device.

3. The information processing device according to claim 2, wherein
if a template in the first language is selected by said selecting unit, said replacing unit replaces said variable portion replaceable by said matched word/phrase by said matched word/phrase; and said display control unit displays an image based on said template in the first language after replacement by said replacing unit on the display device.

4. The information processing device according to claim 1, wherein
said variable portion has a prescribed identification indicator provided in a corresponding manner; and
said predetermined plurality of words/phrases are words/phrases specified by said prescribed identification indicator.

5. The information processing device according to claim 4, wherein
said storage device stores dictionary data in said first language and dictionary data in said second language, and in the dictionary data of said first language, all or some of the words/phrases included in the dictionary data are each classified to belong to at least one group; and
said prescribed identification indicator is an indicator indicating a prescribed group of said plurality of groups.

6. The information processing device according to claim 5, wherein
the dictionary data stored in said storage device includes data related to thesaurus, and said classification is done based on said data related to thesaurus; and
said prescribed group represents words/phrases included in a prescribed classification defined in said data related to thesaurus.

7. The information processing device according to claim 1, wherein
said storage device stores, for each of said predetermined plurality of words/phrases of the variable portion of the template in said first language, a translated word/phrase in said second language in a corresponding manner; and
said replacing unit replaces the variable portion of the template in said second language by the translated word/phrase in said second language stored in the corresponding manner in said storage device.

8. The information processing device according to claim 1, wherein
the variable portion of the template in said first language and the variable portion of the template in said second language corresponding to said variable portion have information related to inflection of a word/phrase provided in a corresponding manner; and
said replacing unit changes word form of said replaced word/phrase based on said information related to inflection.

9. The information processing device according to claim 1, wherein
said first variable portion may include a sign representing relation to said second variable portion; and
if said first variable portion includes said sign, said replacing unit determines a word/phrase of said second variable portion in accordance with said replaced word/phrase, for the second variable portion specified by said sign.

10. The information processing device according to claim 1, wherein
if said selected template in the first language and the template in said second language corresponding to the template each include a plurality of variable portions, said determining unit determines, in selecting a template in said first language, whether or not said extracted word/phrase matches any of said predetermined plurality of words/phrases, for each of the variable portions.

11. The information processing device according to claim 1, wherein
said storage device includes a first template for generating a template in the first language, and a second template for generating a template in said second language corresponding to the template in the first language; and
said reading unit reads said first template and said second template from said storage device;
said information processing device further comprising
a generating unit for generating a plurality of templates in said first language and a plurality of templates in said second language corresponding to the templates, based on said read first template and said second template, and storing the generated templates in the first and second languages in said storage device.

12. The information processing device according to claim 11, wherein
said first template and said second template include a first portion consisting of a prescribed word/phrase, and a second portion for which any of a predetermined plurality of elements can be selected; and
said generating unit generates, by successively selecting said element at positions corresponding to each other in said first template and said second template, in said first template and in said second template, a plurality of templates in said first language and a plurality of templates in said second language corresponding to the templates.

13. The information processing device according to claim 12, wherein
said element is said variable portion.

14. The information processing device according to claim 1, wherein
the template in said second language includes a plurality of said second variable portions;
said storage device stores priority information defining an order of replacing each of said second variable portions; and
said replacing unit replaces each of said second variable portions in the order based on said priority information.

15. An information processing method, comprising the step of:
reading, from a storage device storing a template in a first language and a template in a second language corresponding to the template, said template in the first language and said template in the second language; wherein
said template in the first language and said template in the second language include a fixed portion consisting of a prescribed word/phrase and a variable portion replaceable by any of a predetermined plurality of words/phrases, at positions corresponding to each other;
said method further comprising the steps of:
determining, as regards said read plurality of templates in said first language, whether or not a word/phrase included in a sentence input in the first language through an input device matches any of said prescribed word/phrase and said predetermined plurality of words/phrases;
selecting at least one template from said plurality of templates, based on the result of said determination; and
if a template including a variable portion replaceable by said matched word/phrase is selected, in a template in the second language corresponding to said selected template read by said reading unit, replacing a variable portion corresponding to said variable portion replaceable by said matched word/phrase by a word/phrase in said second language corresponding to said matched word/phrase; wherein the template in said second language includes, as said variable portion, a first variable portion and a second variable portion; and at said replacing step, said first variable portion is replaced by a word/phrase in said second language, and a word/phrase of said second variable portion is determined in accordance with the replaced word/phrase.

16. A non-transitory computer-readable recording medium recording a program, wherein said program causes a computer to execute an information processing method; and said information processing method includes the step of:

reading, from a storage device storing a template in a first language and a template in a second language corresponding to the template, said template in the first language and said template in the second language; wherein said template in the first language and said template in the second language include a fixed portion consisting of a prescribed word/phrase and a variable portion replaceable by any of a predetermined plurality of words/phrases, at positions corresponding to each other;

said method further includes the steps of:

determining, as regards said read plurality of templates in said first language, whether or not a word/phrase included in a sentence input in the first language through an input device matches any of said prescribed word/phrase and said predetermined plurality of words/phrases;

selecting at least one template from said plurality of templates, based on the result of said determination; and if a template including a variable portion replaceable by said matched word/phrase is selected, in a template in the second language corresponding to said selected template read by said reading unit, replacing a variable portion corresponding to said variable portion replaceable by said matched word/phrase by a word/phrase in said second language corresponding to said matched word/phrase;

wherein the template in said second language includes, as said variable portion, a first variable portion and a second variable portion; and at said replacing step, said first variable portion is replaced by a word/phrase in said second language, and a word/phrase of said second variable portion is determined in accordance with the replaced word/phrase.

* * * * *